United States Patent
Akiyama et al.

(10) Patent No.: US 10,011,773 B2
(45) Date of Patent: *Jul. 3, 2018

(54) LIQUID CRYSTAL DISPLAY DEVICE

(71) Applicant: DIC CORPORATION, Tokyo (JP)

(72) Inventors: Hidenari Akiyama, Kita-adachi-gun (JP); Isa Nishiyama, Kita-adachi-gun (JP); Seiji Fanakura, Sakura (JP); Katsunori Shimada, Sakura (JP)

(73) Assignee: DIC CORPORATION, Tokyo (JP)

( * ) Notice: Subject to any disclaimer, the term of this patent is extended or adjusted under 35 U.S.C. 154(b) by 125 days.

This patent is subject to a terminal disclaimer.

(21) Appl. No.: 14/895,987

(22) PCT Filed: Jun. 3, 2014

(86) PCT No.: PCT/JP2014/064731
§ 371 (c)(1),
(2) Date: Mar. 29, 2016

(87) PCT Pub. No.: WO2014/196527
PCT Pub. Date: Dec. 11, 2014

(65) Prior Publication Data
US 2016/0215217 A1    Jul. 28, 2016

(30) Foreign Application Priority Data

Jun. 6, 2013 (JP) .................. 2013-119770

(51) Int. Cl.
*G02F 1/1333* (2006.01)
*C09K 19/58* (2006.01)
(Continued)

(52) U.S. Cl.
CPC ............ *C09K 19/588* (2013.01); *C09K 19/20* (2013.01); *C09K 19/2021* (2013.01);
(Continued)

(58) Field of Classification Search
CPC .. C09K 19/588; C09K 19/2021; C09K 19/54; C09K 19/586; C09K 19/3028;
(Continued)

(56) References Cited

U.S. PATENT DOCUMENTS 8,860,912 B2 * 10/2014 Kaneoya ............... G02B 5/201
                                                       252/299.1
9,120,968 B2 *  9/2015 Kaneoya ............ C09K 19/3066
(Continued)

FOREIGN PATENT DOCUMENTS

JP    2000-19321 A    1/2000
JP    2000-192040 A   7/2000
(Continued)

OTHER PUBLICATIONS

International Search Report dated Aug. 26, 2014, issued in counterpart International Application No. PCT/JP2014/064731 (2 pages).

*Primary Examiner* — Geraldina Visconti
(74) *Attorney, Agent, or Firm* — Westerman, Hattori, Daniels & Adrian, LLP

(57) ABSTRACT

The present invention relates to a liquid crystal display device that includes a particular color filter containing a material containing chiral liquid crystals and a particular dye and/or pigment.

The present invention provides a liquid crystal display device that can prevent a decrease in the voltage holding ratio (VHR) of a liquid crystal layer and solve the problem of display defects, such as white spots, variations in alignment, and burn-in.

Because liquid crystal display devices according to the present invention characteristically prevent a decrease in the voltage holding ratio (VHR) of a liquid crystal layer and reduces the occurrence of display defects, such as burn-in, the liquid crystal display devices are particularly useful as (Continued)

liquid crystal display devices in IPS mode and FFS mode for active-matrix driving and can be applied to household electrical appliances, automobiles, production facilities, measuring and analytical instruments, and communication devices.

16 Claims, 1 Drawing Sheet

(51) Int. Cl.
| | |
|---|---|
| C09K 19/20 | (2006.01) |
| C09K 19/54 | (2006.01) |
| G02B 5/20 | (2006.01) |
| C09K 19/30 | (2006.01) |
| C09K 19/34 | (2006.01) |
| G02F 1/1335 | (2006.01) |
| C09K 19/04 | (2006.01) |
| C09K 19/52 | (2006.01) |
| G02F 1/137 | (2006.01) |
| C09K 19/18 | (2006.01) |

(52) U.S. Cl.
CPC ...... *C09K 19/2028* (2013.01); *C09K 19/3028* (2013.01); *C09K 19/3066* (2013.01); *C09K 19/3068* (2013.01); *C09K 19/3402* (2013.01); *C09K 19/348* (2013.01); *C09K 19/3458* (2013.01); *C09K 19/54* (2013.01); *C09K 19/586* (2013.01); *G02B 5/201* (2013.01); *G02F 1/133512* (2013.01); *G02F 1/133514* (2013.01); *C09K 2019/0448* (2013.01); *C09K 2019/0466* (2013.01); *C09K 2019/181* (2013.01); *C09K 2019/2042* (2013.01); *C09K 2019/2078* (2013.01); *C09K 2019/301* (2013.01); *C09K 2019/304* (2013.01); *C09K 2019/3063* (2013.01); *C09K 2019/3083* (2013.01); *C09K 2019/3422* (2013.01); *C09K 2019/523* (2013.01); *G02F 1/13718* (2013.01)

(58) Field of Classification Search
CPC ............ C09K 19/3066; C09K 19/3068; C09K 19/3402; C09K 19/3458; C09K 19/348; C09K 19/20; C09K 19/2028; C09K 2019/0448; C09K 2019/2078; C09K 2019/523; C09K 2019/304; C09K 2019/3083; C09K 2019/3422; C09K 2019/0466; C09K 2019/181; C09K 2019/2042; C09K 2019/301; C09K 2019/3063; G02B 5/201; G02F 1/1333; G02F 1/13718; G02F 1/133512; G02F 1/133514
USPC ...................................... 428/1.1; 252/299.01
See application file for complete search history.

(56) References Cited

U.S. PATENT DOCUMENTS

| | | | |
|---|---|---|---|
| 9,193,906 B2* | 11/2015 | Ogawa | C09K 19/3003 |
| 9,298,033 B2* | 3/2016 | Ogawa | C09K 19/3003 |
| 9,410,084 B2* | 8/2016 | Kuriyama | C09K 19/54 |
| 9,442,321 B2* | 9/2016 | Kaneoya | G02F 1/133514 |
| 9,459,488 B2* | 10/2016 | Kuriyama | C09K 19/20 |
| 9,809,752 B2* | 11/2017 | Hatsusaka | C09K 19/2021 |
| 2012/0249928 A1 | 10/2012 | Kaihoko et al. | |
| 2016/0130502 A1* | 5/2016 | Hatsusaka | C09K 19/2021 |
| | | | 349/106 |

FOREIGN PATENT DOCUMENTS

| | | |
|---|---|---|
| JP | 2003-327966 A | 11/2003 |
| JP | 2009-109542 A | 5/2009 |
| JP | 2009-144126 A | 7/2009 |
| JP | 2010-8861 A | 1/2010 |
| JP | 2011-69922 A | 4/2011 |
| JP | 2011-221078 A | 11/2011 |

* cited by examiner

LIQUID CRYSTAL DISPLAY DEVICE

TECHNICAL FIELD

The present invention relates to liquid crystal display devices.

BACKGROUND ART

Liquid crystal display devices are used in various household electrical appliances, measuring instruments, automobile panels, word processors, electronic notebooks, printers, computers, and television sets, as well as clocks and watches and electronic calculators. Typical liquid crystal display modes include twisted nematic (TN), super-twisted nematic (STN), dynamic light scattering (DS), guest-host (GH), in-plane switching (IPS), optically compensated birefringence (OCB), electrically controlled birefringence (ECB), vertical alignment (VA), color super homeotropic (CSH), and ferroelectric liquid crystals (FLC). Regarding the drive system, multiplex driving becomes common instead of conventional static driving, and passive-matrix and recent active-matrix (AM) driven by thin-film transistors (TFT) and thin-film diodes (TFD) become the mainstream.

As illustrated in FIG. 1, a typical color liquid crystal display device includes two substrates (1) each having an alignment film (4). A transparent electrode layer (3a) and a color filter layer (2) are disposed between the alignment film and one of the substrates. The transparent electrode layer (3a) acts as a common electrode. A pixel electrode layer (3b) is disposed between the alignment film and the other of the substrates. These substrates are disposed such that the alignment films face each other with a liquid crystal layer (5) interposed therebetween.

The color filter layer is a color filter composed of a black matrix, a red color layer (R), a green color layer (G), a blue color layer (B), and an optional yellow color layer (Y).

Impurities in the liquid crystal material of the liquid crystal layer are strictly controlled because these impurities have a great influence on the electrical characteristics of display devices. The influence of impurities in the materials of the alignment films on the characteristics of liquid crystal display devices is also being studied. The alignment films are in direct contact with the liquid crystal layer. It is already known that impurities in the alignment films move into the liquid crystal layer and have an influence on the electrical characteristics of the liquid crystal layer.

In the same manner as in the alignment film materials, impurities in the materials of the color filter layer, such as organic pigments, may have an influence on the liquid crystal layer. However, it has been believed that the alignment film and the transparent electrode between the color filter layer and the liquid crystal layer greatly reduce the direct influence of the color filter layer on the liquid crystal layer as compared with the alignment film materials. However, the alignment film generally has a thickness as small as 0.1 μm or less, and the transparent electrode used as a common electrode adjacent to the color filter layer generally has a thickness of 0.5 μm or less even when the thickness is increased to achieve high electric conductivity. Thus, the color filter layer is not necessarily completely separated from the liquid crystal layer. Impurities in the color filter layer may cause display defects, such as white spots, variations in alignment, and burn-in, due to a decrease in the voltage holding ratio (VHR) of the liquid crystal layer through the alignment film and the transparent electrode in liquid crystal display devices. A method for controlling the elution of impurities into liquid crystals by using a pigment having a rate of extraction by ethyl formate not more than a particular value (Patent Literature 1) and a method for controlling the elution of impurities into liquid crystals by specifying a pigment in a blue color layer (Patent Literature 2) have been studied as methods for preventing display defects caused by impurities contained in pigments of color filters. However, there is no significant difference between these methods and a simple reduction of impurities in pigments. Even with recent advances in pigment purification technology, these methods are insufficient to prevent display defects.

Focusing on the relationship between an organic impurity in a color filter and a liquid crystal composition, in a method disclosed in Patent Literature 3, the insolubility of the organic impurity in a liquid crystal layer is represented by the hydrophobicity parameter of liquid crystal molecules in the liquid crystal layer, and the hydrophobicity parameter has at least a certain value; or on the basis of the correlation between the hydrophobicity parameter and a —$OCF_3$ group at an end of liquid crystal molecules, a liquid crystal compound having a —$OCF_3$ group at an end of its liquid crystal molecules constitutes at least a certain percentage of the liquid crystal composition.

However, also in this disclosure in the cited literature, it is essential to reduce the influence of impurities in a pigment on the liquid crystal layer. In particular, no study has been performed on the direct relationship between the structure of a coloring material, such as a dye or pigment, in a color filter and the structure of a liquid crystal material. Thus, the problem of display defects has not been solved in advanced liquid crystal display devices.

CITATION LIST

Patent Literature

PTL 1: Japanese Unexamined Patent Application Publication No. 2000-19321

PTL 2: Japanese Unexamined Patent Application Publication No. 2009-109542

PTL 3: Japanese Unexamined Patent Application Publication No. 2000-192040

SUMMARY OF INVENTION

Technical Problem

The present invention provides a liquid crystal display device that includes a color filter containing a material containing chiral liquid crystals and a particular dye and/or pigment and thereby can prevent a decrease in the voltage holding ratio (VHR) of a liquid crystal layer and solve the problem of display defects, such as white spots, variations in alignment, and burn-in.

Solution to Problem

In order to solve the problems described above, the present inventors intensively studied a combination of a coloring material, such as a dye or pigment, for a color filter and the structure of a material containing chiral liquid crystals for a liquid crystal layer. On the basis of the study results, the present inventors arrived at the present invention by finding that when a liquid crystal display device has the structure of a material containing chiral liquid crystals and includes a color filter containing a dye and/or pigment having a particular structure, this prevents a decrease in the voltage holding ratio (VHR) of a liquid crystal layer and solve the problem of display defects, such as white spots, variations in alignment, and burn-in.

The present invention provides a liquid crystal display device that includes a first substrate, a second substrate, a liquid crystal layer between the first substrate and the second substrate, a color filter, a pixel electrode, and a common electrode, the color filter including a black matrix and at least RGB three-color pixel units, wherein the liquid crystal layer is formed of a material containing chiral liquid crystals, the material containing chiral liquid crystals containing a nematic liquid crystal composition and at least one chiral compound, the nematic liquid crystal composition containing at least two achiral liquid crystal compounds, and the RGB three-color pixel units contain, as a coloring material, a diketopyrrolopyrrole pigment and/or an anionic red organic dye in the R pixel unit, at least one selected from the group consisting of a halogenated copper phthalocyanine pigment, a phthalocyanine green dye, and a mixture of a phthalocyanine blue dye and an azo yellow organic dye in the G pixel unit, and an ε-copper phthalocyanine pigment and/or a cationic blue organic dye in the B pixel unit.

Advantageous Effects of Invention

A liquid crystal display device according to the present invention includes a color filter containing a material containing chiral liquid crystals and a particular dye and/or pigment and thereby can prevent a decrease in the voltage holding ratio (VHR) of a liquid crystal layer and prevent the occurrence of display defects, such as white spots, variations in alignment, and burn-in.

REFERENCE SIGNS LIST

1 Substrate
1a Substrate
1b Substrate
2 Color filter layer
2a Color filter layer containing particular dye and/or pigment
3a Transparent electrode layer (common electrode)
3b Transparent electrode layer (pixel electrode)
4 Alignment film
5 Liquid crystal layer
5a Liquid crystal layer containing material containing chiral liquid crystals

DESCRIPTION OF EMBODIMENTS

Figure 1:
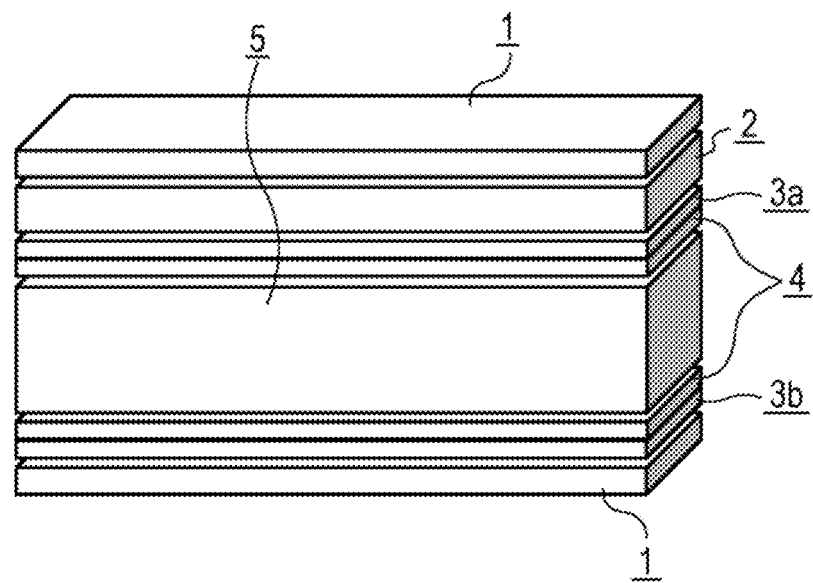
FIG. 1 is a schematic view of a known typical liquid crystal display device.
Figure 2:
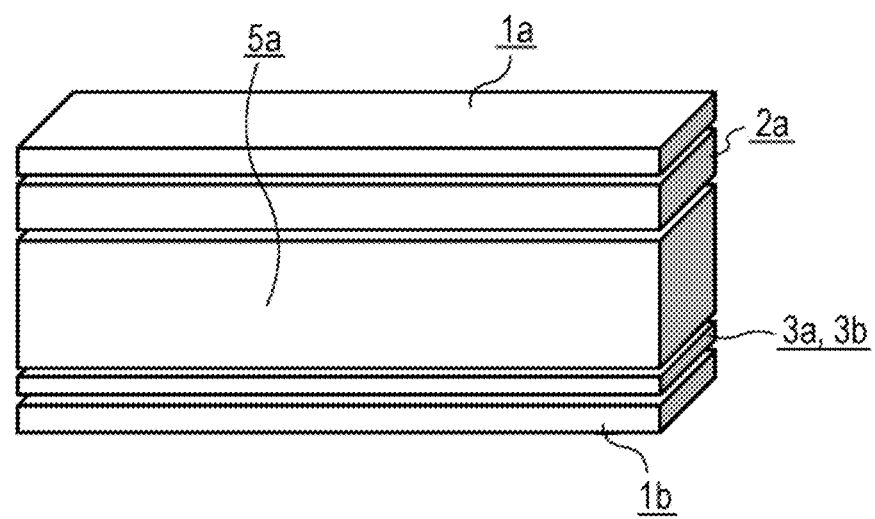
FIG. 2 is a schematic view of a liquid crystal display device according to the present invention.

FIG. 2 illustrates a liquid crystal display device according to the present invention. A color filter layer (2a) containing a particular dye and/or pigment is disposed on a first substrate (1a). A transparent electrode layer (3a), which acts as a common electrode, and a transparent electrode layer (3b), which acts as a pixel electrode, are disposed on a second substrate (1b). The color filter layer (2a) faces the transparent electrode layer (3a) and the transparent electrode layer (3b) between these substrates with a liquid crystal phase (5a) interposed therebetween.

The liquid crystal phase (5a) contains a material containing chiral liquid crystals. In the transparent electrode layers 3a and 3b, one electrode and the other electrode interdigitate with each other in an approximately horizontal direction on the second substrate (1b).

The two substrates in the display device are bonded together with a sealing material and a sealant in a peripheral region. Granular spacers or resin spacer pillars formed by photolithography are often disposed between the substrates in order to maintain the distance between the substrates.

Unless otherwise specified, the term "alkylene group", as used herein, refers to a structure in which one hydrogen atom is removed from a carbon atom at each end of an aliphatic linear hydrocarbon, that is, a divalent group "—$(CH_2)_n$—" (n is an integer of 1 or more). The substitution of a halogen atom or an alkyl group for the hydrogen atom or the substitution of an oxygen atom (—O—), a sulfur atom (—S—), —CO—, —COO—, or —OCO— for a methylene group (—$CH_2$—) will be specified in each case. The term "the number of carbon atoms in an alkylene group" refers to n in the general formula "—$(CH_2)_n$—" of the "alkylene group".

(Liquid Crystal Layer)

A liquid crystal layer in a liquid crystal display device according to the present invention is formed of a material containing chiral liquid crystals. The material containing chiral liquid crystals contain a nematic liquid crystal composition and at least one chiral compound. The nematic liquid crystal composition contains at least two achiral liquid crystal compounds.

[Nematic Liquid Crystal Composition]

The nematic liquid crystal composition for use in a material containing chiral liquid crystals of the present invention contains at least two achiral liquid crystal compounds. The liquid crystal compound may be any achiral compound having a liquid crystalline mesogenic unit (mesogenic group) and may be a known liquid crystal compound or a modified compound thereof.

<Compounds Represented by General Formula (I)>

The nematic liquid crystal composition for use in a material containing chiral liquid crystals of the present invention preferably contains a compound represented by the general formula (I). The compounds represented by the general formula (I) are liquid crystal compounds having a relatively small absolute value of A.

[Chem. 1]

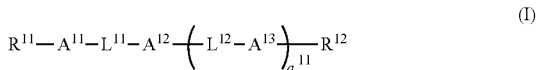

$$R^{11}-A^{11}-L^{11}-A^{12}-\left(L^{12}-A^{13}\right)_{a11}-R^{12} \qquad (I)$$

wherein $R^{11}$ and $R^{12}$ independently denote an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, one methylene group or two or more nonadjacent methylene groups in $R^{11}$ or $R^{12}$ may be independently substituted by —O—, —S—, —CO—, —COO—, or —OCO—, provided that oxygen atoms or sulfur atoms are not directly bonded to each other, and one or two or more hydrogen atoms in $R^1$ or $R^{12}$ may be substituted by a fluorine atom, $A^{11}$, $A^{12}$, and $A^{13}$ independently denote (a) a trans-1,4-cyclohexylene group (in which one methylene group or two or more nonadjacent methylene groups may be independently substituted by an oxygen atom or a sulfur atom, and one or two or more hydrogen atoms may be independently substituted by a cyano group, a fluorine atom, or a chlorine atom), (b) a 1,4-phenylene group (in which one —CH= or two or more nonadjacent —CH= may be substituted by a nitrogen atom, and one or two or more hydrogen atoms may be independently substituted by a cyano group, a fluorine atom, or a chlorine atom), or (c) a group selected from the group consisting of a 1,4-cyclohexenylene group, a 1,4-bicyclo(2.2.2)octylene group, a naphthalene-2,6-diyl group, a decahydronaphthalene-2,6-diyl group, and a 1,2,3,4-tetrahydronaphthalene-2,6-diyl group (in which one —CH= or two or more nonadjacent —CH= may be substituted by a nitrogen atom, and one or two or more hydrogen atoms may be independently substituted by a cyano group, a fluorine atom, or a chlorine atom), $a^{11}$ is 0, 1, 2, or 3, and $L^{11}$ and $L^{12}$ independently denote a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CF$_2$O—, —CH=N—N=CH—, —CH=CH—, —CF=CF—, —C≡C—, —N=N—, —CH=N—, —SCH$_2$—, —CH$_2$S—, —CSO—, —OCS—, —CF$_2$S—, or —SCF$_2$—.

In the general formula (I), $R^{11}$ and $R^{12}$ independently denote an alkyl group having 1 to 16 carbon atoms, an alkoxy group having 1 to 16 carbon atoms, an alkenyl group having 2 to 16 carbon atoms, or an alkenyloxy group having 2 to 16 carbon atoms. In the alkyl group, alkoxy group, alkenyl group, or alkenyloxy group, one methylene group or two or more nonadjacent methylene groups may be independently substituted by —O—, —S—, —CO—, —COO—, or —OCO—, provided that oxygen atoms or sulfur atoms are not directly bonded to each other, and one or two or more hydrogen atoms may be substituted by a fluorine atom. Although $R^{11}$ and $R^{12}$ may be the same or different, $R^{11}$ and $R^{12}$ in the same molecule are preferably different.

In the compound represented by the general formula (I), $R^{11}$ and $R^{12}$ independently preferably denote an alkyl group having 1 to 15 carbon atoms, an alkoxy group having 1 to 15 carbon atoms, an alkenyl group having 2 to 15 carbon atoms, or an alkenyloxy group having 2 to 15 carbon atoms, more preferably an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, still more preferably an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, still more preferably an alkyl group having 1 to 8 carbon atoms, an alkoxy group having 1 to 5 carbon atoms, or an alkenyl group having 2 to 6 carbon atoms. Although $R^{11}$ and $R^{12}$ may independently be a branched group or a linear group, a linear group is preferred.

When $R^{11}$ and $R^{12}$ independently denote an alkenyl group, any of the following groups is particularly preferred. In the following groups, the right end is linked to a ring structure. Among these, a vinyl group or a 3-butenyl group is more preferred, and a vinyl group is particularly preferred.

[Chem. 2]

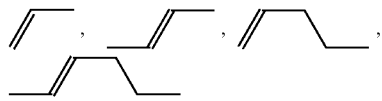

In the general formula (I), $a^{11}$ is 0, 1, or 2. In a compound represented by the general formula (I), $a^{11}$ is preferably 0 or 1.

In the general formula (I), $A^{11}$, $A^{12}$, and $A^{13}$ independently denote the following (a), (b), or (c) group. When $a^{11}$ is 2, and there are two $A^{13}$s, they may be the same or different.

(a) A trans-1,4-cyclohexylene group (in which one methylene group or two or more nonadjacent methylene groups may be independently substituted by an oxygen atom or a sulfur atom, and one or two or more hydrogen atoms may be independently substituted by a cyano group, a fluorine atom, or a chlorine atom).

(b) A 1,4-phenylene group (in which one —CH= or two or more nonadjacent —CH= may be substituted by a nitrogen atom, and one or two or more hydrogen atoms may be independently substituted by a cyano group, a fluorine atom, or a chlorine atom).

(c) A group selected from the group consisting of a 1,4-cyclohexenylene group, a 1,4-bicyclo(2.2.2)octylene group, a naphthalene-2,6-diyl group, a decahydronaphthalene-2,6-diyl group, and a 1,2,3,4-tetrahydronaphthalene-2,6-diyl group (in which one —CH= or two or more nonadjacent —CH= may be substituted by a nitrogen atom, and one or two or more hydrogen atoms may be independently substituted by a cyano group, a fluorine atom, or a chlorine atom).

The (a) group is preferably an unsubstituted trans-1,4-cyclohexylene group or a trans-1,4-cyclohexylene group in which one or two or more hydrogen atoms are independently substituted by a cyano group, a fluorine atom, or a chlorine atom, more preferably an unsubstituted 1,4-cyclohexylene group or a 1,4-cyclohexylene group in which one or two or more hydrogen atoms are independently substituted by a fluorine atom or a chlorine atom, still more preferably an unsubstituted trans-1,4-cyclohexylene group.

The (b) group is preferably a group represented by one of the following formulae (b)-1 to (b)-7. One or two or more hydrogen atoms in these groups may be independently substituted by a cyano group, a fluorine atom, or a chlorine atom. In particular, an unsubstituted 1,4-phenylene group [formula (b)-1], a 1,4-phenylene group in which one or two or more hydrogen atoms are independently substituted by a fluorine atom or a chlorine atom, or an unsubstituted pyrimidine-2,5-diyl group [formula (b)-3] is preferred, and an unsubstituted 1,4-phenylene group or a 1,4-phenylene group in which one or two or more hydrogen atoms are independently substituted by a fluorine atom or a chlorine atom is more preferred.

[Chem. 3]

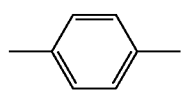

(b)-1

-continued

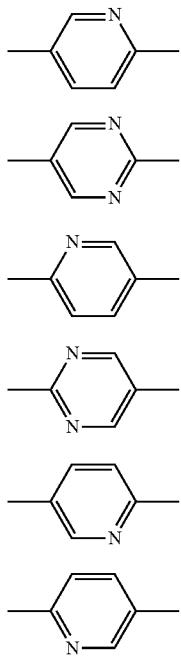

(b)-2
(b)-3
(b)-4
(b)-5
(b)-6
(b)-7

The (c) group is preferably a 1,4-cyclohexenylene group, a 1,4-bicyclo(2.2.2)octylene group, a piperidine-1,4-diyl group, a naphthalene-2,6-diyl group, a decahydronaphthalene-2,6-diyl group, or a 1,2,3,4-tetrahydronaphthalene-2,6-diyl group. One or two or more hydrogen atoms in these groups may be independently substituted by a cyano group, a fluorine atom, or a chlorine atom. In particular, an unsubstituted naphthalene-2,6-diyl group, a naphthalene-2,6-diyl group in which one or two or more hydrogen atoms are independently substituted by a fluorine atom or a chlorine atom, an unsubstituted decahydronaphthalene-2,6-diyl group, an unsubstituted 1,2,3,4-tetrahydronaphthalene-2,6-diyl group, or a 1,2,3,4-tetrahydronaphthalene-2,6-diyl group in which one or two or more hydrogen atoms are independently substituted by a fluorine atom or a chlorine atom is preferred.

In a compound represented by the general formula (I), $A^{11}$, $A^{12}$, and $A^{13}$ independently preferably denote the (a) group or the (b) group, more preferably a trans-1,4-cyclohexylene group, a 1,4-phenylene group, a 2-fluoro-1,4-phenylene group, a 3-fluoro-1,4-phenylene group, or a 3,5-difluoro-1,4-phenylene group, still more preferably a trans-1,4-cyclohexylene group or a 1,4-phenylene group. In one molecule, at least one of $A^{11}$, $A^{12}$, and $A^{13}$ preferably denotes a trans-1,4-cyclohexylene group or a 1,4-phenylene group.

In the general formula (I), $L^{11}$ and $L^{12}$ independently denote a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CF$_2$O—, —CH=N—N=CH—, —CH=CH—, —CF=CF—, —C≡C—, —N=N—, —CH=N—, —SCH$_2$—, —CH$_2$S—, —CSO—, —OCS—, —CF$_2$S—, or —SCF$_2$—. When $a^{11}$ is 2, and there are two $L^{12}$s, they may be the same or different. In a compound represented by the general formula (I), $L^{11}$ and $L^{12}$ independently preferably denote a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—, more preferably a single bond, —CH$_2$CH$_2$—, —(CH$_2$)$_4$—, —COO—, —OCO—, —OCF$_2$—, —CF$_2$O—, —CH=CH—, or —C≡C—, still more preferably a single bond, —CH$_2$CH$_2$—, —CH=CH—, —OCF$_2$—, —CF$_2$O—, or —C≡C—, still more preferably a single bond or —C≡C—. In one molecule, at least one of $L^1$ and $L^{12}$ preferably denotes a single bond.

Compounds represented by the general formula (I) are preferably compounds represented by the following general formulae (Ia) to (Ih), for example.

[Chem. 4]

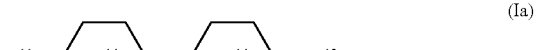
(Ia)

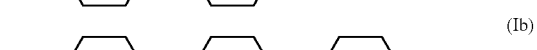
(Ib)

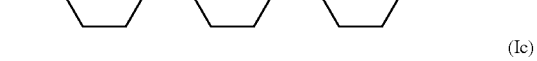
(Ic)

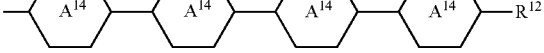
(Id)

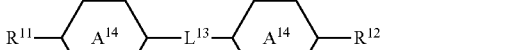
(Ie)

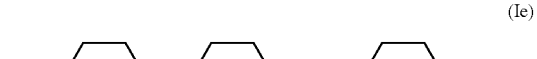
(If)

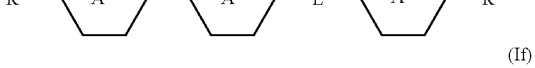
(Ig)

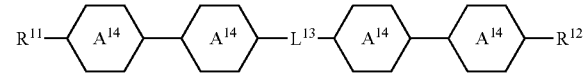
(Ih)

In the general formulae (Ia) to (Ih), $R^{11}$ and $R^{12}$ are the same as in the general formula (I). Although $R^{11}$ and $R^{12}$ may be the same or different, $R^{11}$ and $R^{12}$ in the same molecule are preferably different. In compounds represented by the general formulae (Ia) to (Ih), $R^{11}$ and $R^{12}$ preferably denote an alkyl group having 1 to 8 carbon atoms, an alkoxy group having 1 to 8 carbon atoms, an alkenyl group having 2 to 8 carbon atoms, or an alkenyloxy group having 3 to 16 carbon atoms, more preferably an alkyl group having 1 to 8 carbon atoms, an alkoxy group having 1 to 5 carbon atoms, or an alkenyl group having 2 to 6 carbon atoms. Although $R^{11}$ and $R^{12}$ may independently be a branched group or a linear group, a linear group is preferred. When $R^{11}$ and $R^{12}$ independently denote an alkenyl group, a vinyl group or a 3-butenyl group is preferred, and a vinyl group is particularly preferred.

In the general formulae (Ia) to (Ih), each $A^{14}$ denotes a 1,4-phenylene group in which one or two or more hydrogen atoms may be substituted by a fluorine atom, or a trans-1,4-cyclohexylene group in which one or two or more hydrogen atoms may be substituted by a fluorine atom. A plurality of $A^{14}$s in one molecule may be the same or different. The compounds represented by the general formulae (Ia) to (Ih) are preferably a trans-1,4-cyclohexylene group, a 1,4-phenylene group, a 2-fluoro-1,4-phenylene group, a 3-fluoro-1,4-phenylene group, and a 3,5-difluro-1,4-phenylene group, more preferably a trans-1,4-cyclohexylene group and a 1,4-phenylene group.

In the general formulae (Ia) to (Ih), $L^{13}$ denotes —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—. In the compounds represented by the general formulae (Ia) to (Ih), $L^{23}$ preferably denotes —CH$_2$CH$_2$—, —(CH$_2$)$_4$—, —COO—, —OCO—, —CH=CH—, or —C≡C—, more preferably —CH$_2$CH$_2$—, —CH=CH—, or —C≡C—.

The compounds represented by the general formula (Ia) are preferably compounds represented by the following general formulae (Ia-1) to (Ia-3). The compounds represented by the general formula (Id) are preferably compounds represented by the following general formulae (Id-1) to (Id-3). The compounds represented by the general formula (Ib) are preferably compounds represented by the following general formulae (Ib-1) to (Ib-6). The compounds represented by the general formula (Ie) are preferably compounds represented by the following general formula (Ie-1). The compounds represented by the general formula (If) are preferably compounds represented by the following general formulae (If-1) and (If-2). In the general formulae (Ia-1) to (Ia-3), (Id-1) to (Id-3), (Ib-1) to (Ib-6), (Ie-1), and (If-1) and (If-2), $R^1$ and $R^{12}$ are the same as in the general formula (I) and independently preferably denote an alkyl group having 1 to 8 carbon atoms, an alkoxy group having 1 to 8 carbon atoms, an alkenyl group having 2 to 8 carbon atoms, or an alkenyloxy group having 3 to 16 carbon atoms, more preferably an alkyl group having 1 to 8 carbon atoms, an alkoxy group having 1 to 5 carbon atoms, or an alkenyl group having 2 to 6 carbon atoms.

[Chem. 5]

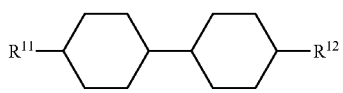
(Ia-1)

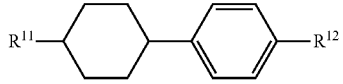
(Ia-2)

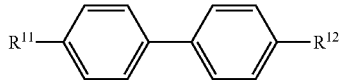
(Ia-3)

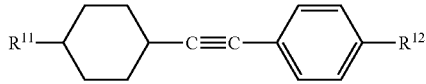
(Id-1)

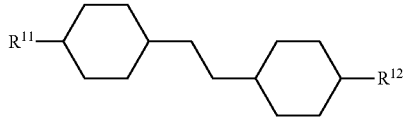
(Id-2)

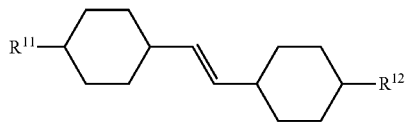
(Id-3)

[Chem. 6]

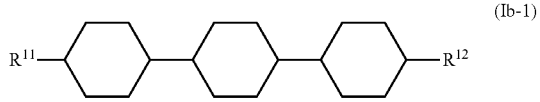
(Ib-1)

(Ib-2)

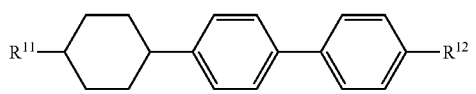
(Ib-3)

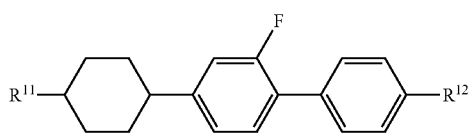
(Ib-4)

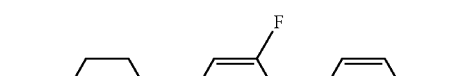
(Ib-5)

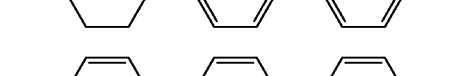
(Ib-6)

[Chem. 7]

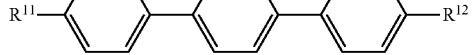
(Ie-1)

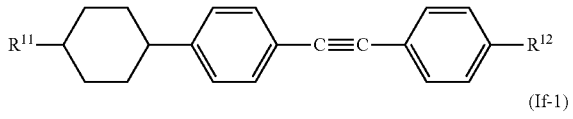
(If-1)

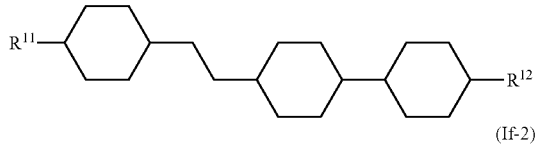
(If-2)

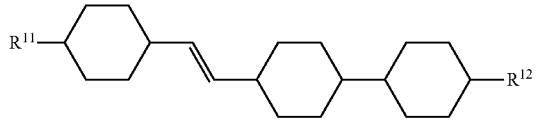

When a nematic liquid crystal composition for use in the present invention contains a compound represented by the general formula (I), the nematic liquid crystal composition may contain one compound represented by the general formula (I) or two or more compounds represented by the general formula (I) in combination. A nematic liquid crystal composition for use in the present invention preferably contains all the eight compounds represented by the general formulae (Ia) to (Ih), more preferably 1 to 6 compounds represented by the general formulae (Ia) to (Ih), still more preferably 1 to 4 compounds represented by the general formulae (Ia) to (Ih). In particular, one or two or more compounds represented by the general formula (Ia), one or two or more compounds represented by the general formula (Ib), one or two or more compounds represented by the general formula (Id), one or two or more compounds represented by the general formula (Ie), and one or two or more compounds represented by the general formula (If) are preferably contained, and one or two or more compounds represented by the general formula (Ia), one or two or more compounds represented by the general formula (Id), one or two or more compounds represented by the general formula (Ie), and one or two or more compounds represented by the general formula (If) are more preferably contained.

When a nematic liquid crystal composition for use in the present invention contains a compound represented by the general formula (I), the amount of the compound represented by the general formula (I) in the nematic liquid crystal composition ranges from 5% to 95% by mass, more preferably 10% to 90% by mass, still more preferably 15% to 60% by mass in order to consistently form a blue phase, or 40% to 85% by mass when the response speed is regarded as important.

<Compounds Represented by General Formula (II)>

The nematic liquid crystal composition for use in a material containing chiral liquid crystals of the present invention preferably contains at least one compound represented by the general formula (II). The compounds represented by the general formula (II) are liquid crystal compounds having a relatively large ΔE.

[Chem. 8]

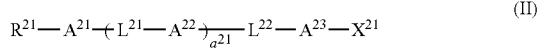

(II)

wherein $A^{21}$, $A^{22}$, $A^{23}$, and $a^{21}$ are independently the same as $R^{11}$, $A^{11}$, $A^{12}$, $A^{13}$, and $a^{11}$ in the general formula (I), $R^{21}$ denotes an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, one methylene group or two or more nonadjacent methylene groups in $R^{21}$ may be independently substituted by —O—, —S—, —CO—, —COO—, or —OCO—, and one or two or more hydrogen atoms in $R^{21}$ may be independently substituted by a fluorine atom or a chlorine atom, $L^{21}$ and $L^{22}$ independently denote a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CF$_2$O—, —CH=N—N=CH—, —CH=CH—, —CF=CF—, —C≡C—, —N=N—, —CH=N—, —SCH$_2$—, —CH$_2$S—, —CSO—, —OCS—, —CF$_2$S—, or —SCF$_2$— (in the case where there are two $L^{21}$s, they may be the same or different), and $X^{21}$ denotes a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group.

In the general formula (II), $R^{21}$ denotes an alkyl group having 1 to 16 carbon atoms, an alkoxy group having 1 to 16 carbon atoms, an alkenyl group having 2 to 16 carbon atoms, or an alkenyloxy group having 2 to 16 carbon atoms. One methylene group or two or more nonadjacent methylene groups in these groups may be independently substituted by —O—, —S—, —CO—, —COO—, or —OCO—. One or two or more hydrogen atoms in these groups may be independently substituted by a fluorine atom or a chlorine atom.

In a compound represented by the general formula (II), $R^{21}$ preferably denotes a group in which a methylene group or a hydrogen atom is not substituted. Among these, an alkyl group having 1 to 15 carbon atoms, an alkoxy group having 1 to 15 carbon atoms, an alkenyl group having 2 to 15 carbon atoms, or an alkenyloxy group having 2 to 15 carbon atoms is preferred, an alkyl group having 1 to 10 carbon atoms, an alkoxy group having 1 to 10 carbon atoms, an alkenyl group having 2 to 10 carbon atoms, or an alkenyloxy group having 2 to 10 carbon atoms is more preferred, an alkyl group having 1 to 8 carbon atoms, an alkoxy group having 1 to 8 carbon atoms, an alkenyl group having 2 to 8 carbon atoms, or an alkenyloxy group having 2 to 8 carbon atoms is still more preferred, and an alkyl group having 1 to 8 carbon atoms is still more preferred. Although $R^{21}$ may be a branched group or a linear group, a linear group is preferred.

In the general formula (II), $a^{21}$ is 0, 1, 2, or 3. In a compound represented by the general formula (II), $a^{21}$ is preferably 0 or 1.

$A^{21}$, $A^{22}$, and $A^{23}$ in the general formula (II) are the same as $A^{11}$, $A^{12}$, and $A^{13}$ in the general formula (I). More specifically, $A^{21}$, $A^{22}$, and $A^{23}$ independently denote the (a), (b), or (c) group. When $a^{21}$ is 2, and there are two $A^{22}$s, they may be the same or different.

When $A^{21}$, $A^{22}$, and $A^{23}$ in the general formula (II) denote the (a) group, the (a) group is preferably an unsubstituted trans-1,4-cyclohexylene group or a trans-1,4-cyclohexylene group in which one or two or more hydrogen atoms are independently substituted by a cyano group, a fluorine atom, or a chlorine atom, more preferably an unsubstituted 1,4-cyclohexylene group or a 1,4-cyclohexylene group in which one or two or more hydrogen atoms are independently substituted by a fluorine atom or a chlorine atom, still more preferably an unsubstituted trans-1,4-cyclohexylene group.

When $A^{21}$, $A^{22}$, and $A^{23}$ in the general formula (II) denote the (b) group, the (b) group is preferably a group represented by one of the formulae (b)-1 to (b)-7. One or two or more hydrogen atoms in these groups may be independently substituted by a cyano group, a fluorine atom, or a chlorine atom. In particular, an unsubstituted 1,4-phenylene group, a 1,4-phenylene group in which one or two or more hydrogen atoms are independently substituted by a fluorine atom or a chlorine atom, or an unsubstituted pyrimidine-2,5-diyl group is preferred.

When $A^{21}$, $A^{22}$, and $A^{23}$ in the general formula (II) denote the (c) group, the (c) group is preferably a decahydronaphthalene-2,6-diyl group, a naphthalene-2,6-diyl group, or a 1,2,3,4-tetrahydronaphthalene-2,6-diyl group. One or two or more hydrogen atoms in these groups may be independently substituted by a cyano group, a fluorine atom, or a chlorine atom. In particular, an unsubstituted decahydronaphthalene-2,6-diyl group, an unsubstituted naphthalene-2,6-diyl group, a naphthalene-2,6-diyl group in which one or two or more hydrogen atoms are independently substituted by a fluorine atom or a chlorine atom, an unsubstituted 1,2,3,4-tetrahydronaphthalene-2,6-diyl group, or a 1,2,3,4-tetrahydronaphthalene-2,6-diyl group in which one or two or more hydrogen atoms are independently substituted by a fluorine atom or a chlorine atom is preferred.

In a compound represented by the general formula (II), $A^{21}$, $A^{22}$, and $A^{23}$ independently preferably denote a trans-1,4-cyclohexylene group, a 1,4-phenylene group, a 2-fluoro-1,4-phenylene group, a 3-fluoro-1,4-phenylene group, a 3,5-difluoro-1,4-phenylene group, a decahydronaphthalene-2,6- diyl group, a naphthalene-2,6-diyl group, a 5-fluoro-naphthalene-2,6-diyl group, a 5,7-difluro-naphthalene-2,6-diyl group, a 4,5-difluro-naphthalene-2,6-diyl group, a 4,5,7-trifluoro-naphthalene-2,6-diyl group, a 1,2,3,4-tetrahydronaphthalene-2,6-diyl group, a 5-fluoro-1,2,3,4-tetrahydronaphthalene-2,6-diyl group, a 5,7-difluro-1,2,3,4-tetrahydronaphthalene-2,6-diyl group, or a pyrimidine-2,5-diyl group.

In the general formula (II), $L^{21}$ and $L^{22}$ independently denote a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CF$_2$O—, —CH=N—N=CH—, —CH=CH—, —CF=CF—, —C≡C—, —N=N—, —CH=N—, —SCH$_2$—, —CH$_2$S—, —CSO—, —OCS—, —CF$_2$S—, or —SCF$_2$—. When $a^{21}$ is 2, and there are two $L^{21}$s, they may be the same or different. In a compound represented by the general formula (II), $L^{21}$ and $L^{22}$ independently preferably denote a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=CH—, or —C≡C—, more preferably a single bond, —CH$_2$CH$_2$—, —(CH$_2$)$_4$—, —COO—, —OCO—, —OCF$_2$—, —CF$_2$O—, or —C≡C—, still more preferably a single bond, —CH$_2$CH$_2$—, —COO—, —OCF$_2$—, —CF$_2$O—, or —C≡C—, still more preferably a single bond or —COO—. In one molecule, at least one of $L^{21}$ and $L^{22}$ preferably denotes a single bond.

In the general formula (II), $X^{21}$ denotes a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group. In a compound represented by the general formula (II), $X^{21}$ preferably denotes a fluorine atom, a cyano group, a trifluoromethyl group, a fluoromethoxy group, a difluoromethoxy group, or a trifluoromethoxy group, more preferably a fluorine atom or a cyano group.

Compounds represented by the general formula (II) are preferably compounds represented by the following general formulae (IIa) to (IIc), for example. In the general formulae (IIa) to (IIc), $R^{21}$, $A^{21}$, $A^{22}$, $a^{21}$, $L^{21}$, $L^{22}$, and $X^{21}$ are the same as in the general formula (II), and $X^{22}$, $X^{23}$, $X^{24}$, $X^{25}$, $X^{26}$, $X^{27}$, and $X^{28}$ independently denote a hydrogen atom or a fluorine atom.

[Chem. 9]

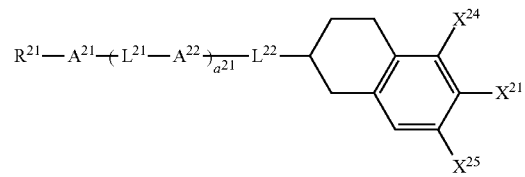

(IIa)

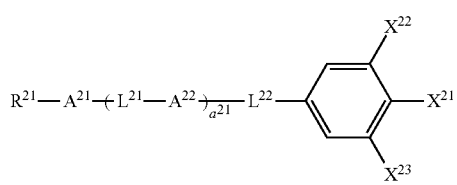

(IIb)

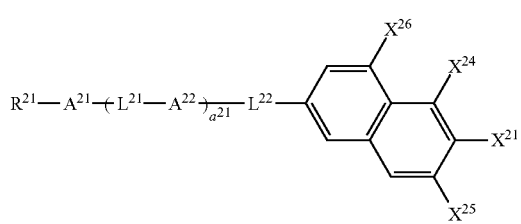

(IIc)

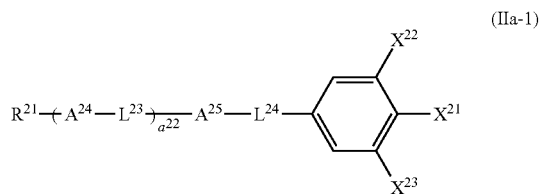

The compounds represented by the general formula (IIa) are preferably compounds represented by the following general formula (IIa-1). In the general formula (IIa-1), $R^{21}$, $X^{21}$, $X^{22}$, and $X^{23}$ are the same as in the general formula (IIa), $A^{24}$ denotes a trans-1,4-cyclohexylene group or a 1,4-phenylene group (in which one or two or more hydrogen atoms may be independently substituted by a fluorine atom or a chlorine atom), $A^{25}$ denotes a trans-1,4-cyclohexylene group, a 1,4-phenylene group, a decahydronaphthalene-2,6-diyl group, a naphthalene-2,6-diyl group, a 1,2,3,4-tetrahydronaphthalene-2,6-diyl group, or a pyrimidine-2,5-diyl group (in which one or two or more hydrogen atoms may be independently substituted by a fluorine atom or a chlorine atom), $L^{23}$ and $L^{24}$ independently denote a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=CH—, or —C≡C—, and $a^{22}$ is 0, 1, or 2. When $a^{22}$ is 2, and there are a plurality of $L^{23}$s and $A^{24}$s, they may be the same or different.

[Chem. 10]

(IIa-1)

The compounds represented by the general formula (IIa-1) are preferably the following compounds.

(1) Compounds represented by the general formula (IIa-1), wherein $a^{22}$ is 0, $A^{25}$ denotes a trans-1,4-cyclohexylene group, a 1,4-phenylene group, a 2-fluoro-1,4-phenylene group, a 3-fluoro-1,4-phenylene group, or a 3,5-difluro-1,4-phenylene group, and $L^{24}$ denotes a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=CH—, or —C≡C—.

(2) Compounds represented by the general formula (IIa-1), wherein $a^{22}$ is 0, $A^{25}$ denotes a decahydronaphthalene-2,6-diyl group, a naphthalene-2,6-diyl group, a 1,2,3,4-tetrahydronaphthalene-2,6-diyl group, or a pyrimidine-2,5-diyl group (in which one or two or more hydrogen atoms may be independently substituted by a fluorine atom or a chlorine atom), and $L^4$ denotes a single bond.

(3) Compounds represented by the general formula (IIa-1), wherein $a^{22}$ is 1, $A^{24}$ and $A^{25}$ independently denote a trans-1,4-cyclohexylene group, a 1,4-phenylene group, a 2-fluoro-1,4-phenylene group, a 3-fluoro-1,4-phenylene group, or a 3,5-difluro-1,4-phenylene group, and $L^{23}$ and $L^{24}$ independently denote a single bond, —CH$_2$CH$_2$—, —OCH$_2$—, —CH$_2$O—, —COO—, —OCO—, —OCF$_2$—, —CF$_2$O—, —CH=CH—, or —C≡C—.

(4) Compounds represented by the general formula (IIa-1), wherein $a^{22}$ is 1, $A^{24}$ denotes a trans-1,4-cyclohexylene group, a 1,4-phenylene group, a 2-fluoro-1,4-phenylene group, a 3-fluoro-1,4-phenylene group, or a 3,5-difluro-1,4-phenylene group, $A^{s5}$ denotes a decahydronaphthalene-2,6-diyl group, a naphthalene-2,6-diyl group, a 1,2,3,4-tetrahydronaphthalene-2,6-diyl group, or a pyrimidine-2,5-diyl group (in which one or two or more hydrogen atoms may be independently substituted by a fluorine atom or a chlorine atom), and $L^{23}$ and $L^{24}$ denote a single bond.

(5) Compounds represented by the general formula (IIa-1), wherein $a^{22}$ is 2, two $A^{24}$s and one $A^{25}$ independently denote a trans-1,4-cyclohexylene group, a 1,4-phenylene group, a 2-fluoro-1,4-phenylene group, a 3-fluoro-1,4-phenylene group, or a 3,5-difluoro-1,4-phenylene group, $L^{23}$ denotes a single bond, and $L^{24}$ denotes a single bond, —$CH_2CH_2$—, —$(CH_2)_4$—, —$OCH_2$—, —$CH_2O$—, —COO—, —OCO—, —$OCF_2$—, —$CF_2O$—, —CH=CH—, or —C≡C—.

More specifically, the compounds represented by the general formula (IIa-1) include compounds represented by the following general formulae (IIa-2a) to (IIa-2v), (IIa-3a) to (IIa-3x), (IIa-3'a) to (IIa-3'z), and (IIa-4a) to (IIa-4s). In the general formulae (IIa-2a) to (IIa-4s), $R^{21}$ is the same as in the general formula (IIa) and preferably denotes an alkyl group having 1 to 8 carbon atoms, an alkoxy group having 1 to 8 carbon atoms, an alkenyl group having 2 to 8 carbon atoms, or an alkenyloxy group having 3 to 16 carbon atoms, more preferably an alkyl group having 1 to 8 carbon atoms, an alkoxy group having 1 to 5 carbon atoms, or an alkenyl group having 2 to 6 carbon atoms, still more preferably an alkyl group having 1 to 8 carbon atoms. In the general formulae (IIa-2a) to (IIa-4s), $X^{21}$ is the same as in the general formula (IIa) and preferably denotes a fluorine atom, a cyano group, a trifluoromethyl group, a fluoromethoxy group, a difluoromethoxy group, or a trifluoromethoxy group, more preferably a fluorine atom or a cyano group, still more preferably a cyano group. In the general formulae (IIa-2a) to (IIa-4s), $X^{22}$ and $X^{23}$ independently denote a hydrogen atom or a fluorine atom.

[Chem. 11]

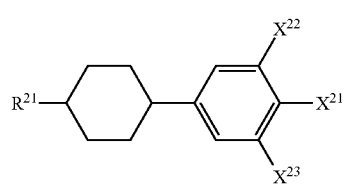

(IIa-2a)

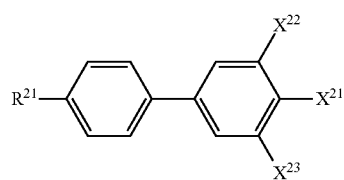

(IIa-2b)

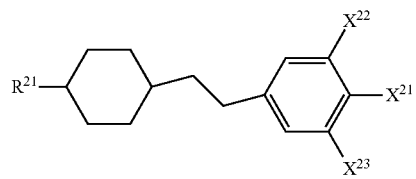

(IIa-2c)

-continued

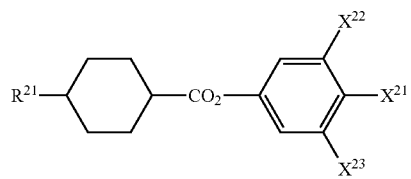

(IIa-2d)

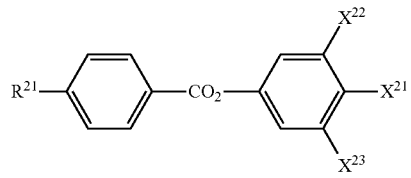

(IIa-2e)

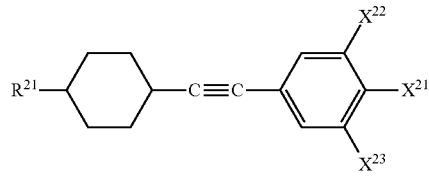

(IIa-2f)

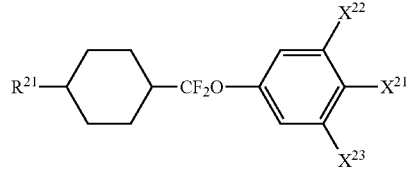

(IIa-2g)

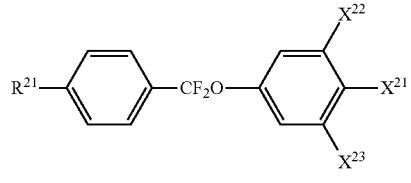

(IIa-2h)

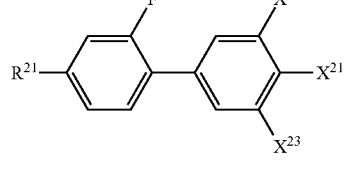

(IIa-2i)

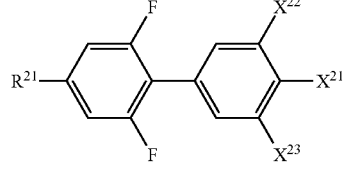

(IIa-2j)

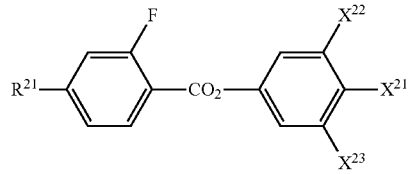

(IIa-2k)

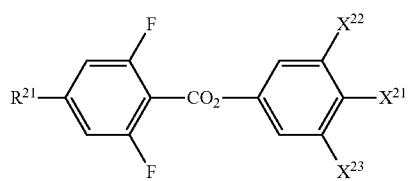 (IIa-2l)
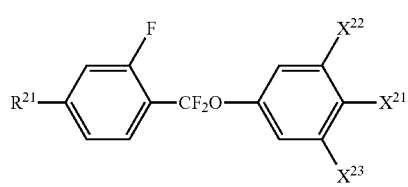 (IIa-2m)
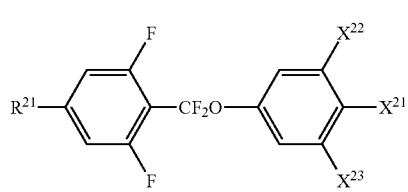 (IIa-2n)
[Chem. 12]
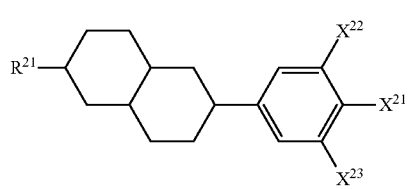 (IIa-2o)
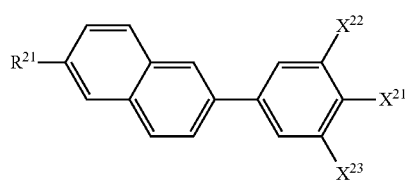 (IIa-2p)
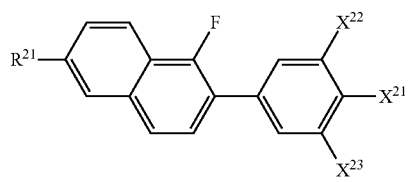 (IIa-2q)
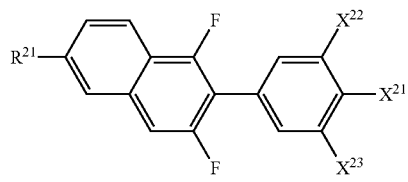 (IIa-2r)
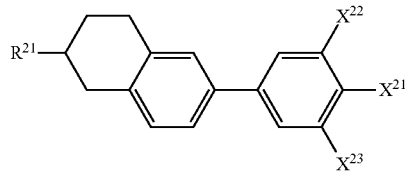 (IIa-2s)
 (IIa-2t)
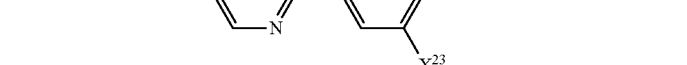 (IIa-2u)
 (IIa-2v)
[Chem. 13]
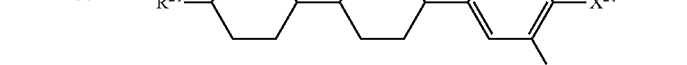 (IIa-3a)
 (IIa-3b)
 (IIa-3c)
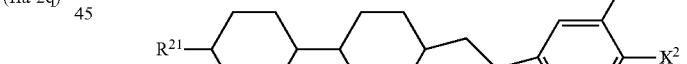 (IIa-3d)
 (IIa-3e)

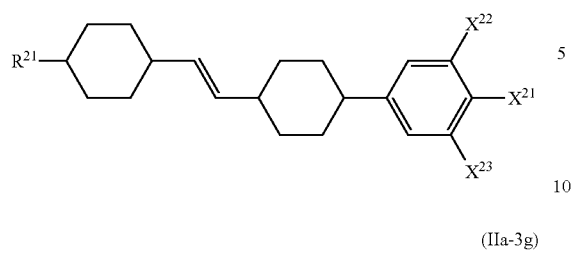
(IIa-3f)
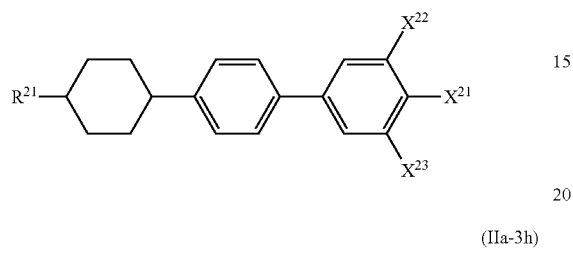
(IIa-3g)
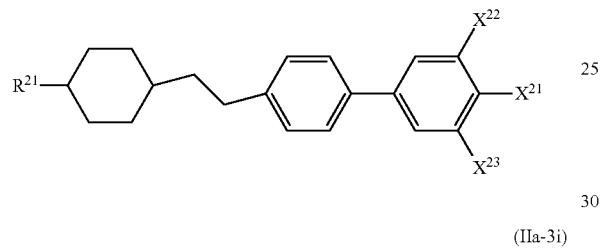
(IIa-3h)
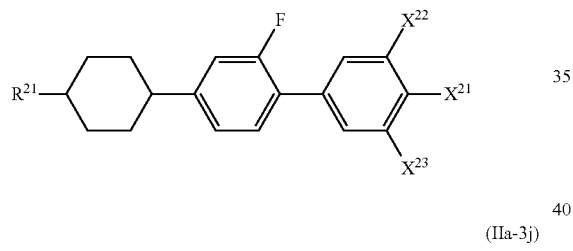
(IIa-3i)
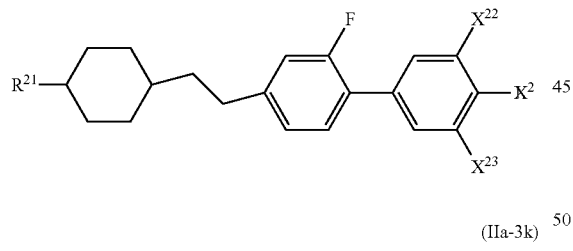
(IIa-3j)
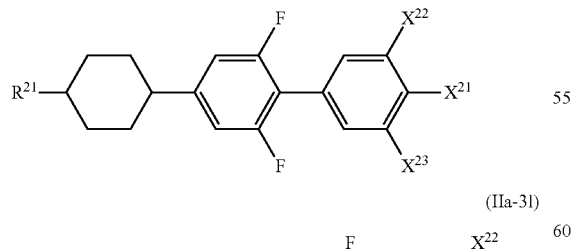
(IIa-3k)
(IIa-3l)
[Chem. 14]
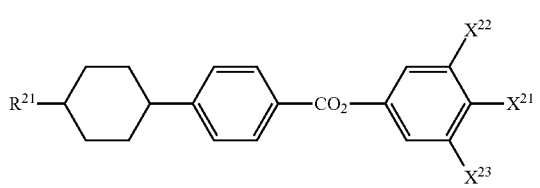
(IIa-3m)
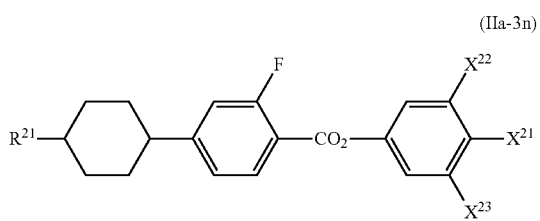
(IIa-3n)
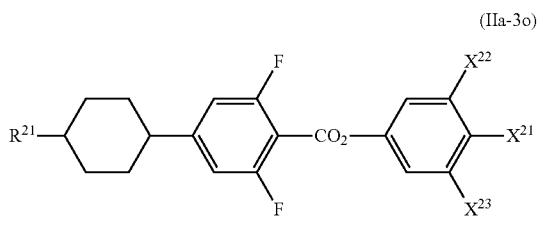
(IIa-3o)
(IIa-3p)
(IIa-3q)
(IIa-3r)
(IIa-3s)

(IIa-3t)
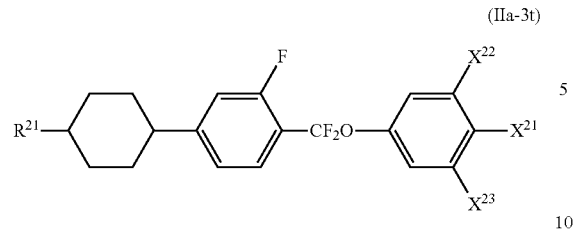
(IIa-3u)
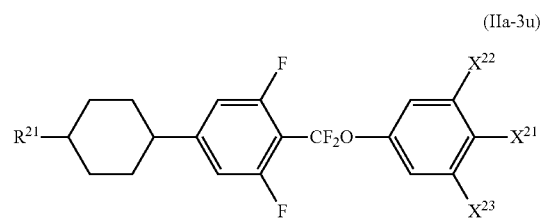
(IIa-3v)
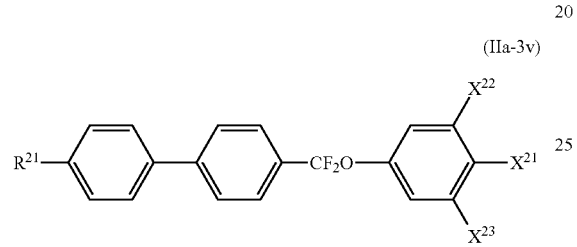
(IIa-3w)
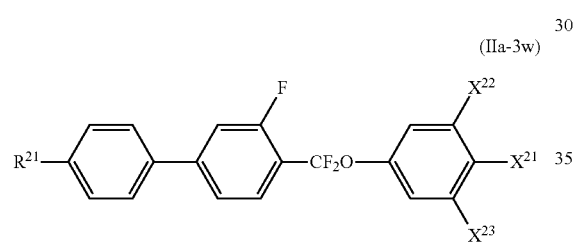
(IIa-3x)
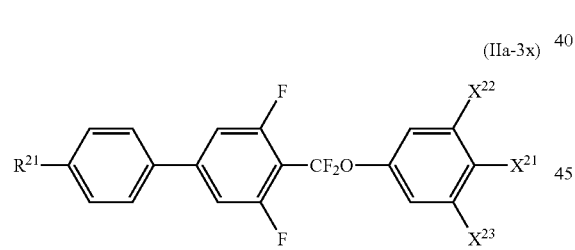
[Chem. 15]
(IIa-3′a)
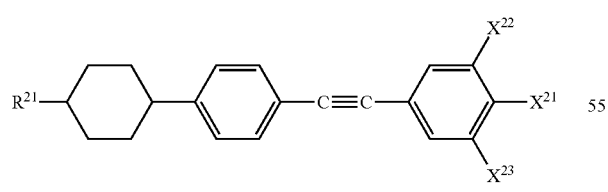
(IIa-3′b)
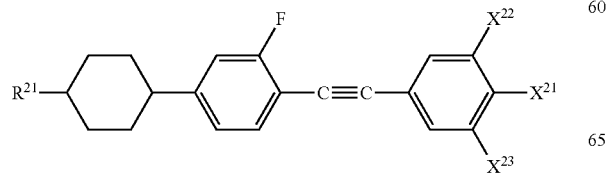
(IIa-3′c)
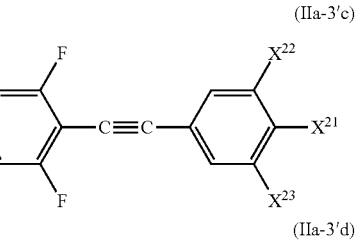
(IIa-3′d)
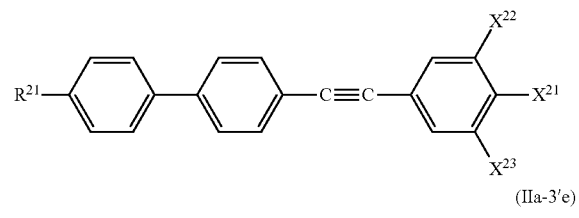
(IIa-3′e)
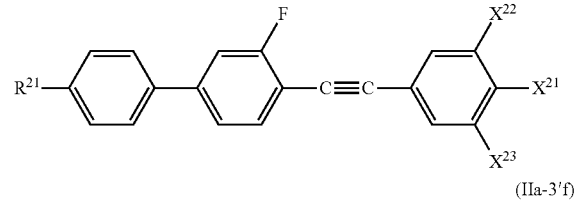
(IIa-3′f)
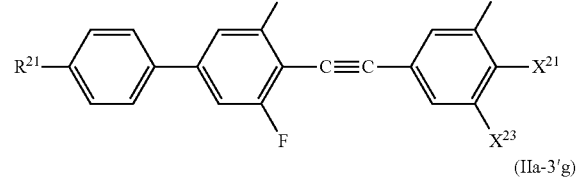
(IIa-3′g)
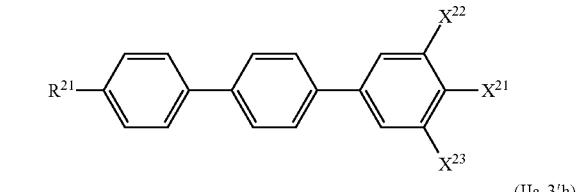
(IIa-3′h)
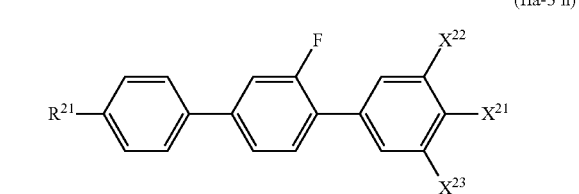
(IIa-3′i)
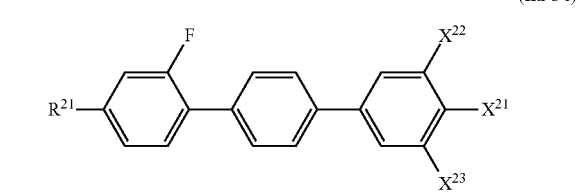
(IIa-3′j)
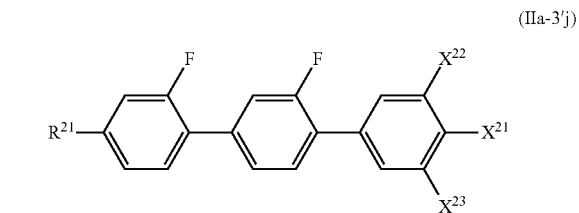

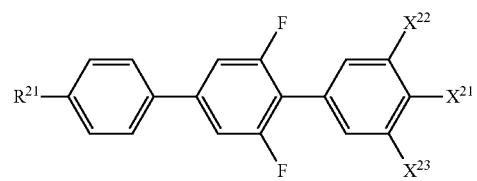
(IIa-3′k)
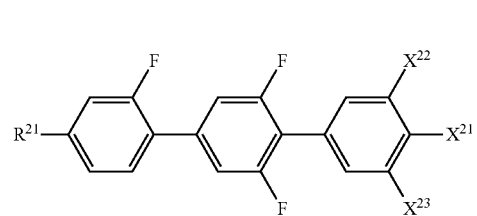
(IIa-3′l)
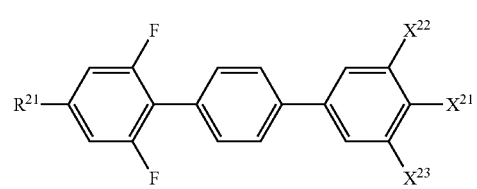
(IIa-3′m)
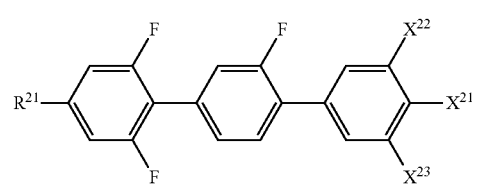
(IIa-3′n)
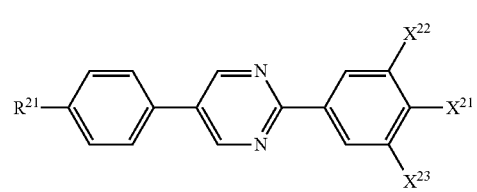
(IIa-3o)
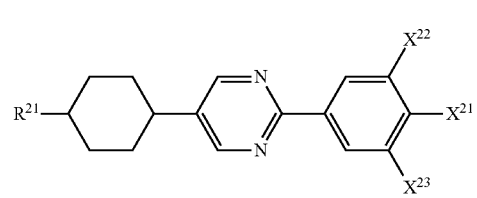
(IIa-3′p)
[Chem. 16]
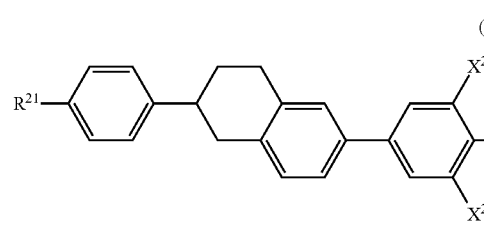
(IIa-3′q)
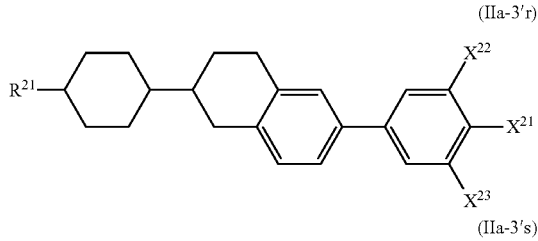
(IIa-3′r)
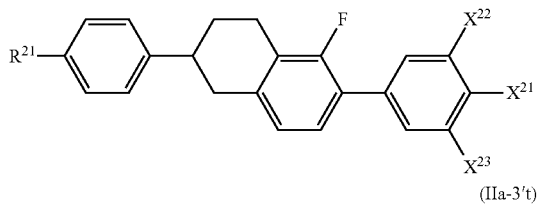
(IIa-3′s)
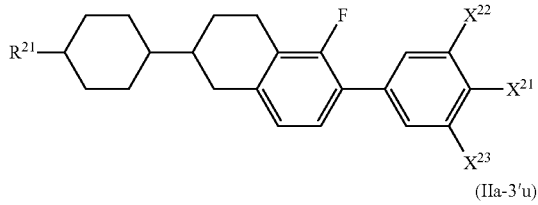
(IIa-3′t)
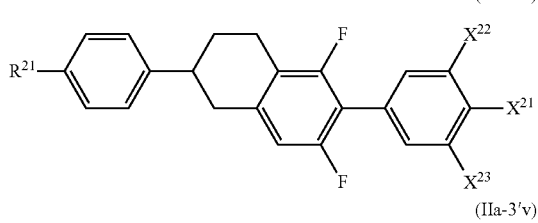
(IIa-3′u)
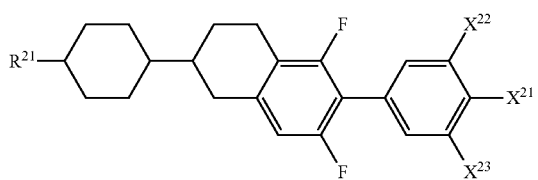
(IIa-3′v)
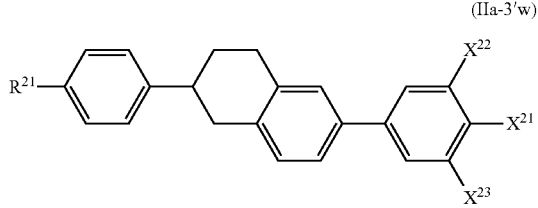
(IIa-3′w)
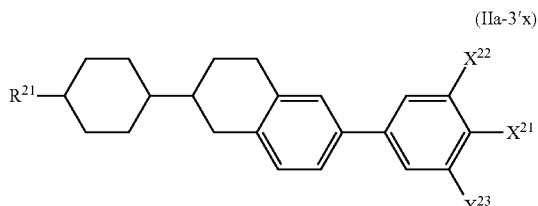
(IIa-3′x)
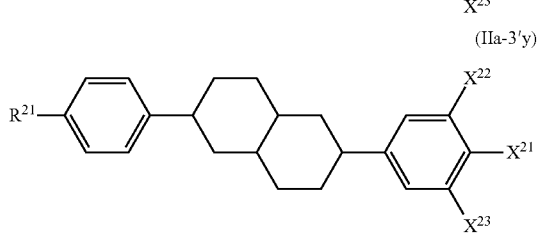
(IIa-3′y)

[Chem. 17]

(IIa-3′z), (IIa-4a), (IIa-4b), (IIa-4c), (IIa-4d), (IIa-4e), (IIa-4f), (IIa-4g), (IIa-4h), (IIa-4i)

[Chem. 18]

(ia-4j), (IIa-4k), (IIa-4l), (IIa-4m), (IIa-4n), (IIa-4o)

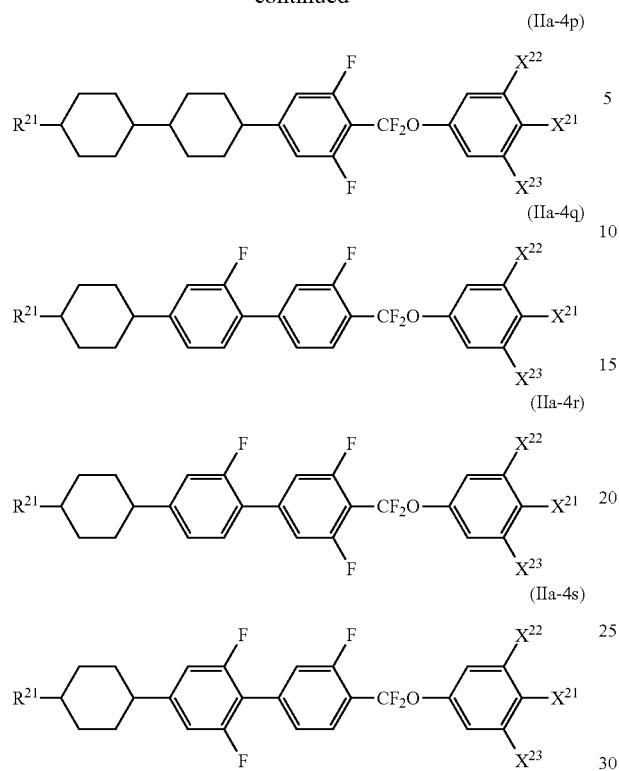

The compounds represented by the general formula (IIb) specifically include compounds represented by the following general formulae (IIb-2a) to (IIb-2c) and (IIb-3a) to (IIb-3e). The compounds represented by the general formula (IIc) specifically include compounds represented by the following general formulae (IIc-2a) to (IIc-2c) and (IIc-3a) to (IIc-3e). In the general formulae (IIb-2a) to (IIc-3e), $R^{21}$ is the same as in the general formulae (IIb) and (IIc) and preferably denotes an alkyl group having 1 to 8 carbon atoms, an alkoxy group having 1 to 8 carbon atoms, an alkenyl group having 2 to 8 carbon atoms, or an alkenyloxy group having 3 to 16 carbon atoms, more preferably an alkyl group having 1 to 8 carbon atoms, an alkoxy group having 1 to 5 carbon atoms, or an alkenyl group having 2 to 6 carbon atoms, still more preferably an alkyl group having 1 to 8 carbon atoms. In the general formulae (IIb-2a) to (IIc-3e), $X^{21}$ is the same as in the general formula (IIb) and (IIc) and preferably denotes a fluorine atom, a cyano group, a trifluoromethyl group, a fluoromethoxy group, a difluoromethoxy group, or a trifluoromethoxy group, more preferably a fluorine atom or a cyano group, still more preferably a cyano group. In the general formulae (IIb-2a) to (IIc-3e), $X^{22}$ and $X^{23}$ independently denote a hydrogen atom or a fluorine atom.

[Chem. 19]

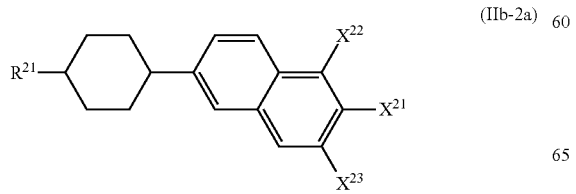

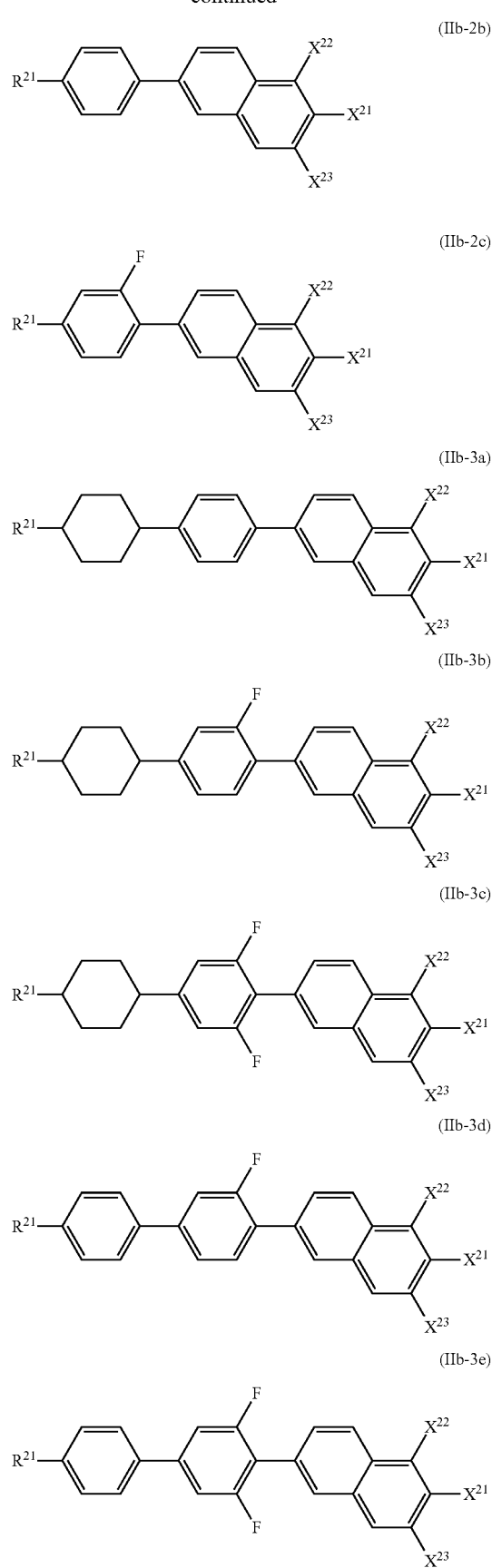

[Chem. 20]

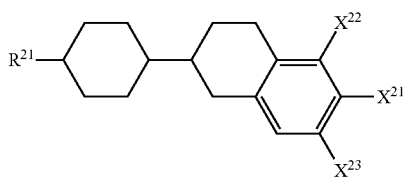
(IIc-2a)

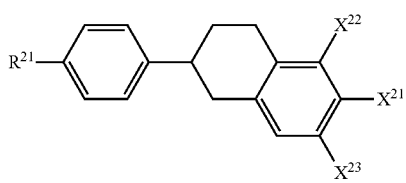
(IIc-2b)

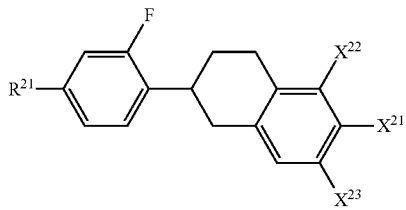
(IIc-2c)

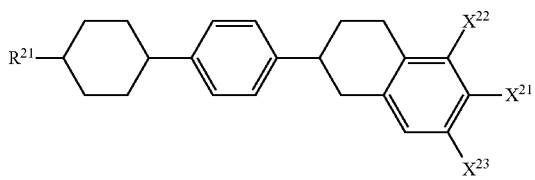
(IIc-3a)

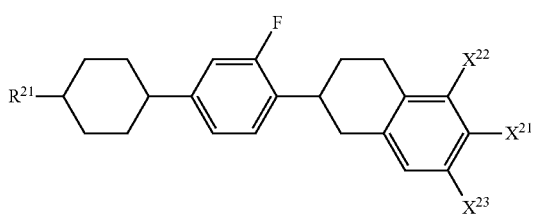
(IIc-3b)

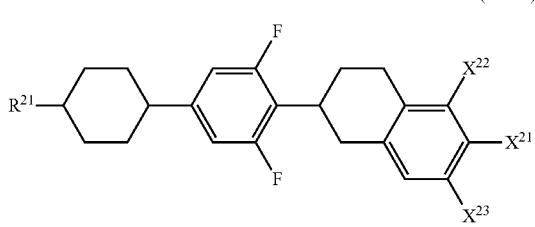
(IIc-3c)

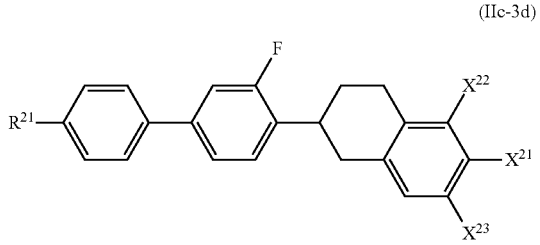
(IIc-3d)

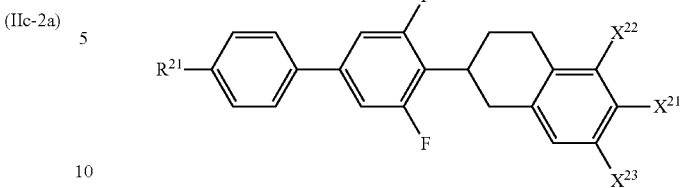
(IIc-3e)

When a nematic liquid crystal composition for use in the present invention contains a compound represented by the general formula (II), the nematic liquid crystal composition may contain one compound represented by the general formula (II) or two or more compounds represented by the general formula (II) in combination. A nematic liquid crystal composition for use in the present invention preferably contains one or two or more compounds selected from the group consisting of the compounds represented by the general formulae (IIa) to (IIc), more preferably at least one or two or more compounds represented by the general formula (IIa), still more preferably one or two or more compounds represented by the general formula (IIa-1), still more preferably one or two or more compounds selected from the group consisting of the compounds represented by the general formulae (IIa-2a) to (IIa-2v), (IIa-3a) to (IIa-3x), (IIa-3'a) to (IIa-3'z), and (IIa-4a) to (IIa-4s). Among these, one or two or more compounds of the compound group represented by the general formulae (IIa-2a) to (IIa-2v) and one or two or more compounds of the compound group represented by the general formulae (IIa-3a) to (IIa-3x) and (IIa-3'a) to (IIa-3'p) are preferably contained.

When a nematic liquid crystal composition for use in the present invention contains a compound represented by the general formula (II), the amount of the compound represented by the general formula (II) in the nematic liquid crystal composition ranges from 5% to 95% by mass, more preferably 10% to 90% by mass, still more preferably 60% to 85% by mass in order to consistently form a blue phase, or 15% to 60% by mass when the response speed is regarded as important.

A nematic liquid crystal composition for use in the present invention is preferably a composition containing at least one of a compound represented by the general formula (I) and a compound represented by the general formula (II), more preferably a composition containing both of them. In the case of the latter, more preferably, the compound represented by the general formula (I) constitutes 10% to 50% by mass, and the compound represented by the general formula (II) constitutes 50% to 90% by mass.

In a nematic liquid crystal composition for use in the present invention, the amount of liquid crystal compounds having benzene skeletons more than cyclohexane skeletons in their molecules is preferably 50% or more by mass, more preferably 60% or more by mass, of the total amount of liquid crystal compounds in the nematic liquid crystal composition. When the amount of liquid crystal compounds having benzene skeletons more than cyclohexane skeletons is increased, this facilitates the production of a liquid crystal composition that can form an optically isotropic phase, particularly a blue phase, by the addition of a chiral compound. In a particularly preferred nematic liquid crystal composition, based on the total amount of liquid crystal compounds in the nematic liquid crystal composition, the amount of liquid crystal compounds having benzene skeletons more than cyclohexane skeletons in their molecules is 50% or more by mass, and the amount of liquid crystal compounds having cyclohexane skeletons not less than benzene skeletons in their molecules ranges from 1% to 50% by mass.

The term "benzene skeleton" includes not only ring structures composed entirely of carbon atoms and hydrogen atoms (a phenyl group and a 1,4-phenylene group) but also those in which one or two or more hydrogen atoms in the ring structures are independently substituted by another group (for example, a halogen atom, an alkyl group, or an alkoxy group).

The term "cyclohexane skeleton" includes not only ring structures composed entirely of carbon atoms and hydrogen atoms (a cyclohexyl group and a trans-1,4-cyclohexylene group) but also those in which one methylene group or two or more nonadjacent methylene groups in the ring structures are substituted by an oxygen atom (for example, a 4-tetrahydropyranyl group, a 1,4-dioxanyl group, a 1,3-dioxanyl group, a tetrahydropyran-2,5-diyl group, or a 1,3-dioxane-2,5-diyl group) and those in which one or two or more hydrogen atoms in the ring structures are independently substituted by another group (for example, a halogen atom, an alkyl group, or an alkoxy group).

A nematic liquid crystal composition for use in the present invention preferably has a nematic liquid crystal phase at least in a temperature range of −10° C. to 50° C. A nematic liquid crystal composition having a nematic liquid crystal phase in a relatively low and sufficiently wide temperature range can be used to produce a material containing chiral liquid crystals that can form a blue phase in a lower and wider temperature range. As described later, when a material containing chiral liquid crystals of the present invention is produced by preparing a premixed composition of a nematic liquid crystal composition, a chiral compound, and at least one polymerizable compound and polymerizing a compound having a polymerizable group in the composition, the polymerization can be performed at a low temperature at which no unintended thermal polymerization is induced, and the production is easy to handle.

A nematic liquid crystal composition for use in the present invention may have negative or positive dielectric constant anisotropy ($\Delta\varepsilon$). In the case of negative dielectric constant anisotropy ($\Delta\varepsilon$), a fluorine atom is introduced in a direction perpendicular to the longitudinal direction of the molecule, thus resulting in low symmetry with respect to the long axis of the molecule, retarding crystallization, and lowering the melting point. Thus, negative dielectric constant anisotropy ($\Delta\varepsilon$) is preferred in terms of a wide mesomorphic temperature range. In the case of positive dielectric constant anisotropy ($\Delta\varepsilon$), the application of an electric field unidirectionally changes the refractive index along the electric field direction. Thus, positive dielectric constant anisotropy ($\Delta\varepsilon$) is preferred in terms of refractive index anisotropy. In this case, a large absolute value of dielectric constant anisotropy is preferred. A nematic liquid crystal composition having negative dielectric constant anisotropy ($\Delta\varepsilon$) can be used to produce a material containing chiral liquid crystals having negative dielectric constant anisotropy ($\Delta\varepsilon$). Likewise, a nematic liquid crystal composition having positive dielectric constant anisotropy ($\Delta\varepsilon$) can be used to produce a material containing chiral liquid crystals having positive dielectric constant anisotropy ($\Delta\varepsilon$). A nematic liquid crystal composition having a large absolute value of dielectric constant anisotropy ($\Delta\varepsilon$) can be used to produce a material containing chiral liquid crystals having a large absolute value of dielectric constant anisotropy.

[Chiral Compound]

A material containing chiral liquid crystals of the present invention contains at least one chiral compound. Such a chiral compound can induce twisted alignment of a nematic liquid crystal composition and form a cholesteric phase or blue phase having a desired pitch in the liquid crystal composition.

The term "pitch", as used herein, refers to the cycle length of the helical structure of liquid crystal molecules. A greater amount of chiral compound (% by mass) added to a nematic liquid crystal composition results in a smaller pitch ($\mu$m). It is known that the product of the amount of added chiral compound and the pitch is constant in most cases, particularly when the amount of added chiral compound is as small as approximately 1% by mass to a few percent by mass. The reciprocal of the product referred to as helical twisting power (HTP) (1/$\mu$m) is used as a parameter for determining twisted alignment induction force inherent to optically active compounds. In the following mathematical formula, "P" denotes the pitch ($\mu$m), and "C" denotes the amount of added chiral compound (% by mass).

$$HTP=1/(P\times 0.01C) \qquad [\text{Math. 1}]$$

The chiral compound may be a compound having an asymmetric atom, a compound having axial chirality, or a compound having planar chirality. The chiral compound may or may not have a polymerizable group.

The chiral compound in a material containing chiral liquid crystals of the present invention is preferably a compound having an asymmetric atom or a compound having axial chirality, particularly preferably a compound having an asymmetric atom. The compound having an asymmetric atom may be a compound having an asymmetric carbon in its side chain, a compound having an asymmetric carbon in its ring structure, or a compound having an asymmetric carbon in its side chain and in its ring structure. In a compound having an asymmetric atom, the asymmetric atom is preferably an asymmetric carbon atom because steric inversion is difficult to occur. The asymmetric atom may be a heteroatom. The asymmetric atom may be introduced into part of a chain structure or part of a ring structure. When high helical twisting power is particularly required, the chiral compound in a material containing chiral liquid crystals of the present invention is preferably a compound having axial chirality.

<Compound Having Asymmetric Atom>

More specifically, the compound having an asymmetric atom is preferably a compound represented by the general formula (Ch-I).

[Chem. 21]

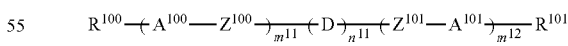

(Ch-I)

In the general formula (Ch-I), $R^{100}$ and $R^{101}$ independently denote a hydrogen atom, a cyano group, —$NO_2$, a halogen atom, —OCN, —SCN, —$SF_5$, a chiral or achiral alkyl group having 1 to 30 carbon atoms (in which one or two or more nonadjacent methylene groups may be independently substituted by —O—, —S—, —NH—, —N($CH_3$)—, —CO—, —COO—, —OCO—, —OCO—O—, —S—CO—, —CO—S—, —CH=CH—, —$CF_2$—, —CF=CH—, —CH=CF—, —CF=CF— or —C≡C—, provided that oxygen atoms or sulfur atoms are not directly bonded to each other, and one or two or more hydrogen atoms may be independently substituted by a halogen atom or a cyano group), a polymerizable group, or a chiral group having a ring structure, and at least one of $R^{100}$ and $R^{101}$ denotes a chiral alkyl group when $n^{11}$ is 0, $Z^{100}$ and $Z^{101}$ independently denote —O—, —S—, —CO—, —COO—, —OCO—, —O—COO—, —CO—N($R^{105}$)—, —N($R^{105}$)—CO—, —OCH$_2$—, —CH$_2$O—, —SCH$_5$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C—, —CH=CH—COO—, —OCO—CH=CH—, or a single bond, $A^{100}$ and $A^{101}$ independently denote (a') a trans-1,4-cyclohexylene group (in which one methylene group or two or more nonadjacent methylene groups may be independently substituted by an oxygen atom or a sulfur atom), (b') a 1,4-phenylene group (in which one —CH= or two or more nonadjacent —CH= may be substituted by a nitrogen atom), or (c') a 1,4-cyclohexenylene group, a 1,4-bicyclo[2.2.2]octylene group, an indan-2,5-diyl, a naphthalene-2,6-diyl group, a decahydronaphthalene-2,6-diyl group, and a 1,2,3,4-tetrahydronaphthalene-2,6-diyl group (in which one methylene group or two or more nonadjacent methylene groups may be independently substituted by an oxygen atom or a sulfur atom, and one —CH= or two or more nonadjacent —CH= may be substituted by a nitrogen atom), when there are a plurality of $A^{100}$s or $A^{101}$s, they may be the same or different, $n^{11}$ is 0 or 1, when $n^{11}$ is 0, $m^{12}$ is 0, and $m^{11}$ is 0, 1, 2, 3, 4, or 5, and when $n^{11}$ is 1, $m^{11}$ and $m^{12}$ are independently 0, 1, 2, 3, 4, or 5, and D denotes a divalent group represented by one of the following formulae (D1) to (D4) (wherein an asterisk (*) denotes a chiral carbon atom, and a site marked with a filled circle is bonded to $Z^{101}$ (or $R^{100}$) or $Z^{101}$ (or $R^{100}$)).

[Chem. 22]

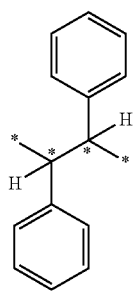
(D1)

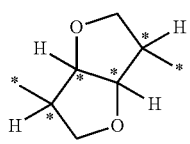
(D2)

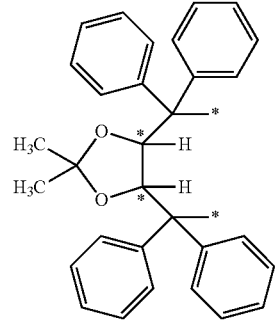
(D3)

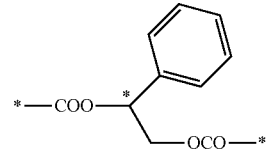
(D4)

In the general formula (Ch-I), $R^{100}$ and $R^{101}$ independently denote a hydrogen atom, a cyano group, —NO$_2$, a halogen atom, —OCN, —SCN, —SF$_5$, a chiral or achiral alkyl group having 1 to 30 carbon atoms, a polymerizable group, or a chiral group having a ring structure. When $n^{11}$ is 0, at least one of $R^{100}$ and $R^{101}$ denotes a chiral alkyl group.

When $R^{100}$ or $R^{101}$ in the general formula (Ch-I) is a chiral or achiral alkyl group having 1 to 30 carbon atoms, one or two or more nonadjacent methylene groups (—CH$_2$—) in the alkyl group may be independently substituted by —O—, —S—, —NH—, —N(CH$_3$)—, —CO—, —COO—, —OCO—, —OCO—O—, —S—CO—, —CO—S—, —CH=CH—, —CF—, —CF=CH—, —CH=CF—, —CF=CF— or C≡C—, provided that oxygen atoms or sulfur atoms are not directly bonded to each other, and one or two or more hydrogen atoms in the alkyl group may be independently substituted by a halogen atom or a cyano group. The alkyl group may be a linear group, a branched group, or a group having a ring structure.

The chiral alkyl group is preferably a group represented by one of the following general formulae (Ra) to (Rk). In the general formulae (Ra) to (Rk), an asterisk (*) denotes a chiral carbon atom. When $R^{100}$ or $R^{101}$ is one of these groups, the left end of each group is bonded to $A^{100}$ (or D or $Z^{101}$) or $A^{101}$ (or D or $Z^{100}$)

[Chem. 23]

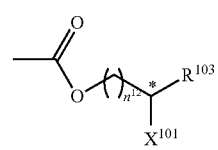
(Ra)

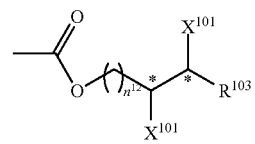
(Rb)

-continued

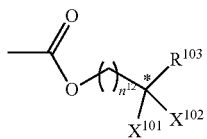
(Rc)

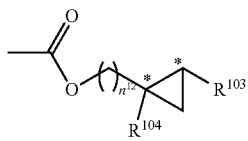
(Rd)

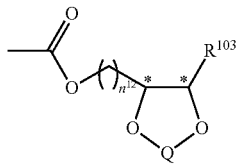
(Re)

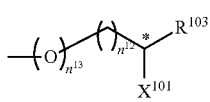
(Rf)

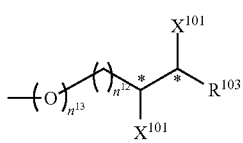
(Rg)

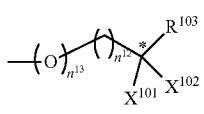
(Rh)

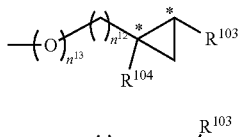
(Ri)

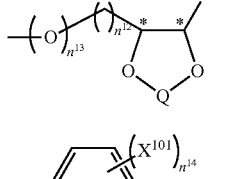
(Rj)

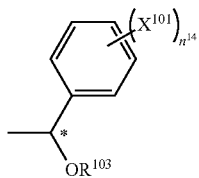
(Rk)

In the general formulae (Ra) to (Rk), $R^{103}$ and $R^{104}$ independently denote a linear or branched alkyl group having 1 to 12 carbon atoms or a hydrogen atom. In the general formulae (Ra), (Rb), (Rd), (Re), (Rf), (Rg), (Ri), and (Rj), $R^{103}$ denotes a linear or branched alkyl group having 1 to 10 carbon atoms so that a carbon atom to which $R^{103}$ is bonded (a position marked with *) will be an asymmetric atom. One or two or more methylene groups of the alkyl group may be independently substituted by —O—, —S—, —NH—, —N(CH$_3$)—, —CO—, —CO—O—, —O—CO—, —O—CO—O—, —S—CO—, —CO—S—, —O—SO$_2$—, —SO$_2$—O—, —CH=CH—, —C≡C—, a cyclopropylene group, or —Si(CH$_3$)$_2$—, provided that oxygen atoms or sulfur atoms are not directly bonded to each other, and one or more hydrogen atoms of the alkyl group may be independently substituted by a halogen atom (for example, a fluorine atom, a chlorine atom, or a bromine atom) or a cyano group. The alkyl group may have a polymerizable group. The polymerizable group may be a vinyl group, an allyl group, or a (meth)acryloyl group.

$R^{103}$ in the general formulae (Ra) to (Rj) preferably denotes a (unsubstituted) linear or branched alkyl group having 1 to 12 carbon atoms in which the methylene groups and the hydrogen atoms are not substituted by another group, more preferably an unsubstituted linear or branched alkyl group having 1 to 8 carbon atoms, still more preferably an unsubstituted linear alkyl group having 1 to 6 carbon atoms.

$R^{104}$ in the general formula (Rd) or (Ri) preferably denotes a hydrogen atom or an unsubstituted linear or branched alkyl group having 1 to 5 carbon atoms, more preferably a hydrogen atom or an unsubstituted linear alkyl group having 1 to 3 carbon atoms, still more preferably a hydrogen atom or a methyl group.

In the general formulae (Ra) to (Rk), $n^{12}$ is an integer in the range of 0 to 20, preferably an integer in the range of 0 to 10, more preferably an integer in the range of 0 to 5, still more preferably 0.

In the general formulae (Ra) to (Rk), $n^{13}$ is 0 or 1.

In the general formula (Rk), $n^1$ is an integer in the range of 0 to 5.

In the general formulae (Ra) to (Rk), $X^{101}$ and $X^{102}$ independently denote a halogen atom (a fluorine atom, a chlorine atom, a bromine atom, or an iodine atom), a cyano group, a phenyl group (in which one or two or more hydrogen atoms may be independently substituted by a halogen atom, a methyl group, a methoxy group, a trifluoromethyl group (—CF$_3$), or a trifluoromethoxy group (—OCF$_3$)), an alkyl group having 1 to 6 carbon atoms, an alkoxy group having 1 to 6 carbon atoms, a trifluoromethyl group, or a trifluoromethoxy group. In the general formulae (Ra), (Rb), (Rc), (Rf), (Rg), and (Rh), $X^{101}$ and $R^{103}$ denote different groups so that a carbon atom to which $X^{101}$ is bonded (a position marked with *) will be an asymmetric atom. In the general formulae (Rc) and (Re), $X^{101}$ and $X^{102}$ denote different groups so that a carbon atom to which $X^{101}$ is bonded (a position marked with *) will be an asymmetric atom.

$X^{101}$ and $X^{102}$ in the general formulae (Ra), (Rb), (Rc), (Rf), (Rg), (Rh), and (Rk) independently preferably denote a halogen atom, a phenyl group (in which one or two or more hydrogen atoms may be independently substituted by a halogen atom, a methyl group, a methoxy group, a trifluoromethyl group, or a trifluoromethoxy group), a methyl group, a methoxy group, a trifluoromethyl group, or a trifluoromethoxy group. In particular, $X^{101}$ and $X^{102}$ in the general formulae (Ra), (Rb), (Rc), (Rf), (Rg), and (Rh) independently more preferably denote a phenyl group (in which one or two hydrogen atoms may be independently substituted by a halogen atom, a methyl group, a methoxy group, a trifluoromethyl group, or a trifluoromethoxy group), still more preferably an unsubstituted phenyl group. $X^{101}$ in the general formula (Rk) more preferably denotes a halogen atom, a cyano group, an alkyl group, an alkoxy group, a trifluoromethyl group, or a trifluoromethoxy group, still more preferably a halogen atom, a methyl group, a trifluoromethyl group, or a trifluoromethoxy group.

In the general formulae (Re) and (Rj), Q denotes a divalent hydrocarbon group. The divalent hydrocarbon group may be linear or branched or may be a group having a ring structure. The number of carbon atoms in the divalent hydrocarbon group preferably ranges from 1 to 16, more preferably 1 to 10, still more preferably 1 to 6. In the divalent hydrocarbon group, one carbon atom preferably forms a single bond with each of two oxygen atoms in the general formulae (Re) and (Rj). In this case, in the general formulae (Re) and (Rj), two carbon atoms marked with an asterisk, two oxygen atoms bonded to the two carbon atoms, and one carbon atom in Q form a 5-membered ring. More specifically, the divalent hydrocarbon group may be an unsubstituted methylene group or a methylene group in which one or two hydrogen atoms are substituted by a hydrocarbon group, a cyclopropylidene group, a cyclobutylidene group, a cyclopentylidene group, a cyclohexylidene group, preferably a methylene group, an isopropylidene group, or a cyclohexylidene group.

The group represented by one of the general formulae (Ra) to (Rk) is preferably a group represented by the general formula (Ra) or (Rf). In a group represented by the general formula (Ra), preferably, $n^{12}$ is an integer in the range of 0 to 5, $X^{101}$ denotes a phenyl group (in which one or two or more hydrogen atoms may be independently substituted by a halogen atom, a methyl group, a methoxy group, a trifluoromethyl group, or a trifluoromethoxy group), and $R^{103}$ denotes an unsubstituted linear or branched alkyl group having 1 to 6 carbon atoms, and, more preferably, $n^{12}$ is an integer in the range of 0 to 5, $X^{101}$ denotes an unsubstituted phenyl group, and $R^{103}$ denotes an unsubstituted linear or branched alkyl group having 1 to 6 carbon atoms. In a group represented by the general formula (Rf), preferably, $n^{12}$ is an integer in the range of 0 to 5, $n^{13}$ is 0 or 1, X103 denotes a halogen atom, a methyl group, or a trifluoromethyl group, and $R^{103}$ denotes an unsubstituted linear alkyl group having 2 to 12 carbon atoms.

In particular, $R^{100}$ or $R^{101}$ in a compound represented by the general formula (Ch-I) preferably denotes a group represented by one of the following formulae (Ra-1) to (Ra-3) and (Rf-1) to (Rf-3). When $R^{100}$ or $R^{101}$ is one of these groups, the left end of each group is bonded to $A^{100}$ (or D or $Z^{101}$) or $A^{101}$ (or D or $Z^{100}$). An asterisk denotes a chiral carbon atom.

[Chem. 24]

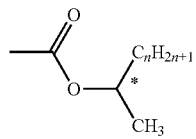
(Ra-1)

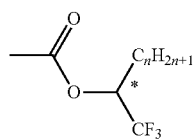
(Ra-2)

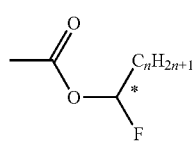
(Ra-3)

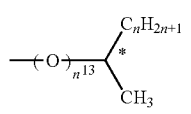
(Rf-1)

-continued

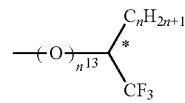
(Rf-2)

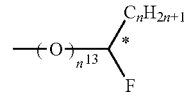
(Rf-3)

In the general formulae (Rf-1) to (Rf-3), $n^{13}$ is 0 or 1. In the general formulae (Ra-1) to (Ra-3) and (Rf-1) to (Rf-3), n is an integer in the range of 2 to 12. In the general formulae (Ra-1) to (Ra-3) and (Rf-1) to (Rf-3), n is preferably an integer in the range of 3 to 8, more preferably 4, 5, or 6.

When $R^{100}$ or $R^{101}$ in the general formula (Ch-I) is a polymerizable group, the polymerizable group is preferably a group having a structure represented by one of the following formulae (R-1) to (R-16). The right end of each group represented by the formulae (R-1) to (R-14) and (R-16) and the left end of the group represented by the formula (R-15) are bonded to $A^{100}$ (or D or $Z^{101}$) or $A^{101}$ (or D or $Z^{100}$).

[Chem. 25]

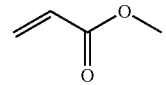
(R-1)

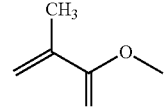
(R-2)

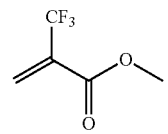
(R-3)

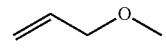
(R-4)

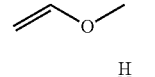
(R-5)

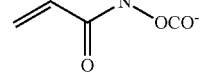
(R-6)

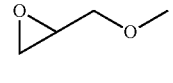
(R-7)

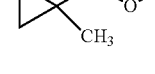
(R-8)

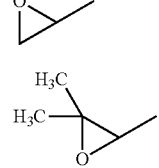
(R-9)

(R-10)

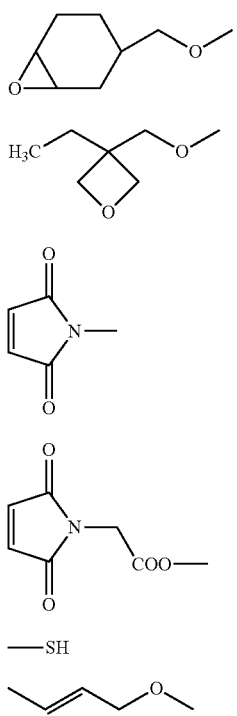

These polymerizable groups are cured by radical polymerization, radical addition polymerization, cationic polymerization, or anionic polymerization. In particular, when the polymerization method is ultraviolet polymerization, a group represented by the formula (R-1), (R-2), (R-4), (R-5), (R-7), (R-11), (R-13), (R-15), or (R-16) is preferred, a group represented by the formula (R-1), (R-2), (R-7), (R-11), (R-13), or (R-16) is more preferred, and a group represented by the formula (R-1), (R-2), or (R-16) is still more preferred.

When $R^{100}$ or $R^{101}$ in the general formula (Ch-I) is a chiral group having a ring structure, the ring structure of the group may be aromatic or aliphatic. The ring structures of alkyl groups include a monocyclic structure, a fused ring structure, or a spirocyclic structure, and contain one or two or more heteroatoms.

In the general formula (Ch-I), $Z^{100}$ and $Z^{101}$ independently denote —O—, —S—, —CO—, —COO—, —OCO—, —O—COO—, —CO—N($R^{105}$)—, —N($R^{105}$)—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C—, —CH=CH—COO—, —OCO—CH=CH—, or a single bond. $R^{105}$ in —CO—N($R^{105}$)— or —N($R^{105}$)—CO— denotes a linear or branched alkyl group having 1 to 12 carbon atoms, preferably a linear or branched alkyl group having 1 to 6 carbon atoms, more preferably a linear alkyl group having 1 to 4 carbon atoms. When $m^{11}$ is an integer of 2 or more, and one molecule includes a plurality of $Z^{100}$s, they may be the same or different. Likewise, when $m^{12}$ is an integer of 2 or more, and one molecule includes a plurality of $Z^{101}$s, they may be the same or different. In a compound represented by the general formula (Ch-I), $Z^{100}$ and $Z^{101}$ independently preferably denote —CF$_2$O—, —OCF$_2$—, —CF$_2$CF$_2$—, —CF=CF—, —COO—, —OCO—, —CH$_2$—CH$_2$—, —C≡C—, or a single bond.

In the general formula (Ch-I), $A^{100}$ and $A^{101}$ independently denote the following (a'), (b'), or (c') group. When $m^{11}$ is an integer of 2 or more, and one molecule includes a plurality of $Au^{100}$s, they may be the same or different. Likewise, when $m^{12}$ is an integer of 2 or more, and one molecule includes a plurality of $A^{101'}$s, they may be the same or different.

(a') A trans-1,4-cyclohexylene group (in which one methylene group or two or more nonadjacent methylene groups may be independently substituted by an oxygen atom or a sulfur atom).

(b') A 1,4-phenylene group (in which one —CH= or two or more nonadjacent —CH= may be substituted by a nitrogen atom).

(c') A 1,4-cyclohexenylene group, a 1,4-bicyclo[2.2.2]octylene group, an indan-2,5-diyl, a naphthalene-2,6-diyl group, a decahydronaphthalene-2,6-diyl group, and a 1,2,3,4-tetrahydronaphthalene-2,6-diyl group (in which one methylene group or two or more nonadjacent methylene groups may be independently substituted by an oxygen atom or a sulfur atom, and one —CH= or two or more nonadjacent —CH= may be substituted by a nitrogen atom).

The (a'), (b'), and (c') groups may be unsubstituted, and one or two or more hydrogen atoms in the groups may be independently substituted by a halogen atom, a cyano group, a nitro group, an alkyl group having 1 to 7 carbon atoms (in which one or two or more hydrogen atoms may be independently substituted by a fluorine atom or a chlorine atom), an alkoxy group having 1 to 7 carbon atoms (in which one or two or more hydrogen atoms may be independently substituted by a fluorine atom or a chlorine atom), an alkylcarbonyl group having 1 to 7 carbon atoms (in which one or two or more hydrogen atoms may be independently substituted by a fluorine atom or a chlorine atom), or an alkoxycarbonyl group having 1 to 7 carbon atoms (in which one or two or more hydrogen atoms may be independently substituted by a fluorine atom or a chlorine atom).

$A^{100}$ and $A^{101}$ in a compound represented by the general formula (Ch-I) are preferably the (a') group or the (b') group, more preferably an unsubstituted trans-1,4-cyclohexylene group, an unsubstituted 1,4-phenylene group, a trans-1,4-cyclohexylene group in which one or two or more hydrogen atoms are independently substituted by a fluorine atom, a chlorine atom, a cyano group, an alkyl group having 1 to 4 carbon atoms, an alkoxy group having 1 to 4 carbon atoms, an alkylcarbonyl group having 1 to 4 carbon atoms, or an alkoxycarbonyl group having 1 to 4 carbon atoms, or 1,4-phenylene group in which one or two or more hydrogen atoms are independently substituted by a fluorine atom, a chlorine atom, a cyano group, an alkyl group having 1 to 4 carbon atoms, an alkoxy group having 1 to 4 carbon atoms, an alkylcarbonyl group having 1 to 4 carbon atoms, or an alkoxycarbonyl group having 1 to 4 carbon atoms, still more preferably an unsubstituted trans-1,4-cyclohexylene group or an unsubstituted 1,4-phenylene group, still more preferably an unsubstituted 1,4-phenylene group.

In the general formula (Ch-I), $n^{11}$ is 0 or 1.

When $n^{11}$ is 0, $m^{12}$ is 0, and $m^{11}$ is 0, 1, 2, 3, 4, or 5. When $n^{11}$ and $m^{12}$ are 0, $m^{11}$ is preferably 1, 2, 3, or 4, more preferably 1, 2, or 3.

When $n^{11}$ is 1, $m^{11}$ and $m^{12}$ are independently 0, 1, 2, 3, 4, or 5, preferably 1, 2, 3, or 4, more preferably 1, 2, or 3. When $n^{11}$ is 1, $m^{11}$ and $m^{12}$ may be different but are preferably the same.

In the general formula (Ch-I), D denotes a divalent group represented by one of the formulae (D1) to (D4). In the formulae (D1) to (D4), a site marked with a filled circle is bonded to $Z^{101}$ (or $R^{100}$) or $Z^{101}$ (or $R^{100}$).

In a group represented by (D1), (D3), or (D4), one or two or more hydrogen atoms of the benzene rings may be independently substituted by a halogen atom (F, Cl, Br, or I), an alkyl group having 1 to 20 carbon atoms, or an alkoxy group having 1 to 20 carbon atoms. In an alkyl or alkoxy group having 1 to 20 carbon atoms that can act as a substituent for hydrogen atoms in the benzene rings, one or two or more hydrogen atoms of the group may be substituted by a fluorine atom, and one or two or more methylene groups in the group may be independently substituted by —O—, —S—, —COO—, —OCO—, —CF$_2$—, —CF=CH—, —CH=CF—, —CF=CF—, or —C≡C—, provided that oxygen atoms or sulfur atoms are not directly bonded to each other.

In the compounds represented by the general formula (Ch-I) wherein $n^{11}$ is 0, a partial structure of the compound excluding $R^{100}$ and $R^{101}$ at each end is preferably represented by one of the following general formulae (b1) to (b13). One end of the structure represented by one of the general formulae (b1) to (b13) is bonded to $R^{100}$, and the other end is bonded to $R^{101}$. In the compounds having these structures, at least one of $R^{100}$ and $R^{101}$ is a chiral alkyl group.

[Chem. 26]

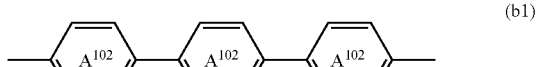
(b1)

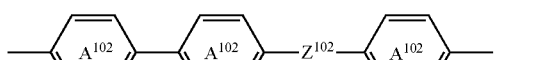
(b2)

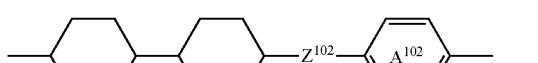
(b3)

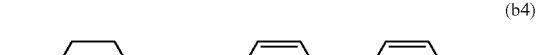
(b4)

(b5)

(b6)

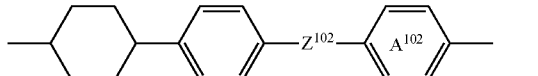
(b7)

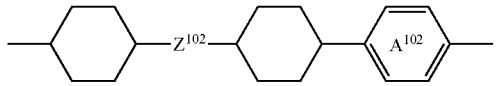
(b8)

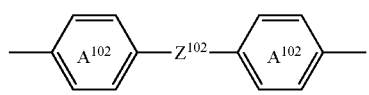
(b9)

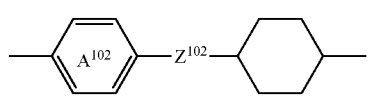
(b10)

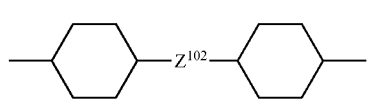
(b11)

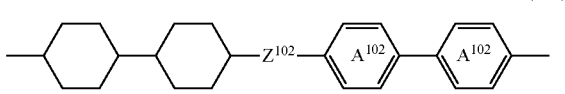
(b12)

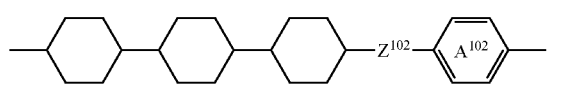
(b13)

In the general formulae (b1) to (b13), $Z^{102}$ is the same as $Z^{100}$ and $Z^{101}$ in the general formula (Ch-I).

In the general formulae (b1) to (b13), $A^{102}$ denotes a 1,4-phenylene group (in which one —CH= or two or more nonadjacent —CH= may be substituted by a nitrogen atom, and one or two or more hydrogen atoms may be independently substituted by a halogen atom, a methyl group, a methoxy group, a trifluoromethyl group, or a trifluoromethoxy group). Substitution of —CH= or hydrogen atoms in the 1,4-phenylene group allows the control of the decrease in crystallinity and the direction and magnitude of dielectric anisotropy in a liquid crystal composition containing the compound.

In terms of reliability, compounds in which the ring structure in $A^{102}$ is a benzene ring (a compound in which —CH= in the 1,4-phenylene group is not substituted by a nitrogen atom) are preferred over compounds in which the ring structure in $A^{102}$ is a heterocycle, such as a pyridine ring or a pyrimidine ring (compounds in which one —CH= or two or more nonadjacent —CH= in the 1,4-phenylene group are substituted by a nitrogen atom). In terms of high dielectric constant anisotropy, compounds in which the ring structure in $A^{102}$ is a heterocycle, such as a pyridine ring or a pyrimidine ring, are preferred over compounds in which the ring structure in $A^{102}$ is a benzene ring. Although compounds having a hydrocarbon ring, such as a benzene ring or a cyclohexane ring, have relatively low polarizability, compounds having a heterocycle, such as a pyridine ring or a pyrimidine ring, have relatively high polarizability and are preferred in order to decrease crystallinity and stabilize liquid crystallinity.

The compounds represented by the general formula (Ch-I) wherein $n^{11}$ and $m^{12}$ are 0 are preferably represented by the following general formulae (Ch-I-1) to (Ch-I-30). In the general formulae (Ch-I-1) to (Ch-I-30), $R^{100}$, $R^{101}$, and $Z^{100}$ are the same as $R^{100}$, $R^{101}$, and $Z^{101}$ in the general formula (Ch-I), at least one of $R^{100}$ and $R^{101}$ denotes a chiral alkyl group, and $L^{100}$ to $L^{105}$ independently denote a hydrogen atom or a fluorine atom.

[Chem. 27]
(Ch-I-1)
(Ch-I-2)
(Ch-I-3)
(Ch-I-4)
(Ch-I-5)
(Ch-I-6)
(Ch-I-7)
(Ch-I-8)
[Chem. 28]
(Ch-I-9)
(Ch-I-10)
(Ch-I-11)
(Ch-I-12)
(Ch-I-13)
(Ch-I-14)
[Chem. 29]
(Ch-I-15)
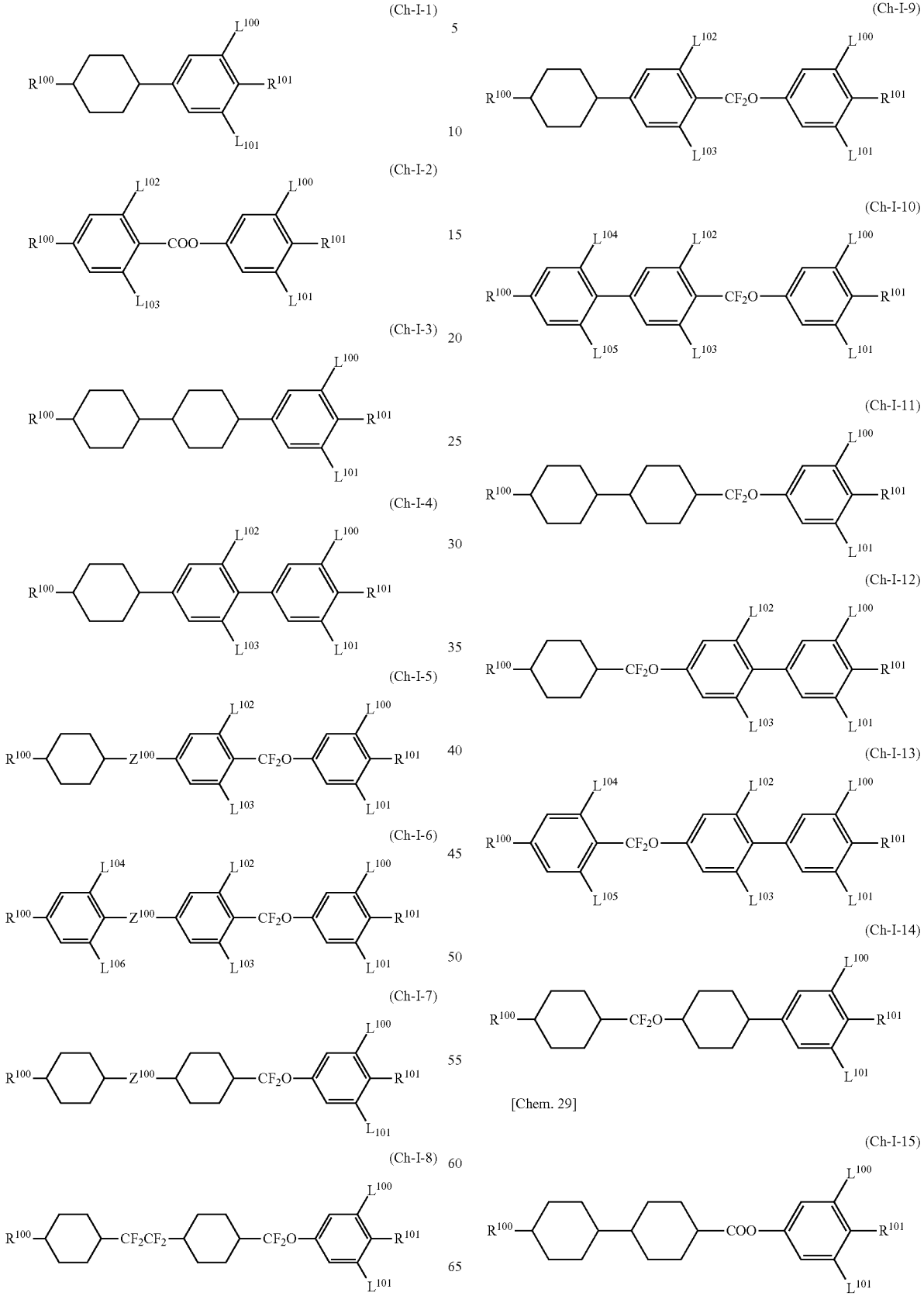

(Ch-I-16)
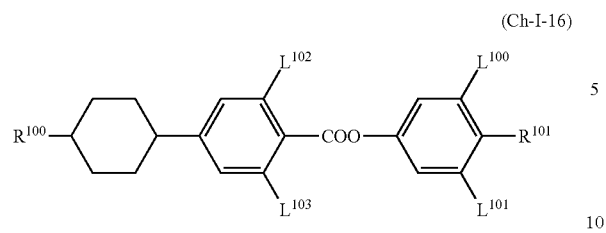

(Ch-I-17)
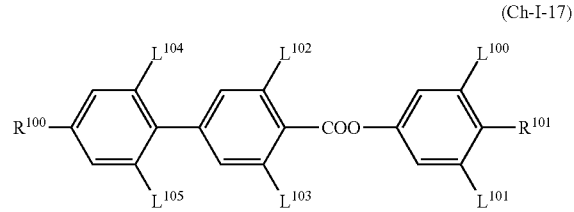

(Ch-I-18)
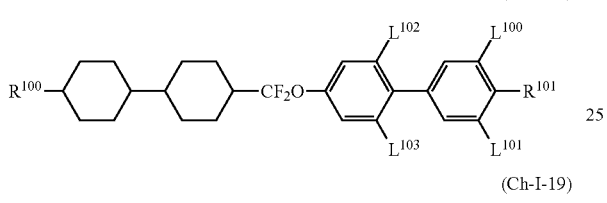

(Ch-I-19)
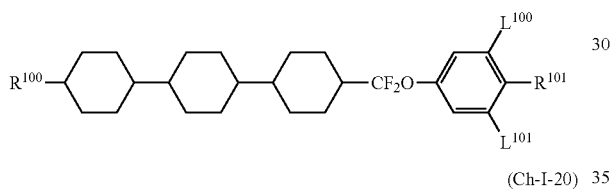

(Ch-I-20)
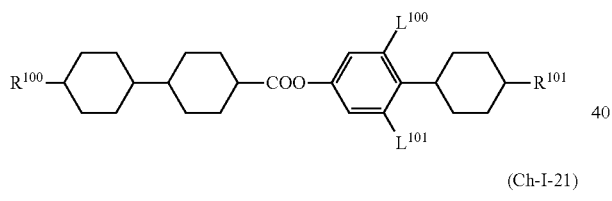

(Ch-I-21)
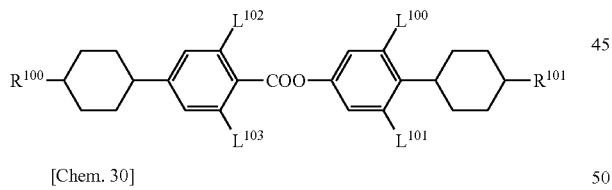

[Chem. 30]

(Ch-I-22)
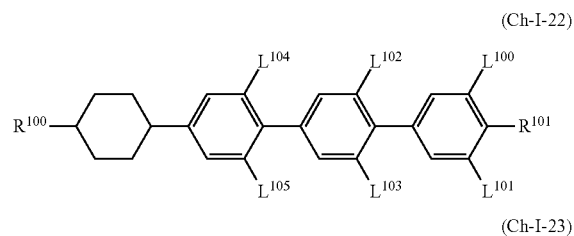

(Ch-I-23)
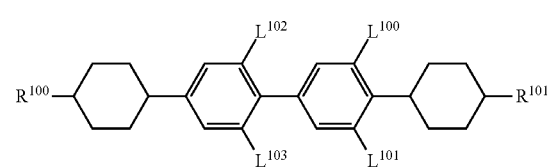

(Ch-I-24)
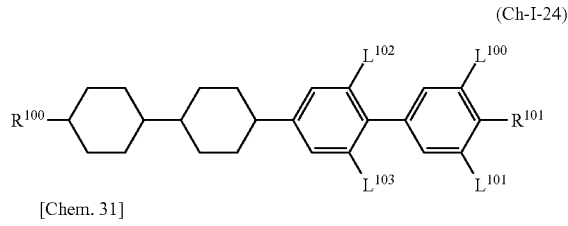

[Chem. 31]

(Ch-I-25)
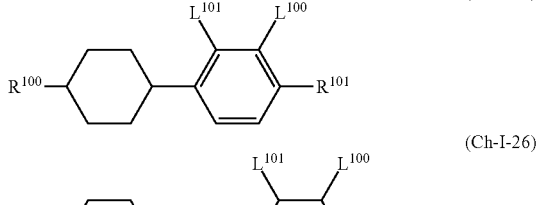

(Ch-I-26)
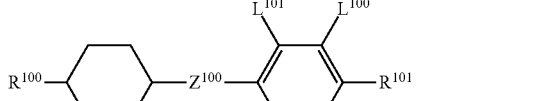

(Ch-I-27)
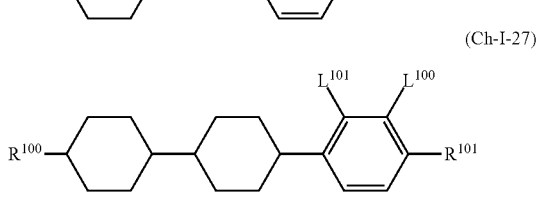

(Ch-I-28)
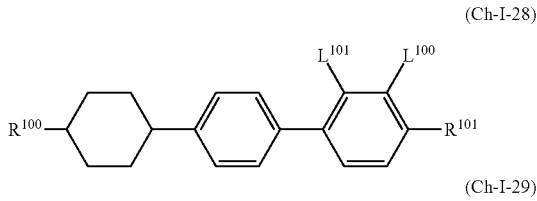

(Ch-I-29)
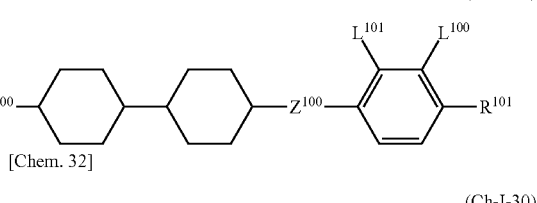

[Chem. 32]

(Ch-I-30)
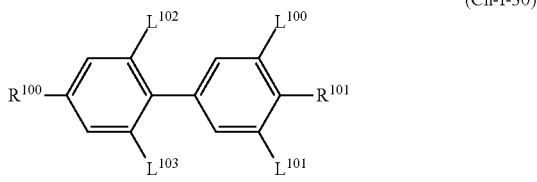

The compounds represented by the general formulae (Ch-I-1) to (Ch-I-30) are preferably compounds in which one or both of $R^{100}$ and $R^{101}$ denote a group represented by one of the general formulae (Ra) to (Rk), more preferably compounds in which one or both of $R^{100}$ and $R^{101}$ denote a group represented by one of the formulae (Ra-1) to (Ra-3) and the general formulae (Rf-1) to (Rf-3). Compounds in which only one of $R^{100}$ and $R^{101}$ denotes a group represented by one of the general formulae (Ra) to (Rk) are preferably compounds in which the other of $R^{100}$ and $R^{101}$ denotes an achiral alkyl group having 1 to 30 carbon atoms (in which one or two or more nonadjacent methylene groups may be independently substituted by —O—, —S—, —NH—, —N(CH$_3$)—, —CO—, —COO—, —OCO—, —OCO—O—, —S—CO—, —CO—S—, —CH=CH—, —CF$_2$—, —CF=CH—, —CH=CF—, —CF=CF—, or C≡C—, and one or two or more hydrogen atoms may be independently substituted by a halogen atom or a cyano group), more preferably an alkyl group having 1 to 16 carbon atoms, an alkoxy group having 1 to 16 carbon atoms, an alkenyl group having 2 to 16 carbon atoms, or an alkenyloxy group having 2 to 16 carbon atoms.

A material containing chiral liquid crystals of the present invention preferably contains at least one compound represented by one of the general formulae (Ch-I-1) to (Ch-I-30), more preferably a compound represented by the general formula (Ch-I-30). More specifically, the compound represented by the general formula (Ch-I-30) may be a compound represented by one of the following general formulae (Ch-I-30-1) to (Ch-I-30-6) (wherein $n^{13}$ is 0 or 1, n is an integer in the range of 2 to 12, $R^{102}$ denotes an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, and $L^{106}$ to $L^{102}$ independently denote a hydrogen atom or a fluorine atom). In the general formulae (Ch-I-30-1) to (Ch-I-30-6), $R^{102}$ preferably denotes an alkyl group having 1 to 6 carbon atoms, an alkoxy group having 1 to 6 carbon atoms, an alkenyl group having 2 to 6 carbon atoms, or an alkenyloxy group having 2 to 6 carbon atoms.

[Chem. 33]

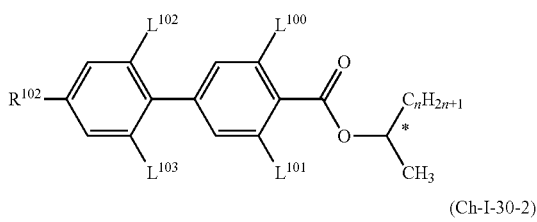

(Ch-I-30-1)

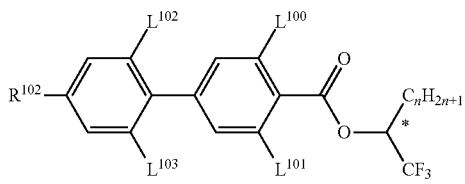

(Ch-I-30-2)

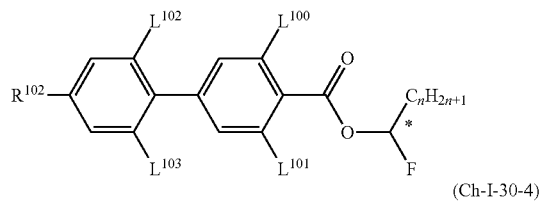

(Ch-I-30-3)

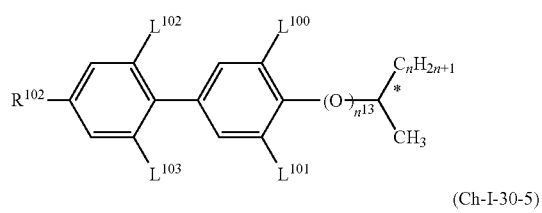

(Ch-I-30-4)

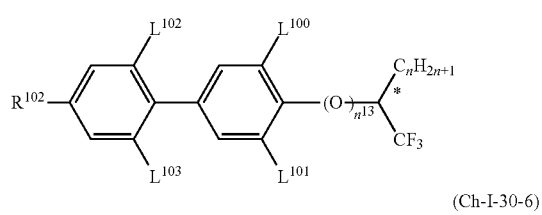

(Ch-I-30-5)

(Ch-I-30-6)

When $n^{11}$ is 1, the compounds represented by the general formula (Ch-I) have an asymmetric carbon in their ring structures. In this case, the compounds represented by the general formula (Ch-I) are preferably compounds in which D is represented by the formula (D2) or (D4), more preferably the formula (D4). The compounds in which D is represented by the formula (D2) are preferably compounds represented by the following general formulae (K2-1) to (K2-8). The compounds in which D is represented by the formula (D4) are preferably compounds represented by the following general formulae (K3-1) to (K3-6). In the general formulae (K2-1) to (K2-8) and (K3-1) to (K3-6), an asterisk (*) denotes a chiral carbon atom.

[Chem. 34]

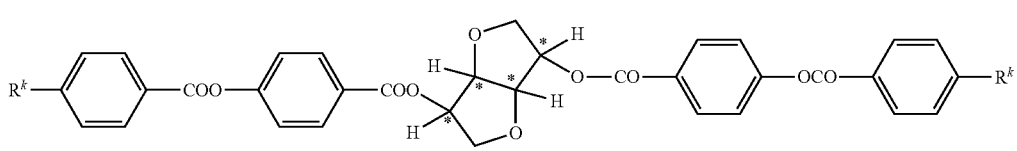

(K2-1)

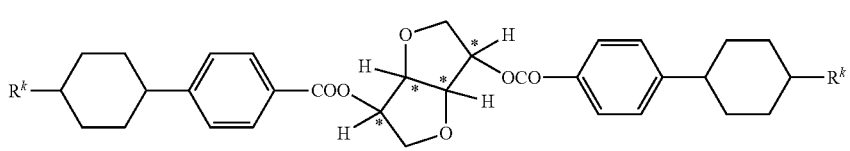

(K2-2)

-continued
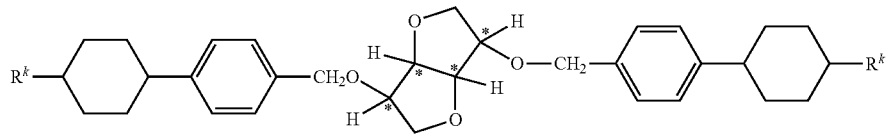
(K2-3)
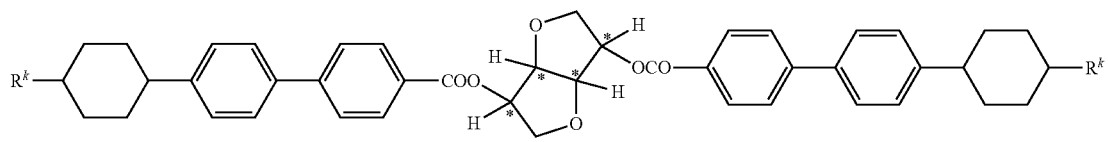
(K2-4)
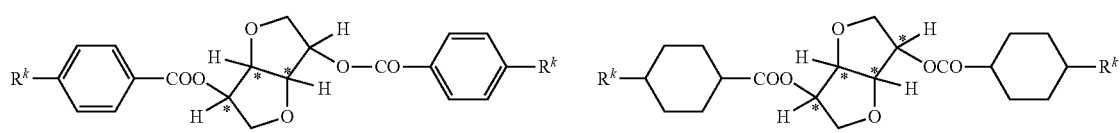
(K2-5) (K2-6)
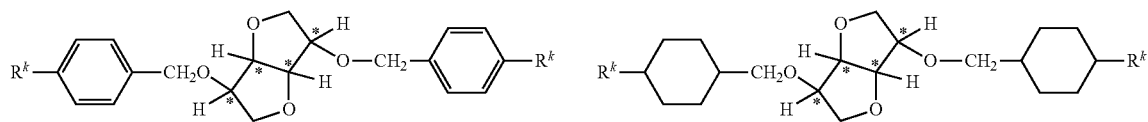
(K2-7) (K2-8)
[Chem. 35]
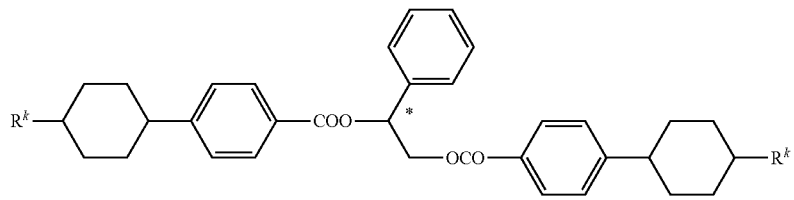
(K3-1)
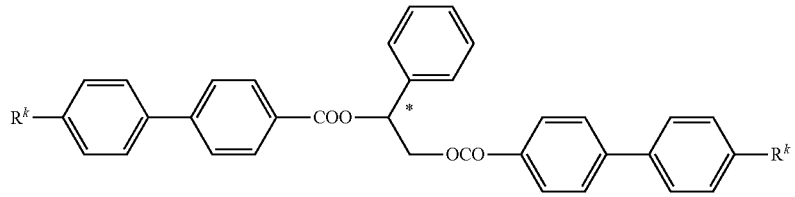
(K3-2)
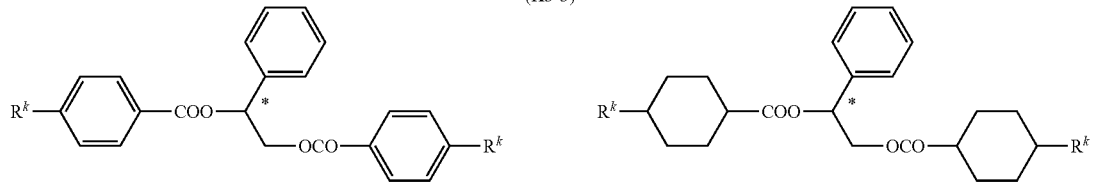
(K3-3) (K3-4)
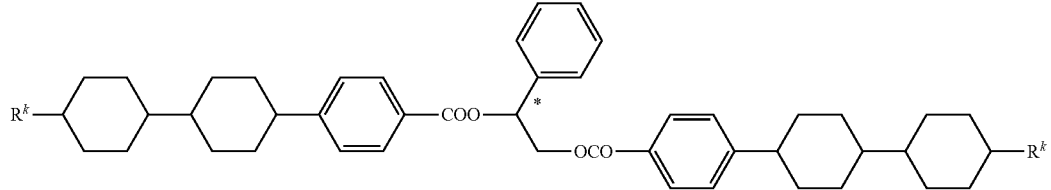
(K3-5)

(K3-6)

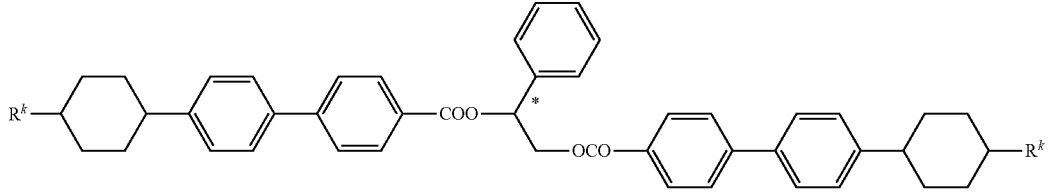

In the general formulae (K2-1) to (K2-8) and (K3-1) to (K3-6), each $R^K$ is the same as $R^{100}$ and $R^{101}$ in the general formula (Ch-I). Among the compounds represented by the general formulae (K2-1) to (K2-8) or (K3-1) to (K3-6), a chiral compound for use in a material containing chiral liquid crystals of the present invention is preferably a compound in which each $R^K$ denotes a chiral or achiral alkyl group having 1 to 30 carbon atoms (in which one or two or more nonadjacent methylene groups may be independently substituted by —O—, —S—, —NH—, —N(CH$_3$)—, —CO—, —COO—, —OCO—, —OCO—O—, —S—CO—, —CO—S—, —CH=CH—, —CF$_2$—, —CF=CH—, —CH=CF—, —CF=CF—, or C≡C—, and one or two or more hydrogen atoms may be independently substituted by a halogen atom or a cyano group), more preferably a compound in which each $R^K$ denotes an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, still more preferably a compound in which each $R^K$ denotes an alkyl group having 3 to 10 carbon atoms, an alkoxy group having 3 to 10 carbon atoms, an alkenyl group having 3 to 10 carbon atoms, or an alkenyloxy group having 3 to 10 carbon atoms.

<Compound Having Axial Chirality>

More specifically, the compound having axial chirality is preferably a compound represented by the general formula (IV-1), (IV-2), (IV-3), or (IV-4).

[Chem. 36]

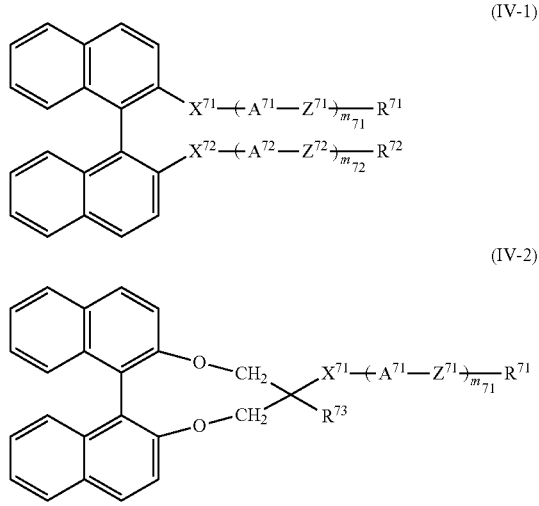

In a compound represented by the general formula (IV-1) or (IV-2), a bond between the α-positions of two naphthalene rings is an axis of axial chirality.

In the general formulae (IV-1) and (IV-2), $R^{71}$ and $R^{72}$ independently denote a hydrogen atom, a halogen atom, a cyano group, an isocyanate group, an isothiocyanate group, or an alkyl group having 1 to 20 carbon atoms. One or two or more methylene groups in the alkyl group may be independently substituted by —O—, —S—, —COO—, —OCO—, —CH=CH—, —CF=CF—, or —C≡C—, provided that oxygen atoms and sulfur atoms are not directly bonded to each other. One or two or more hydrogen atoms in the alkyl group may be substituted by a halogen atom. In a compound represented by the general formula (IV-1) or (IV-2), $R^{7'}$ and $R^{72}$ independently preferably denote an unsubstituted or optionally substituted alkyl group having 1 to 20 carbon atoms, more preferably an unsubstituted alkyl group having 1 to 20 carbon atoms, still more preferably an unsubstituted alkyl group having 1 to 6 carbon atoms.

In the general formulae (IV-1) and (IV-2), $A^{71}$ and $A^{72}$ independently denote an aromatic or non-aromatic 3-, 6-, 7-, or 8-membered ring or a fused ring having 9 or more carbon atoms. One or two or more hydrogen atoms in these ring structures may be independently substituted by a halogen atom, an alkyl group having 1 to 3 carbon atoms, or a haloalkyl group having 1 to 3 carbon atoms. One methylene group or two or more nonadjacent methylene groups in the ring structures may be independently substituted by —O—, —S—, or —NH—. One or two or more nonadjacent —CH= in the ring structures may be substituted by —N=. When $m_{71}$ is 2 or more, and one molecule includes a plurality of $A^7$ s, they may be the same or different. Likewise, $m_{72}$ is 2 or more, and one molecule includes a plurality of $A^{72}$s, they may be the same or different.

In a compound represented by the general formula (IV-1) or (IV-2), $A^{71}$ and $A^{72}$ independently preferably denote a 1,4-phenylene group, a trans-1,4-cyclohexylene group, a pyridine-2,5-diyl group, a pyrimidine-2,5-diyl group, or a naphthalene-2,6-diyl group. Also preferred are those in which one or two or more hydrogen atoms in these groups are independently substituted by a halogen atom, an alkyl group having 1 to 3 carbon atoms, or a haloalkyl group having 1 to 3 carbon atoms. Among these, a 1,4-phenylene group in which one or two or more hydrogen atoms may be substituted by a fluorine atom, or trans-1,4-cyclohexylene group is more preferred, and an unsubstituted 1,4-phenylene group or an unsubstituted trans-1,4-cyclohexylene group is still more preferred.

In the general formulae (IV-1) and (IV-2), $Z^{7'}$ and $Z^{72}$ independently denote a single bond or an alkylene group having 1 to 8 carbon atoms. One or two or more methylene groups in the alkylene group may be independently substituted by —O—, —S—, —COO—, —OCO—, —CSO—, —OCS—, —N=N—, —CH=N—, —N=CH—, —N(O) =N—, —N=N(O)—, —CH=CH—, —CF=CF—, or —C≡C—, provided that oxygen atoms and sulfur atoms are not directly bonded to each other. One or two or more hydrogen atoms in the alkylene group may be substituted by a halogen atom. When $m_{71}$ is 2 or more, and one molecule includes a plurality of $Z^{72}$s, they may be the same or different. Likewise, $m_{72}$ is 2 or more, and one molecule includes a plurality of $Z^{72}$s, they may be the same or different.

In a compound represented by the general formula (IV-1) or (IV-2), $Z^{71}$ and $Z^{72}$ independently preferably denote a single bond, an unsubstituted alkylene group having 1 to 4 carbon atoms, —COO—, —OCO—, —CH=CH—, or —C≡C—, more preferably a single bond, —CH$_2$—, —CH$_2$CH$_2$—, —COO—, —OCO—, —CH=CH—, or —C≡C—, still more preferably a single bond, —COO—, or —OCO—.

In the general formulae (IV-1) and (IV-2), $X^{71}$ and $X^{72}$ independently denote a single bond, —COO—, —OCO—, —CH$_2$O—, —OCH$_2$—, —CF$_2$O—, —OCF$_2$—, or —CH$_2$CH$_2$—. In a compound represented by the general formula (IV-1) or (IV-2), $X^{71}$ and $X^{72}$ independently preferably denote a single bond, —COO—, —OCO—, —CH$_2$O—, —OCH$_2$—, or —CH$_2$CH$_2$—, more preferably a single bond, —COO—, or —OCO—.

In the general formula (IV-2), $R^{73}$ denotes a hydrogen atom, a halogen atom, or —$X^{71}$-($A^{71}$-$Z^{71}$)$m_{71}$-$R^{71}$.

In the general formulae (IV-1) and (IV-2), $m_{71}$ and $m_{72}$ are independently an integer in the range of 1 to 4. In the general formula (IV-2), when $R^{73}$ denotes —$X^{71}$-($A^{71}$-$Z^{71}$)$m_{71}$-$R^7$, one of two $m_{71}$s may be 0. In a compound represented by the general formula (IV-1) or (IV-2), $m_{71}$ and $m_{72}$ are preferably independently 2 or 3, more preferably 2.

[Chem. 37]

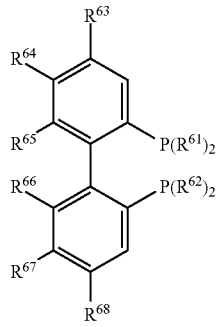

(IV-3)

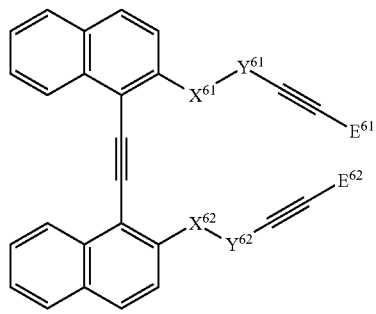

(IV-4)

In a compound represented by the general formula (IV-3), a single bond between two benzene rings is an axis of axial chirality. In a compound represented by the general formula (IV-4), a bond between the α-positions of two naphthalene rings is an axis of axial chirality.

In the general formula (IV-3), $R^{61}$ and $R^{62}$ independently denote a phenyl group in which one or two or more hydrogen atoms may be independently substituted by an alkyl group, an alkoxy group, or a halogen atom; a cyclopentyl group; or a cyclohexyl group. An alkyl or alkoxy group to substitute for a hydrogen atom of the phenyl group is preferably a linear or branched alkyl or alkoxy group having 1 to 6 carbon atoms, more preferably a linear or branched alkyl or alkoxy group having 1 to 3 carbon atoms.

In the general formula (IV-3), $R^{63}$, $R^{64}$, $R^{65}$, $R^{66}$, $R^{67}$, and $R^{68}$ independently denote a hydrogen atom, an alkyl group, an alkoxy group, an acyloxy group, a halogen atom, a haloalkyl group, or a dialkylamino group. Two of $R^{63}$, $R^{64}$, and $R^{65}$ in the general formula (IV-3) may form an optionally substituted methylene chain or an optionally substituted mono- or poly-methylenedioxy group, and two of $R^{66}$, $R^{67}$, and $R^{68}$ may form an optionally substituted methylene chain or an optionally substituted mono- or poly-methylenedioxy group, except when both $R^{65}$ and $R^{66}$ are hydrogen atoms.

In the general formula (IV-4), at least one of $X^{61}$ and $Y^{61}$ and at least one of $X^{62}$ and $Y^{62}$ are present, and $X^{61}$, $X^{62}$, $Y^{61}$, and $Y^{62}$ independently denote CH$_2$, C=O, O, N, S, P, B, or Si. When $X^{61}$, $X^{62}$, $Y^{61}$, or $Y^{62}$ denotes N, P, B, or Si, it may be bonded to a substituent, such as an alkyl group, an alkoxy group, or an acyl group, so as to satisfy the necessary valence.

In the general formula (IV-4), $E^{61}$ and $E^{62}$ independently denote a hydrogen atom, an alkyl group, an aryl group, an allyl group, a benzyl group, an alkenyl group, an alkynyl group, an alkyl ether group, an alkyl ester group, an alkylketone group, a heterocyclic group, or a derivative thereof.

When high helical twisting power is particularly required for a chiral compound in a material containing chiral liquid crystals of the present invention, a compound represented by the general formula (IV-1) or (IV-2) is particularly preferred.

More specifically, the compounds represented by the general formula (IV-1) are preferably compounds represented by the following general formulae (K4-1) to (K4-12), more preferably compounds represented by the general formulae (K4-1) to (K4-6), still more preferably compounds represented by the general formulae (K4-3) to (K4-6). In the compounds represented by the general formulae (K4-1) to (K4-12), a bond between the α-positions of two naphthalene rings is an axis of axial chirality.

[Chem. 38]

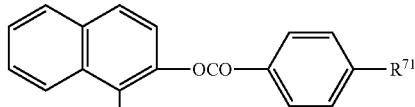

(K4-1)

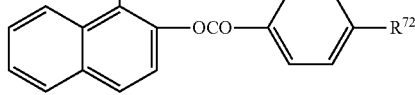

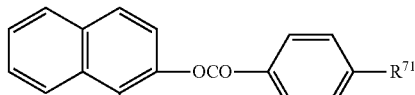

(K4-2)

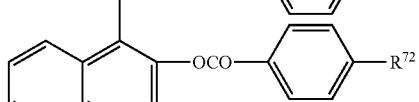

(K4-3)
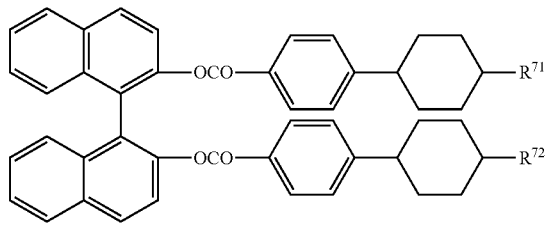

(K4-4)
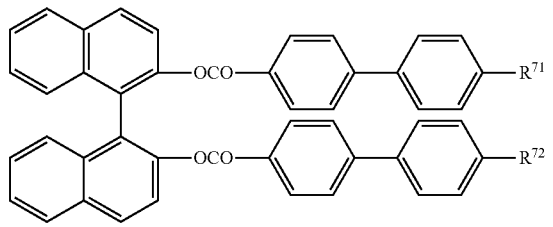

(K4-5)
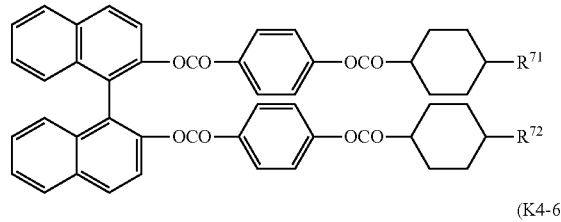

(K4-6)
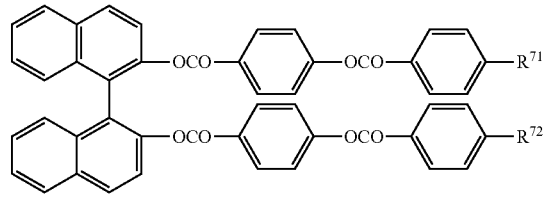

[Chem. 39]

(K4-7)
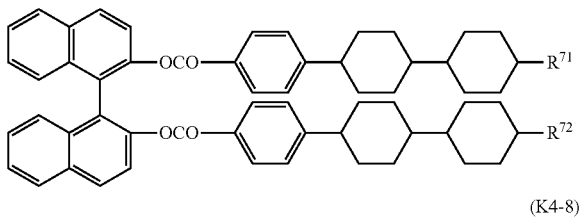

(K4-8)
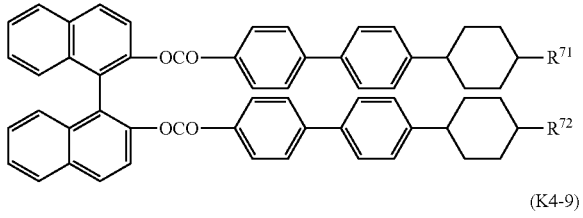

(K4-9)
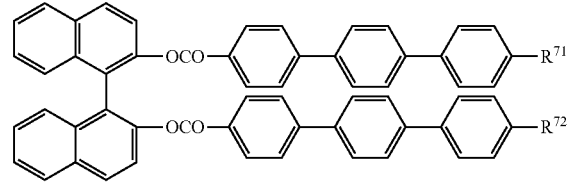

(K4-10)
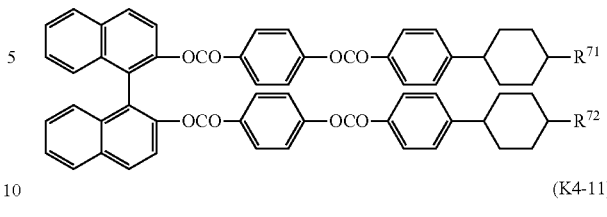

(K4-11)
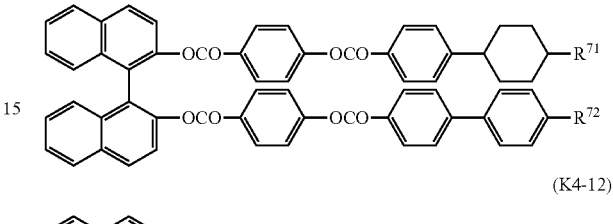

(K4-12)
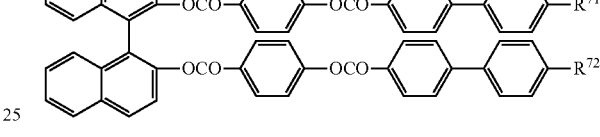

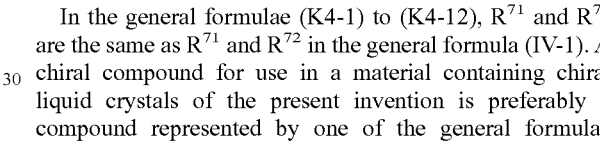

In the general formulae (K4-1) to (K4-12), $R^{71}$ and $R^{72}$ are the same as $R^{71}$ and $R^{72}$ in the general formula (IV-1). A chiral compound for use in a material containing chiral liquid crystals of the present invention is preferably a compound represented by one of the general formulae (K4-1) to (K4-12) wherein $R^{71}$ and $R^{72}$ independently denote an unsubstituted or optionally substituted alkyl group having 1 to 20 carbon atoms, more preferably an unsubstituted alkyl group having 1 to 20 carbon atoms, still more preferably an unsubstituted alkyl group having 1 to 6 carbon atoms.

More specifically, the compounds represented by the general formula (IV-2) are preferably compounds represented by the following general formulae (K5-1) to (K5-3). In the compounds represented by the general formulae (K5-1) to (K5-3), a bond between the α-positions of two naphthalene rings is an axis of axial chirality.

[Chem. 40]

(K5-1)
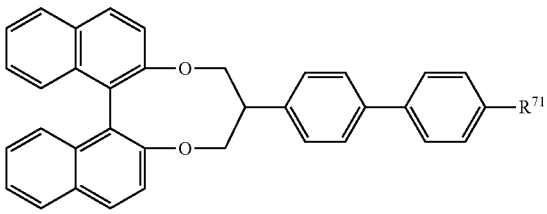

(K5-2)
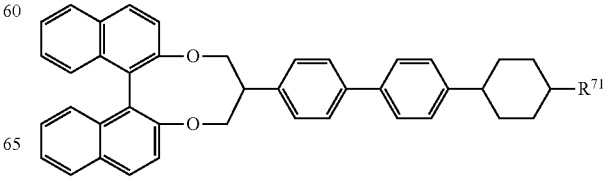

(K5-3)

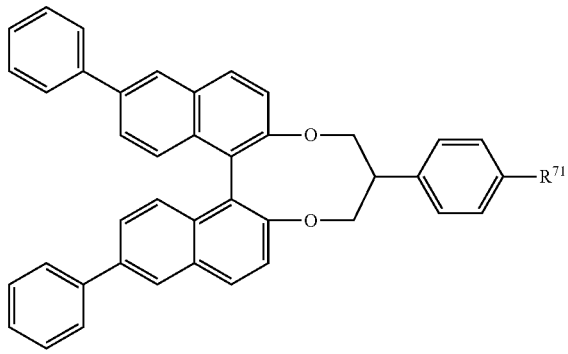

In the general formulae (K5-1) to (K5-3), $R^{71}$ is the same as $R^{71}$ in the general formula (IV-2). A chiral compound for use in a material containing chiral liquid crystals of the present invention is preferably a compound represented by one of the general formulae (KS-1) to (K5-3) wherein $R^7$ denotes an alkyl group having 1 to 20 carbon atoms in which one or two or more hydrogen atoms may be substituted by a halogen atom, an alkenyl group having 1 to 20 carbon atoms in which one or two or more hydrogen atoms may be substituted by a halogen atom, an alkoxy group having 1 to 19 carbon atoms in which one or two or more hydrogen atoms may be substituted by a halogen atom, or an alkyl group having 1 to 19 carbon atoms in which one or two or more hydrogen atoms may be substituted by a halogen atom, more preferably an unsubstituted alkyl group having 1 to 20 carbon atoms, still more preferably an unsubstituted alkyl group having 1 to 6 carbon atoms.

<Compound Having Planar Chirality>

A compound having planar chirality may be a helicene derivative represented by the following general formula (IV-5). Because the overlapping relationship between overlapping rings in such a helicene derivative cannot be altered, rings having a clockwise helical structure are distinguished from rings having a counterclockwise helical structure. Thus, such a helicene derivative has chirality.

[Chem. 41]

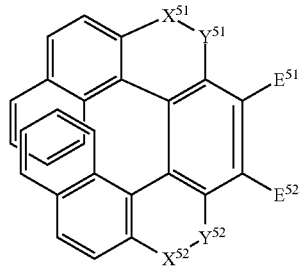

(IV-5)

In the general formula (IV-5), at least one of $X^{51}$ and $Y^{51}$ and at least one of $X^{52}$ and $Y^{52}$ are present, and $X^{51}$, $X^{52}$, $Y^{51}$, and $Y^{52}$ independently denote $CH_2$, $C=O$, O, N, S, P, B, or Si. When $X^{51}$, $X^{52}$, $Y^{51}$, and $Y^{52}$ independently denote N, P, B, or Si, they may be bonded to a substituent, such as an alkyl group, an alkoxy group, or an acyl group, so as to satisfy the necessary valence.

In the general formula (IV-5), $E^{51}$ and $E^{52}$ independently denote a hydrogen atom, an alkyl group, an aryl group, an allyl group, a benzyl group, an alkenyl group, an alkynyl group, an alkyl ether group, an alkyl ester group, an alkylketone group, a heterocyclic group, or a derivative thereof.

A material containing chiral liquid crystals of the present invention may contain one chiral compound but preferably contains two or more chiral compounds in combination. A material containing chiral liquid crystals having desired physical properties can be easily produced by combining a plurality of chiral compounds having different structures or physical properties.

A chiral compound for use in a material containing chiral liquid crystals of the present invention preferably has relatively high helical twisting power. When a chiral compound has high helical twisting power, this can decrease the amount of chiral compound required so that the helical structure of a nematic liquid crystal composition to which the chiral compound is added can have a desired pitch (for example, the pitch at 25° C. ranges from 0.01 to 1 μm, preferably 0.05 to 0.5 μm, more preferably 0.1 to 0.4 μm).

At least one chiral compound having a negative temperature dependence of helical twisting power (the helical twisting power increases with temperature) when added to a liquid crystal composition is preferably used so that a material containing chiral liquid crystals of the present invention can more easily form an optically isotropic phase, such as a blue phase. In particular, one or two or more chiral compounds having a positive temperature dependence of helical twisting power and one or two or more chiral compounds having a negative temperature dependence of helical twisting power are more preferably used in combination in order to produce a material containing chiral liquid crystals that can form a blue phase III without a blue phase I, a blue phase II, or a liquid phase in an unprecedentedly very wide temperature range (for example, a temperature range of 2° C. or more).

A material containing chiral liquid crystals of the present invention preferably contains, as a chiral compound, at least one selected from the group consisting of the compounds represented by the general formulae (Ch-I-1) to (Ch-I-30), the compounds represented by the general formulae (K2-1) to (K2-8), the compounds represented by the general formulae (K3-1) to (K3-6), the compounds represented by (K4-1) to (K4-12), and the compounds represented by the general formulae (K5-1) to (K5-3), more preferably a combination of two or more selected from this compound group, still more preferably a combination of at least one chiral compound having a positive temperature dependence of helical twisting power and at least one chiral compound having a negative temperature dependence of helical twisting power selected from the compound group. In particular, a material containing chiral liquid crystals of the present invention preferably contains two or more selected from the group consisting of the compounds represented by the general formula (Ch-I-30), the compounds represented by the general formulae (K3-1) to (K3-6), and the compounds represented by (K4-1) to (K4-12), more preferably at least a compound represented by one of the general formulae (Ch-I-30-1) to (Ch-I-30-6) and a compound represented by one of (K4-3) to (K4-6).

The chiral compound content of a material containing chiral liquid crystals of the present invention is not particularly limited, provided that a nematic liquid crystal composition to be used has a pitch in a desired range, and depends on the type of nematic liquid crystal composition and the type (in particular, polarizability) and combination of chiral compounds, for example. The chiral compound content of a liquid crystal-polymer composite material of the present invention may range from 1 to 45 parts by mass, preferably 3 to 30 parts by mass, per 100 parts by mass of a nematic liquid crystal composition.

[Polymerizable Compound]

A material containing chiral liquid crystals of the present invention is also preferably a liquid crystal-polymer composite material containing a polymer formed by polymerization of at least one polymerizable compound in addition to the nematic liquid crystal composition and chiral compound(s). A chiral compound is added to a nematic liquid crystal composition to produce a liquid crystal composition that can form an optically isotropic phase, and a polymer is added to the liquid crystal composition for stabilization. Thus, an optically isotropic phase, particularly a blue phase, can be formed in a wider temperature range.

A liquid crystal-polymer composite material of the present invention may be prepared by mixing the nematic liquid crystal composition, a chiral compound, and a polymer. As described later, a liquid crystal-polymer composite material of the present invention is preferably produced by first preparing a liquid crystal composition containing a polymerizable compound, which is a mixture of the nematic liquid crystal composition, a chiral compound, and the polymerizable compound, and then by polymerizing a compound having a polymerizable group in the liquid crystal composition containing the polymerizable compound.

One or two or more polymerizable compounds may be used to form the polymer. The term "polymerizable compound", as used herein, refers to a compound having at least one polymerizable group in its molecule. The polymerizable group is preferably a group having a structure represented by one of the formulae (R-1) to (R-16). The polymerizable compound for use in the formation of the polymer may be a photopolymerizable compound or a thermally polymerizable compound. A polymerizable compound that is polymerizable by a photopolymerization reaction is preferred because the photopolymerization reaction can be relatively easily performed.

Depending on the structure, polymerizable compounds can be classified into polymerizable compounds having a ring structure (a mesogenic group), such as a cyclohexane skeleton or a benzene skeleton, (mesogenic (liquid crystal) polymerizable compounds) and polymerizable compounds having no mesogenic group (non-mesogenic (non-liquid-crystalline) polymerizable compounds).

<Mesogenic Polymerizable Compound>

The mesogenic polymerizable compounds are preferably compounds represented by the following general formula (PC1).

[Chem. 42]

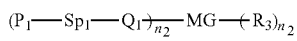
(PC1)

In the general formula (PC1), $P_1$ denotes a polymerizable group. $P_1$ is preferably a group having a structure represented by one of the formulae (R-1) to (R-16).

In the general formula (PC1), $Sp_1$ denotes a spacer group having 0 to 20 carbon atoms. The spacer group may be any divalent group having 0 to 20 carbon atoms and may contain an atom other than the carbon atom. The spacer group may be linear or branched or may have a ring structure. For example, the spacer group is a single bond, an alkylene group having 1 to 20 carbon atoms, an alkenylene group having 1 to 20 carbon atoms, or an arylene group having 1 to 20 carbon atoms. One or two or more nonadjacent methylene groups in the alkylene group or alkenylene group may be independently substituted by —O—, —S—, —NH—, —N(CH$_3$)—, —CO—, —COO—, —OCO—, —OCOO—, —SCO—, —COS—, or —C≡C—, provided that oxygen atoms and sulfur atoms are not directly bonded to each other. One or two or more hydrogen atoms in the alkylene group or alkenylene group may be independently substituted by a halogen atom or a cyano group. In a compound represented by the general formula (PC1), $Sp_a$ preferably denotes a single bond, an unsubstituted or substituted alkylene group having 1 to 16 carbon atoms, or an unsubstituted or substituted alkenylene group having 1 to 16 carbon atoms, more preferably a single bond, an unsubstituted alkylene group, or a substituted alkenylene group.

In the general formula (PC1), $Q_1$ denotes a single bond, —O—, —OCH$_2$—, —OCH$_2$—, —C$_2$H$_4$—, —COO—, —OCO—, —CH=CH—, —CO—, —OCOO—, —NH—, —NHCOO—, —OCONH—, —OCOCH$_2$—, —CH$_2$OCO—, —COOCH$_2$—, —CH$_2$COO—, —CH=CH—COO—, —OCO—CH=CH—, —CH=CH—OCO—, —COO—CH=CH—, —CH=CCH$_3$—COO—, —COO—CCH$_3$=CH—, —COOC$_2$H$_4$—, —OCOC$_2$H$_4$—, —C$_2$H$_4$OCO—, —C$_2$H$_4$COO—, —C≡C—, —CF$_2$O—, or —OCF$_2$—. In a compound represented by the general formula (PC1), $Q_1$ preferably denotes a single bond, —O—, —OCH$_2$—, —OCH$_2$—, —C$_2$H$_4$—, —COO—, —OCO—, —CH=CH—, —OCOCH$_2$—, —CH$_2$OCO—, —COOCH$_2$—, —CH$_2$COO—, —CH=CH—COO—, —OCO—CH=CH—, —CH=CH—OCO—, —COO—CH=CH—, —COOC$_2$H$_4$—, —OCOC$_2$H$_4$—, —C$_2$H$_4$OCO—, —C$_2$H$_4$COO—, —C≡C—, —CF$_2$O—, or —OCF$_2$—, more preferably —O—, —OCH$_2$—, —CH$_2$O—, —COO—, —OCO—, —C$_2$H$_4$—, —C≡C—, or a single bond in terms of the ease of manufacture and liquid-crystal alignment, particularly preferably —OCH$_2$—, —CH$_2$O—, —COO—, —OCO—, or a single bond.

In the general formula (PC1), $R_3$ denotes a hydrogen atom, a halogen atom, a cyano group, an alkyl group having 1 to 25 carbon atoms (in which one or two or more methylene groups may be independently substituted by —O—, —S—, —NH—, —N(CH$_3$)—, —CO—, —COO—, —OCO—, —OCOO—, —SCO—, —COS—, or —C≡C—, provided that oxygen atoms are not directly bonded to each other), or $P_2$—Sp$_2$-Q$_2$- (wherein $P_2$, Sp$_2$, and $Q_2$ are the same as $P_1$, Sp$_1$, $Q_1$, respectively). When $R_3$ denotes $P_2$—Sp$_2$-Q$_2$-, $P_1$ and $P_2$, Sp$_1$ and Sp$_2$, and Q and $Q_2$ in one molecule may be the same or different.

In the general formula (PC1), $n_1$ and $n_2$ are independently 1, 2, or 3. When $n_1$ is 1, and $R_3$ has no polymerizable group, the compounds represented by the general formula (PC1) are monofunctional polymerizable compounds. When $n_1$ is 2 or 3, or $R_3$ has a polymerizable group, the compounds represented by the general formula (PC1) are polyfunctional polymerizable compounds having two or more polymerizable groups.

In the general formula (PC1), MG denotes a mesogenic group. Mesogenic groups are rigid functional groups that can provide liquid crystallinity and generally have a ring structure, such as a cyclohexane skeleton or a benzene skeleton. The mesogenic group may be any group constituting mesogenic units of known liquid crystal molecules and is preferably a group represented by the following general formula (MG-1).

[Chem. 43]

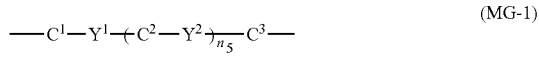
(MG-1)

In the general formula (MG-1), $C^1$ or $C^3$ independently denote a 1,4-phenylene group, a 1,3,4-benzenetriyl group, a 1,2,4-benzenetriyl group, a benzene-1,2,4,5-tetrayl group, a benzene-1,2,3,4-tetrayl group, a 1,4-cyclohexylene group, a 1,3,4-cyclohexanetriyl group, a 1,2,4-cyclohexanetriyl group, a cyclohexane-1,2,3,4-tetrayl group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a 2,6-naphthylene group, a naphthalene-2,5,6-triyl group, a naphthalene-2,3,6-triyl group, a naphthalene-2,6,7-triyl group, a naphthalene-2,5,6,7-tetrayl group, a naphthalene-1,2,5,6-tetrayl group, a naphthalene-2,3,6,7-tetrayl group, a 1,2,3,4-tetrahydronaphthalene-2,6-diyl group, a 1,2,3,4-tetrahydronaphthalene-2,5,6-triyl group, a 1,2,3,4-tetrahydronaphthalene-2,6,7-triyl group, a 1,2,3,4-tetrahydronaphthalene-2,5,6-triyl group, a decahydronaphthalene-2,6-diyl group, a decahydronaphthalene-2,5,6-triyl group, a pyridine-2,5-diyl group, a pyrimidine-2,5-diyl group, a pyrazine-2,5-diyl group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group. One or two or more hydrogen atoms in these groups may be independently substituted by a fluorine atom, a chlorine atom, a trifluoromethyl group, a trifluoromethoxy group, a cyano group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, or an alkenoyloxy group having 2 to 8 carbon atoms.

In the general formula (MG-1), $C^2$ denotes a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group. One or two or more hydrogen atoms in these groups may be independently substituted by a fluorine atom, a chlorine atom, a trifluoromethyl group, a trifluoromethoxy group, a cyano group, an alkyl group having 1 to 8 carbon atoms, an alkoxy group having 1 to 8 carbon atoms, an alkanoyl group having 1 to 8 carbon atoms, an alkanoyloxy group having 1 to 8 carbon atoms, an alkenyl group having 2 to 8 carbon atoms, an alkenyloxy group having 2 to 8 carbon atoms, an alkenoyl group having 2 to 8 carbon atoms, or an alkenoyloxy group having 2 to 8 carbon atoms. When one molecule includes a plurality of $C^2$s, they may be the same or different.

In the general formula (MG-1), $Y^1$ and $Y^2$ independently denote a single bond, —O—, —OCH$_2$—, —OCH$_2$—, —C$_2$H$_4$—, —COO—, —OCO—, —CH=CH—, —CO—, —OCOO—, —NH—, —NHCOO—, —OCONH—, —OCOCH$_2$—, —CH$_2$OCO—, —COOCH$_2$—, —CH$_2$COO—, —CH=CH—COO—, —OCO—CH=CH—, —CH=CH—OCO—, —COO—CH=CH—, —CH=CCH$_3$—COO—, —COO—CCH$_3$=CH—, —COOC$_2$H$_4$—, —OCOC$_2$H$_4$—, —C$_2$H$_4$OCO—, —C$_2$H$_4$COO—, —C≡C—, —CF$_2$O—, or —OCF$_2$—. When one molecule includes a plurality of $Y^2$s, they may be the same or different.

In the general formula (MG-1), $n_5$ is an integer in the range of 0 to 5. In a compound represented by the general formula (PC1), $n_5$ is preferably an integer in the range of 0 to 3, more preferably an integer in the range of 0 to 2, still more preferably 0 or 1.

Among the compounds represented by the general formula (PC1), monofunctional polymerizable compounds may preferably be compounds represented by the following general formula (V-a).

[Chem. 44]

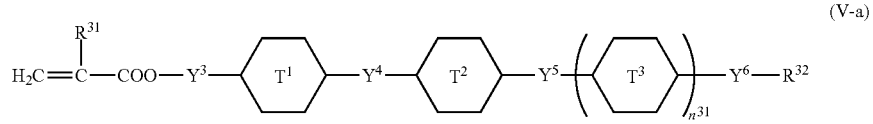
(V-a)

In the general formula (V-a), $R^{31}$ denotes a hydrogen atom or a methyl group.

In the general formula (V-a), $n^{31}$ is an integer of 0 or 1.

In the general formula (V-a), $T^1$, $T^2$, and $T^3$ independently denote one of the following 14 divalent groups having a ring structure (m is an integer in the range of 1 to 4).

[Chem. 45]

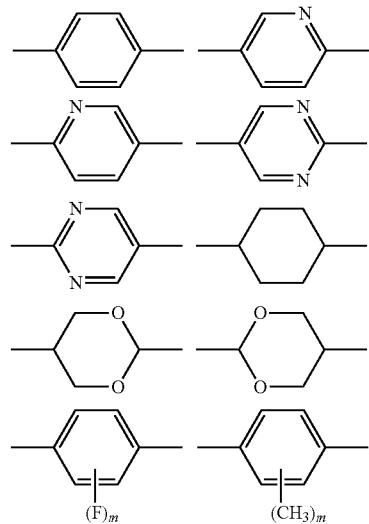

-continued

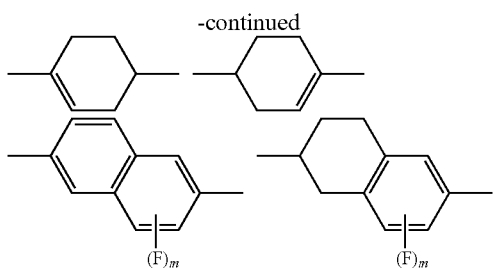

In the general formula (V-a), $Y^3$, $Y^4$, and $Y^5$ independently denote a single bond, —O—, —OCH$_2$—, —OCH$_2$—, —C$_2$H$_4$—, —COO—, —OCO—, —CH=CH—, —CO—, —OCOO—, —NH—, —NHCOO—, —OCONH—, —OCOCH$_2$—, —CH$_2$OCO—, —COOCH$_2$—, —CH$_2$COO—, —CH=CH—COO—, —OCO—CH=CH—, —CH=CH—OCO—, —COO—CH=CH—, —CH=CCH$_3$—COO—, —COO—CCH$_3$=CH—, —COOC$_2$H$_4$—, —OCOC$_2$H$_4$—, —C$_2$H$_4$OCO—, —C$_2$H$_4$COO—, —C≡C—, —CF$_2$O—, or —OCF$_2$—.

In the general formula (V-a), $Y^6$ denotes a single bond, —O—, —COO—, or —OCO—.

In the general formula (V-a), $R^{32}$ denotes a hydrogen atom, a halogen atom, a cyano group, an alkoxy group having 1 to 20 carbon atoms, or a hydrocarbon group having 1 to 20 carbon atoms. The hydrocarbon group may be any monovalent group having 1 to 20 carbon atoms and composed of a carbon atom or carbon atoms and hydrogen atoms, for example, an alkyl group having 1 to 20 carbon atoms, an alkenyl group having 1 to 20 carbon atoms, or an alkynyl group having 1 to 20 carbon atoms.

Among the compounds represented by the general formula (PC1), polyfunctional polymerizable compounds may be compounds represented by the following general formula (PC1-1) (wherein P$_1$, P$_2$, Spa, Sp$_2$, Q$_1$, Q$_2$, MG, n$_1$, and n$_2$ are the same as in the general formula (PC1)). More specifically, the compounds represented by the general formula (PC1-1) include compounds represented by the following general formulae (PC1-1) to (PC1-13).

[Chem. 46]

(PC1-1)

[Chem. 47]

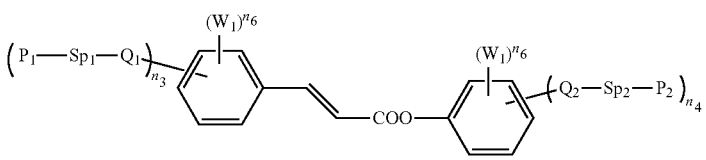

(PC1-1)

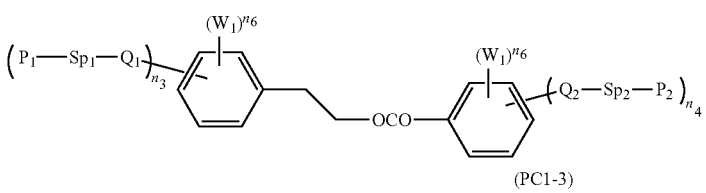

(PC1-2)

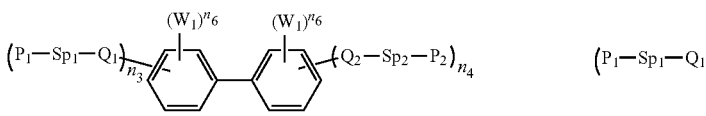 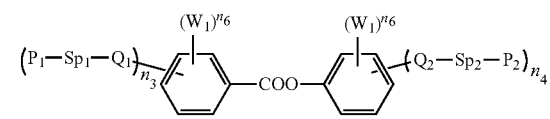

(PC1-3)  (PC1-4)

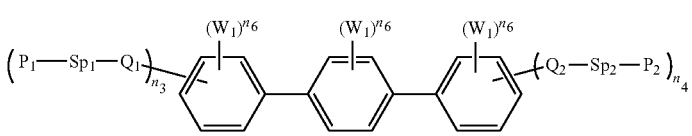

(PC1-5)

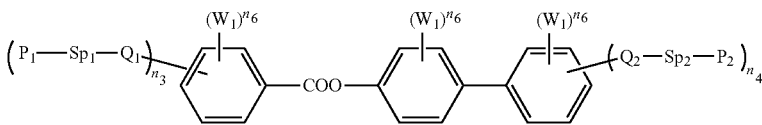

(PC1-6)

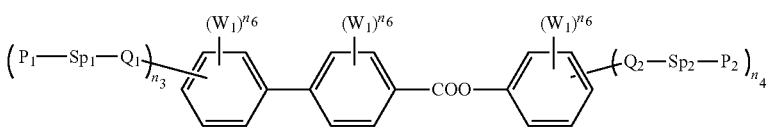

(PC1-7)

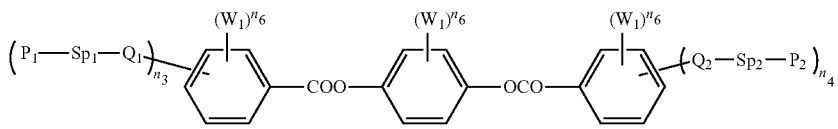

(PC1-8)

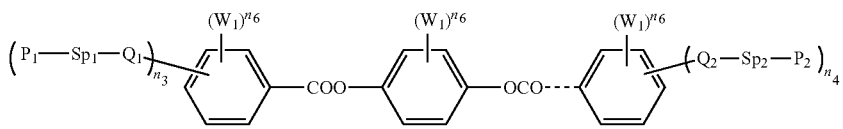

(PC1-9)

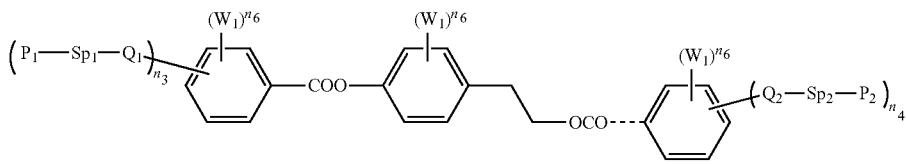

(PC1-10)

[Chem. 48]

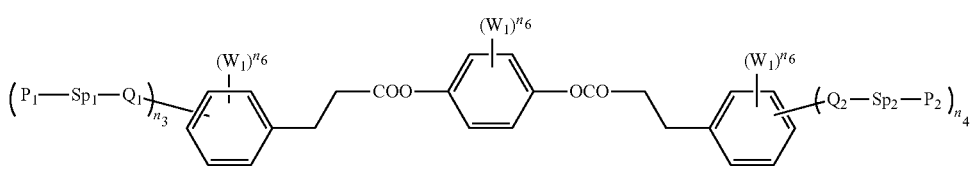

(PC1-11)

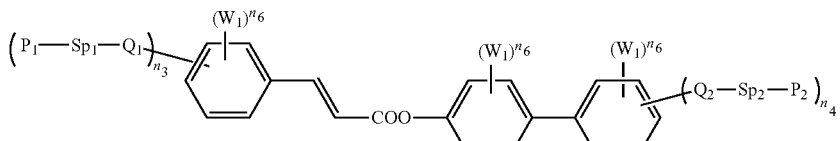

(PC1-12)

(PC1-13)

In the general formulae (PC1-1) to (PC1-13), $P_1$, $P_2$, $Sp_1$, $Sp_2$, $Q_1$, and $Q_2$ are the same as in the general formula (PC1). In the present invention, $Sp_1$, $Sp_2$, $Q_1$, and $Q_2$ are preferably single bonds. $P_1$ and $P_2$ are independently represented by the formula (R-1) or (R-2).

In the general formulae (PC1-1) to (PC1-13), each $W_1$ denotes a fluorine atom, a trifluoromethyl group, a trifluoromethoxy group, an alkyl group having 1 to 5 carbon atoms, an alkoxy group having 1 to 5 carbon atoms, an alkenyl group having 2 to 5 carbon atoms, a phenyl group, —$COOW_2$, —$OCOW_2$, or —$OCOOW_2$. In —$COOW_2$, —$OCOW_2$, and —$OCOOW_2$, each $W_2$ denotes a linear or branched alkyl group having 1 to 10 carbon atoms, or a linear or branched alkenyl group having 2 to 5 carbon atoms. When one molecule includes a plurality of $W_1$s, they may be the same or different. In the present invention, $W_1$ independently preferably denotes a fluorine atom, a trifluoromethyl group, a trifluoromethoxy group, an alkyl group having 1 to 5 carbon atoms, an alkoxy group having 1 to 5 carbon atoms, or a phenyl group, more preferably a fluorine atom, a trifluoromethyl group, a trifluoromethoxy group, a methyl group, or a methoxy group.

In the general formulae (PC1-1) to (PC1-13), $n_3$ is independently 1, 2, or 3, $n_4$ is independently 1, 2, or 3, $n_6$ is independently 0, 1, 2, 3, or 4, and $n_3+n_6$ and $n_4+n_6$ on the same ring are 5 or less. In the present invention, $n_3+n_4$ preferably ranges from 2 to 4, more preferably 2 or 3.

Among the compounds represented by the general formulae (PC1-1) to (PC1-13), a polymerizable compound for use in the present invention is particularly preferably a compound in which $Sp_1$, $Sp_2$, $Q_1$, and $Q_2$ denote a single bond, $P_1$ and $P_2$ are independently represented by the formula (R-1) or (R-2), each $W_1$ denotes a fluorine atom, a trifluoromethyl group, a trifluoromethoxy group, a methyl group, or a methoxy group, and $n_3+n_4$ is 2 or 3.

More specifically, the compounds represented by the general formula (PC1-3) include compounds represented by the following formulae (PC1-3a) to (PC1-3i). One or two or more hydrogen atoms on the benzene rings in the formulae (PC1-3a) to (PC1-3i) may be substituted by a fluorine atom. A polymer in a liquid crystal-polymer composite material of the present invention is preferably produced by polymerization of a polymerizable raw material composed of one or two or more of these compounds and, if necessary, another polymerizable compound.

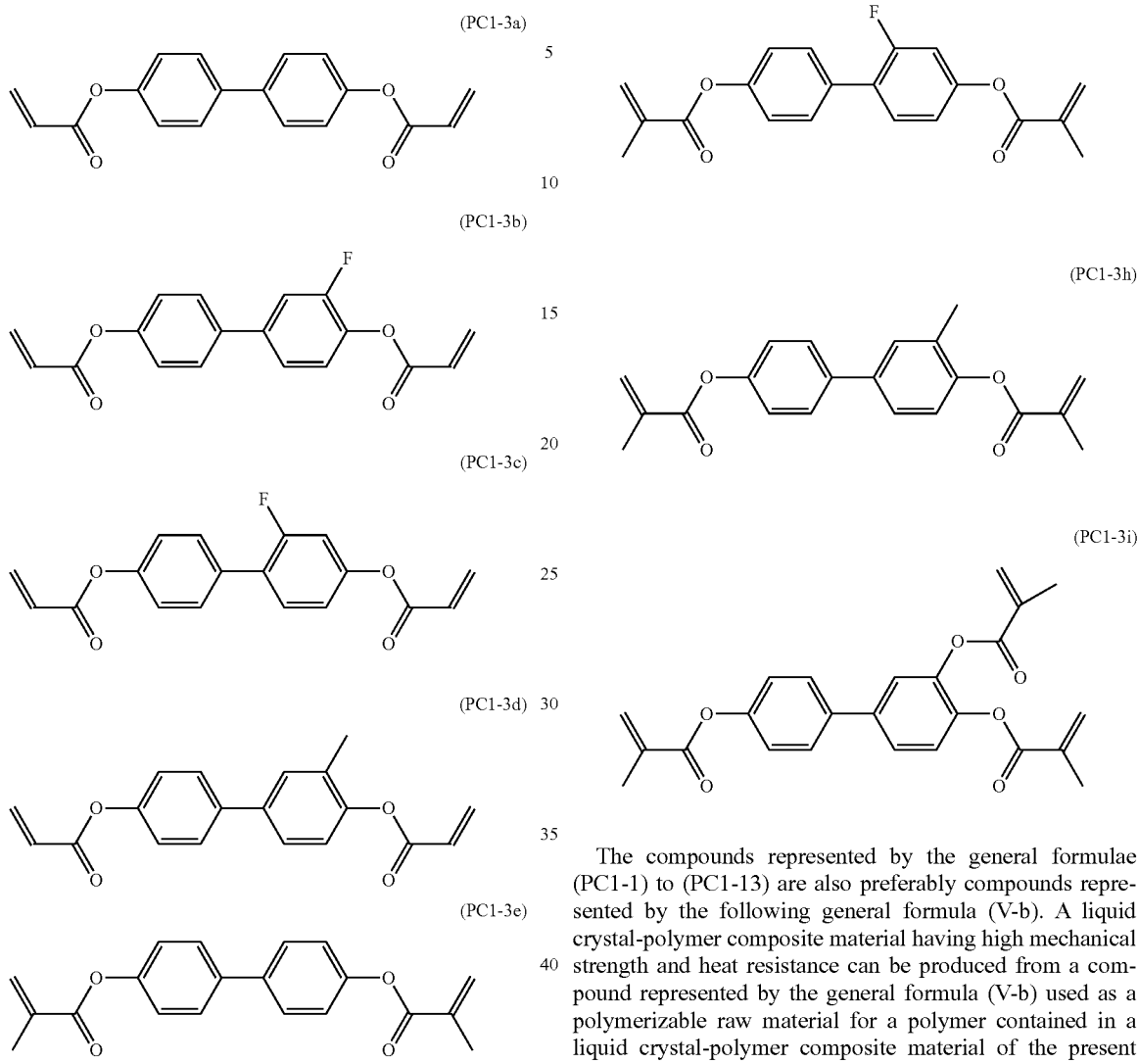

The compounds represented by the general formulae (PC1-1) to (PC1-13) are also preferably compounds represented by the following general formula (V-b). A liquid crystal-polymer composite material having high mechanical strength and heat resistance can be produced from a compound represented by the general formula (V-b) used as a polymerizable raw material for a polymer contained in a liquid crystal-polymer composite material of the present invention.

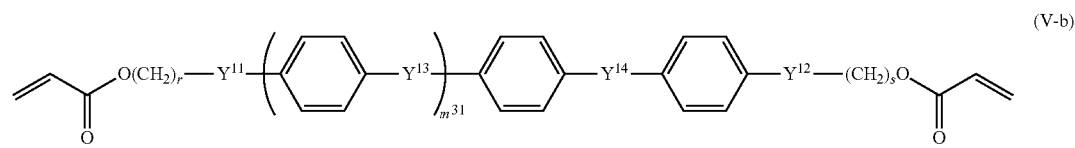

In the general formula (V-b), $m^{31}$ is 0 or 1, $Y^{11}$ and $Y^{12}$ independently denote a single bond, —O—, —COO—, or —OCO—, $Y^{13}$ and $Y^{14}$ independently denote a single bond, —COO—, —OCO—, —CH=CH—COO—, —OCO—CH=CH—, —CH=CH—OCO—, —COO—CH=CH—, —COOC$_2$H$_4$—, —OCOC$_2$H$_4$—, —C$_2$H$_4$OCO—, or —C$_2$H$_4$COO—, and r and s are independently an integer in the range of 2 to 14.

The 1,4-phenylene groups in the general formula (V-b) may be unsubstituted, and one or two or more hydrogen atoms may be independently substituted by a fluorine atom,

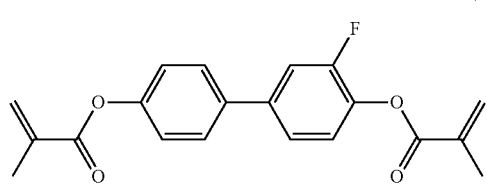

a chlorine atom, a methyl group, a trifluoromethyl group, a trifluoromethoxy group, or a phenyl group.

The compounds represented by the general formula (V-b) are particularly preferably compounds represented by the following general formulae (V-b1) to (V-b20). In the general formulae (V-b1) to (V-b20), t and u are independently an integer in the range of 2 to 14. A polymer in a liquid crystal-polymer composite material of the present invention is preferably produced by polymerization of a polymerizable raw material composed of one or two or more of these compounds and, if necessary, another polymerizable compound.

[Chem. 51]

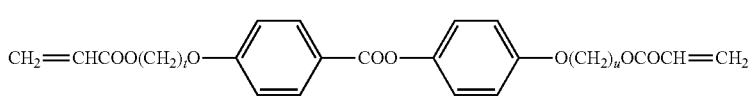
(V-b1)

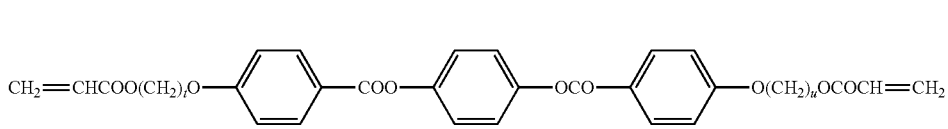
(V-b2)

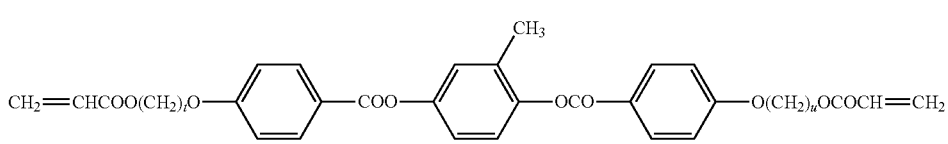
(V-b3)

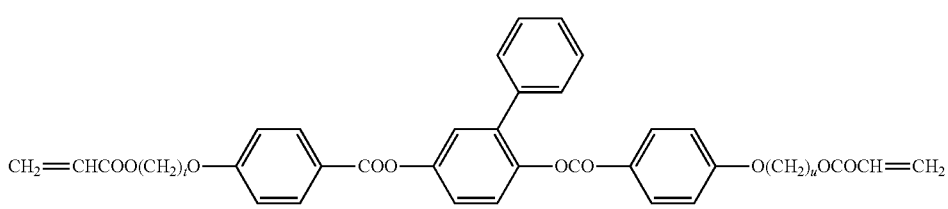
(V-b4)

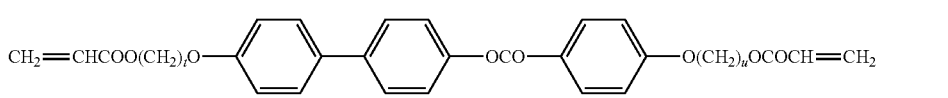
(V-b5)

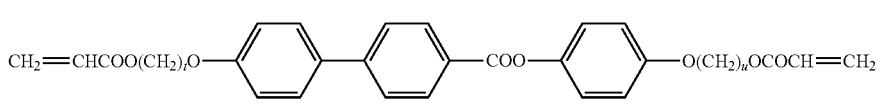
(V-b6)

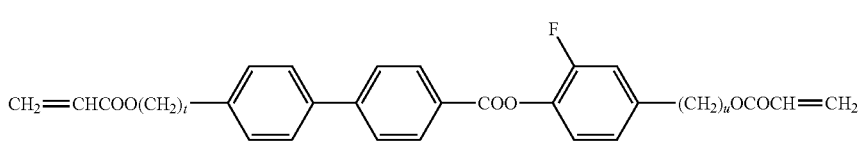
(V-b7)

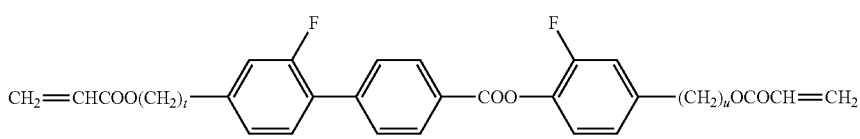
(V-b8)

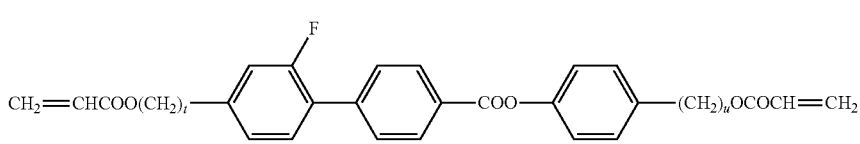
(V-b9)

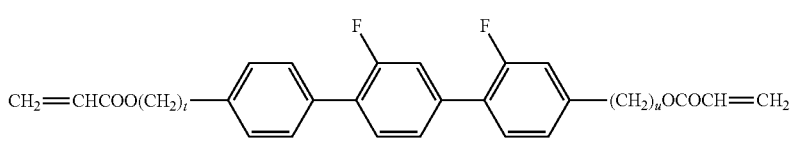
(V-b10)

-continued
[Chem. 52]
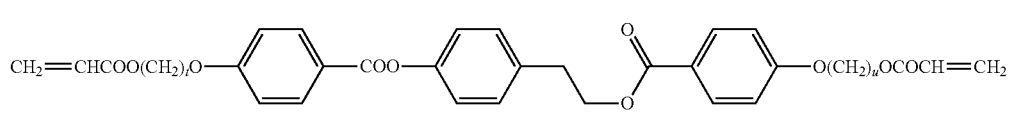
(V-b11)
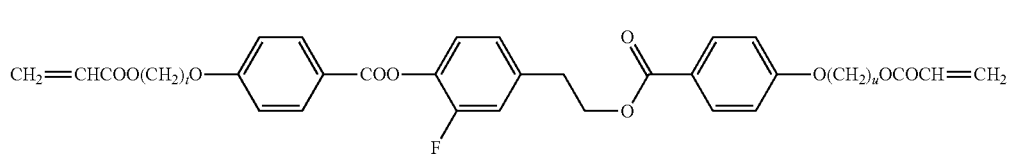
(V-b12)
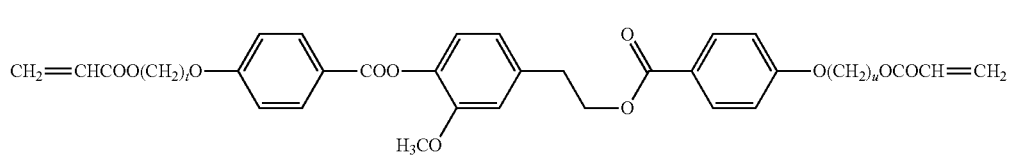
(V-b13)
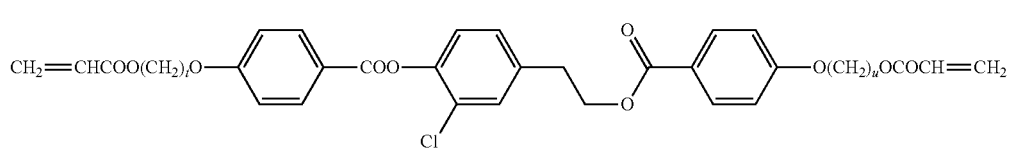
(V-b14)
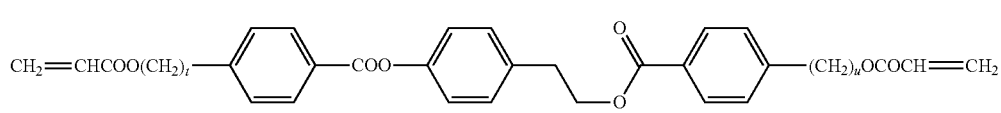
(V-b15)
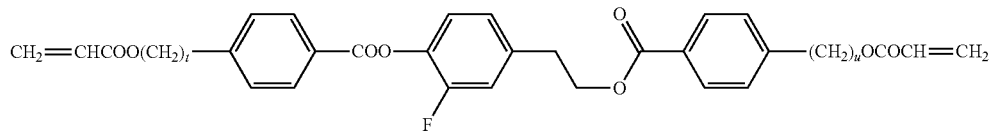
(V-b16)
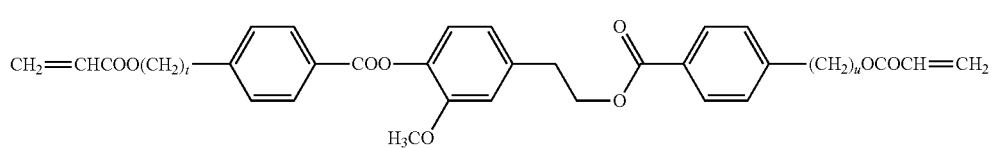
(V-b17)
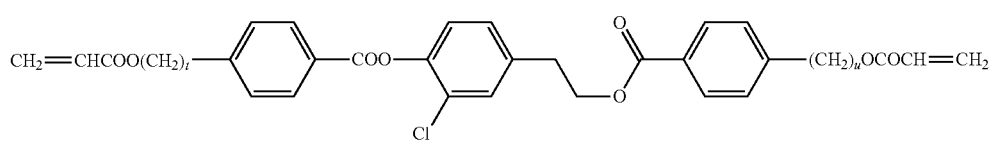
(V-b18)
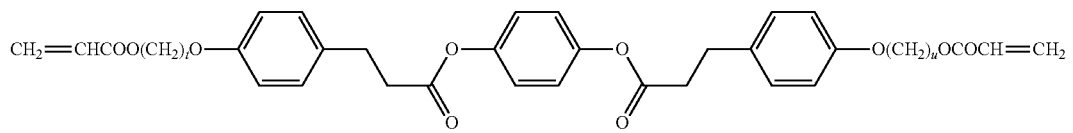
(V-b19)
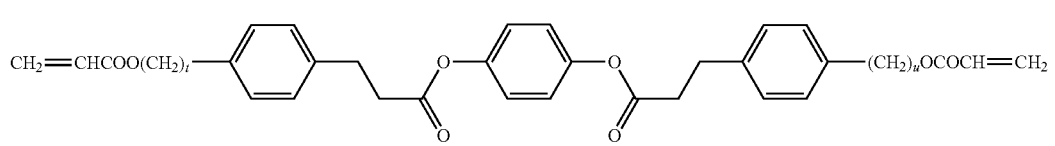
(V-b20)

<Non-Mesogenic Polymerizable Compound>

The non-mesogenic polymerizable compounds are preferably compounds represented by the following general formula (PC2).

[Chem. 53]

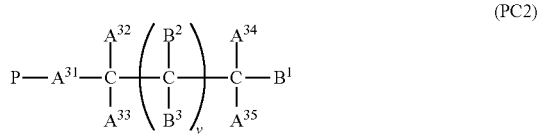
(PC2)

In the general formula (PC2), P denotes a polymerizable group. P is preferably a group having a structure represented by one of the formulae (R-1) to (R-16). In a compound represented by the general formula (PC2), P preferably denotes a group represented by the formula (R-1), (R-2), (R-4), (R-5), (R-7), (R-11), (R-13), (R-15), or (R-16), more preferably a group represented by the formula (R-1), (R-2), (R-7), (R-11), (R-13), or (R-16), still more preferably a group represented by the formula (R-1), (R-2), or (R-16).

In the general formula (PC2), $A^{31}$ denotes a single bond or an alkylene group having 1 to 15 carbon atoms. One or two or more methylene groups in the alkylene group may be independently substituted by —O—, —CO—, —COO—, or —OCO—, provided that oxygen atoms are not directly bonded to each other. One or two or more hydrogen atoms in the alkylene group may be independently substituted by a fluorine atom, a methyl group, or an ethyl group.

In the general formula (PC2), $A^{32}$ and $A^{34}$ independently denote a hydrogen atom or an alkyl group having 1 to 18 carbon atoms. One or two or more methylene groups in the alkyl group may be independently substituted by —O—, —CO—, —COO—, or —OCO—, provided that oxygen atoms are not directly bonded to each other. One or two or more hydrogen atoms in the alkyl group may be independently substituted by a halogen atom or an alkyl group having 1 to 17 carbon atoms.

In the general formula (PC2), $A^{33}$ and $A^{35}$ independently denote a hydrogen atom or an alkyl group having 1 to 10 carbon atoms. One or two or more methylene groups in the alkyl group may be independently substituted by —O—, —CO—, —COO—, or —OCO—, provided that oxygen atoms are not directly bonded to each other. One or two or more hydrogen atoms in the alkyl group may be independently substituted by a halogen atom or an alkyl group having 1 to 9 carbon atoms.

In the general formula (PC2), v is an integer in the range of 1 to 40.

In the general formula (PC2), $B^1$, $B^2$, and $B^3$ independently denote a group represented by a hydrogen atom, a linear or branched alkyl group having 1 to 10 carbon atoms, or -$A^{36}$-P (wherein $A^{36}$ denotes a single bond or an alkylene group having 1 to 15 carbon atoms, and P denotes a polymerizable group). When $B^1$, $B^2$, or $B^3$ denotes an alkyl group, one or two or more methylene groups in the alkyl group may be independently substituted by —O—, —CO—, —COO—, or —OCO—, provided that oxygen atoms are not directly bonded to each other. When $B^1$, $B^2$, or $B^3$ denotes a group represented by -$A^{36}$-P, and $A^{36}$ denotes an alkylene group having 1 to 15 carbon atoms, one or two or more methylene groups in the alkylene group may be independently substituted by —O—, —CO—, —COO—, or —OCO—, provided that oxygen atoms are not directly bonded to each other. One or two or more hydrogen atoms in the alkylene group may be independently substituted by a fluorine atom, a methyl group, or an ethyl group. Among the (2v+1) $B^1$, $B^2$, or $B^3$, the number of -$A^{36}$-P groups ranges from 0 to 3 per molecule. When one molecule includes a plurality of Ps, they may be the same or different.

A polymerizable compound to be used as a raw material for a polymer in a liquid crystal-polymer composite material of the present invention is preferably one or two or more compounds represented by the general formula (PC2) or may be a plurality of compounds represented by the general formula (PC2) having different main chain lengths or alkyl side chain lengths.

More specifically, the compounds represented by the general formula (PC2) preferably include compounds represented by the following general formulae (PC2-a) to (PC2-h). A polymerizable compound to be used as a raw material for a polymer in a liquid crystal-polymer composite material of the present invention is preferably one or more selected from the group consisting of compounds represented by the general formulae (PC2-a) to (PC2-h), more preferably at least one compound selected from the group consisting of compounds represented by the general formulae (PC2-a) to (PC2-d).

[Chem. 54]

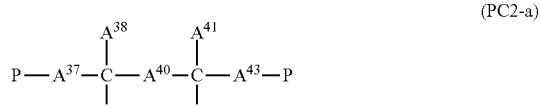
(PC2-a)

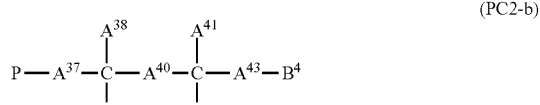
(PC2-b)

(PC2-c)

(PC2-d)

(PC2-e)

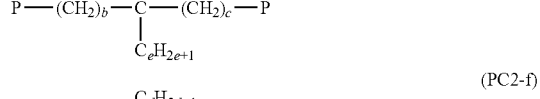
(PC2-f)

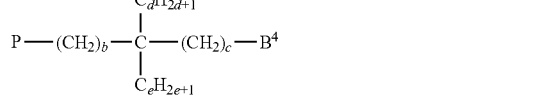
(PC2-g)

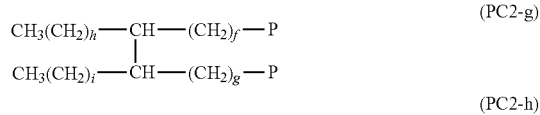
(PC2-h)

In the general formulae (PC2-a) to (PC2-h), P denotes a polymerizable group, and $B^4$ denotes a hydrogen atom or a methyl group. P preferably denotes a group having a structure represented by one of the formulae (R-1) to (R-16), more preferably a group represented by the formula (R-1), (R-2), or (R-16), still more preferably a group represented by the formula (R-1) due to a high rate of polymerization. In a compound represented by the general formula (PC2-a), (PC2-c), (PC2-e), or (PC2-g), two Ps in one molecule may be the same or different.

In the general formula (PC2-a) or (PC2-b), $A^{37}$ and $A^{42}$ independently denote a single bond or an alkylene group having 1 to 15 carbon atoms. One or two or more methylene groups in the alkylene group may be independently substituted by —O—, —CO—, —COO—, or —OCO—, provided that oxygen atoms are not directly bonded to each other. One or two or more hydrogen atoms in the alkylene group may be independently substituted by a fluorine atom, a methyl group, or an ethyl group.

In the general formula (PC2-a) or (PC2-b), $A^{38}$ and $A^{41}$ independently denote a linear alkyl group having 2 to 20 carbon atoms. One or two or more methylene groups in the alkyl group may be independently substituted by —O—, —CO—, —COO—, or —OCO—, provided that oxygen atoms are not directly bonded to each other.

In the general formula (PC2-a) or (PC2-b), $A^{35}$ and $A^{42}$ independently denote a hydrogen atom or an alkyl group having 1 to 10 carbon atoms. One or two or more methylene groups in the alkyl group may be independently substituted by —O—, —CO—, —COO—, or —OCO—, provided that oxygen atoms are not directly bonded to each other. One or two or more hydrogen atoms in the alkyl group may be independently substituted by a halogen atom or an alkyl group having 1 to 9 carbon atoms.

In the general formula (PC2-a) or (PC2-b), $A^{40}$ denotes an alkylene group having 9 to 16 carbon atoms. In one to five methylene groups in the alkylene group, one hydrogen atom of the methylene groups is substituted by a linear or branched alkyl group having 1 to 10 carbon atoms. One or two or more methylene groups in the alkylene group may be independently substituted by —O—, —CO—, —COO—, or —OCO—, provided that oxygen atoms are not directly bonded to each other.

In a compound represented by the general formula (PC2-a), the distance between two polymerizable groups (the distance between cross-linking sites) can be adjusted by independently changing the length of the number of carbon atoms in $A^{31}$, $A^{40}$, and $A^{43}$. One of the characteristics of a compound represented by the general formula (PC2-a) is a long distance between polymerizable groups. However, an excessively long distance results in a very low rate of polymerization and may adversely affect phase separation. Thus, the distance between polymerizable groups has an upper limit. The distance between two side chains $A^{38}$ and $A^{41}$ also has an influence on the mobility of the main chain. More specifically, a short distance between $A^{38}$ and $A^{41}$ results in interference between the side chains $A^{38}$ and $A^{41}$ and low mobility of the entire compound. When the distance between polymerizable groups is constant, a large number of carbon atoms of $A^{40}$ is preferred over a large number of carbon atoms of $A^{38}$ and $A^{41}$.

In the general formula (PC2-a) or (PC2-b), $A^{40}$ is preferably long in order to adjust the distance between side chains (the distance between $A^{33}$ and $A^{41}$ and the distance between $A^{39}$ and $A^{42}$) and to increase the distance between cross-linking sites and thereby decrease the glass transition temperature. However, an excessively long $A^{40}$ tends to result in low compatibility with a liquid crystal composition due to an excessively high molecular weight of a compound represented by the general formula (PC2-a) or (PC2-b) and adversely affects phase separation due to an excessively low rate of polymerization. Thus, the length of $A^{40}$ has an upper limit.

Thus, in a compound represented by the general formula (PC2-a) or (PC2-b), $A^{40}$ preferably denotes an alkylene group having 9 to 16 carbon atoms (In one to five methylene groups in the alkylene group, one hydrogen atom of the methylene groups is substituted by a linear or branched alkyl group having 1 to 10 carbon atoms. One or two or more methylene groups in the alkylene group may be independently substituted by —O—, —CO—, —COO—, or —OCO—, provided that oxygen atoms are not directly bonded to each other).

$A^{49}$ has a characteristic structure in which a hydrogen atom of the alkylene group is substituted by an alkyl group having 1 to 10 carbon atoms. The number of hydrogen atoms substituted by an alkyl group in one alkylene group ranges from one to five, preferably one to three, more preferably two or three. The number of carbon atoms of the alkyl group substituent preferably ranges from 1 to 5, more preferably 1 to 3.

On the other hand, in side chains $A^{38}$, $A^{39}$, $A^{41}$, and $A^{42}$, these side chains preferably have the following lengths. In the general formula (PC2-a) or (PC2-b), when $A^{38}$ and $A^{39}$ bonded to the same carbon atom of the main chain have different lengths, a longer side chain is referred to as $A^{38}$ (when $A^{38}$ and $A^{39}$ have the same length, one of them is referred to as $A^{38}$). Likewise, when $A^{41}$ and $A^{42}$ have different lengths, a longer side chain is referred to as $A^{41}$ (when $A^{41}$ and $A^{42}$ have the same length, one of them is referred to as $A^{41}$).

Side chains have higher mobility than main chains. Thus, side chains generally contribute to high mobility of the polymer chain at low temperatures. However, the mobility decreases when side chains have steric interference. It is effective to decrease the side chain length to the extent necessary to prevent steric interference between side chains.

In the general formula (PC2-a) or (PC2-b), $A^{38}$ and $A^{41}$ independently preferably denote a linear alkyl group having 2 to 18 carbon atoms (in which one or two or more methylene groups may be independently substituted by —O—, —CO—, —COO—, or —OCO—, provided that oxygen atoms are not directly bonded to each other), more preferably a linear alkyl group having 3 to 15 carbon atoms (in which one or two or more methylene groups may be independently substituted by —O—, —CO—, —COO—, or —OCO—, provided that oxygen atoms are not directly bonded to each other).

Excessively long $A^{39}$ and $A^{42}$ also unfavorably induce steric interference between the side chains. On the other hand, it is assumed that short side chains have high mobility, prevent adjacent main chains from coming closer, prevent interference between polymer main chains, and increase the mobility of main chains. Thus, in a compound represented by the general formula (PC2-a) or (PC2-b), short $A^{39}$ and $A^{42}$ can prevent anchoring energy from increasing at low temperatures and are effective in improving the low-temperature characteristics of a liquid crystal optical device produced from the resulting liquid crystal-polymer composite material.

In the general formula (PC2-a) or (PC2-b), $A^{39}$ and $A^{42}$ independently preferably denote a hydrogen atom or an alkyl group having 1 to 7 carbon atoms (in which one or two or more methylene groups may be independently substituted by —O—, —CO—, —COO—, or —OCO—, provided that oxygen atoms are not directly bonded to each other), more preferably a hydrogen atom or an alkyl group having 1 to 5 carbon atoms (in which one or two or more methylene groups may be independently substituted by —O—, —CO—, —COO—, or —OCO—, provided that oxygen atoms are not directly bonded to each other), still more preferably a hydrogen atom or an alkyl group having 1 to 3 carbon atoms (in which one or two or more methylene groups may be independently substituted by —O—, —CO—, —COO—, or —OCO—, provided that oxygen atoms are not directly bonded to each other).

In the general formula (PC2-c) or (PC2-d), a is an integer in the range of 6 to 22. A compound represented by the general formula (PC2-d) in which $B^4$ denotes a hydrogen atom may be an alkyl acrylate, such as dodecyl acrylate.

In the general formula (PC2-e) or (PC2-f), b and c are independently an integer in the range of 1 to 10, d is an integer in the range of 1 to 10, and e is an integer in the range of 0 to 6. In order to suppress steric interference between side chains, at least one of d and e is preferably an integer in the range of 1 to 5, more preferably an integer in the range of 1 to 3.

In the general formula (PC2-g) or (PC2-h), f, g, h, and i are independently an integer in the range of 1 to 10. In order to suppress steric interference between side chains, at least one of h and i is preferably an integer in the range of 1 to 5, more preferably an integer in the range of 1 to 3.

The compounds represented by the general formula (PC2), including the compounds represented by the general formulae (PC2-a) to (PC2-h), can be synthesized from known compounds used as starting materials by appropriately combining known organic synthesis reactions.

For example, a compound represented by the general formula (PC2-a) wherein $A^{39}$ and $A^{42}$ denote hydrogen atoms can be produced by reacting a compound having a plurality of epoxy groups with a polymerizable compound having an active hydrogen that can react with an epoxy group, such as acrylic acid or methacrylic acid, to synthesize a polymerizable compound having a hydroxy group, and then reacting the polymerizable compound with a saturated fatty acid.

Furthermore, it can also be produced by reacting a compound having a plurality of epoxy groups with a saturated fatty acid to synthesize a compound having a hydroxy group, and then reacting the compound having a hydroxy group with a polymerizable compound having a group that can react with a hydroxy group, such as acrylic acid chloride.

A compound represented by the general formula (PC2-a) wherein $A^{39}$ and $A^{42}$ denote alkyl groups and $A^{37}$ and $A^{43}$ denote methylene groups can be produced by reacting a compound having a plurality of oxetane groups with a fatty acid chloride or fatty acid that can react with an oxetane group and reacting the product with a polymerizable compound having an active hydrogen, such as acrylic acid, or by reacting a compound having one oxetane group with a polyvalent fatty acid chloride or fatty acid that can react with an oxetane group and reacting the product with a polymerizable compound having an active hydrogen, such as acrylic acid.

A compound represented by the general formula (PC2-a) wherein $A^{37}$ and $A^{43}$ denote alkylene groups having 3 carbon atoms (propylene group; —$CH_2CH_2CH_2$—) can be produced in the same manner from a compound having a plurality of furan groups instead of oxetane groups. A compound represented by the general formula (PC2-a) wherein $A^{37}$ and $A^{43}$ denote alkylene groups having 4 carbon atoms (butylene group; —$CH_2CH_2CH_2CH_2$—) can be produced from a compound having a plurality of pyran groups instead of oxetane groups.

<Polymerizable Compound Having Chirality>

Preferably, a polymerizable compound to be used as a raw material for a polymer in a liquid crystal-polymer composite material of the present invention is an achiral compound or substantially a racemate. A chiral polymerizable compound may also be used. The chiral polymerizable compound may be a polymerizable compound represented by the following general formula (VI-a) or (VI-b).

[Chem. 55]

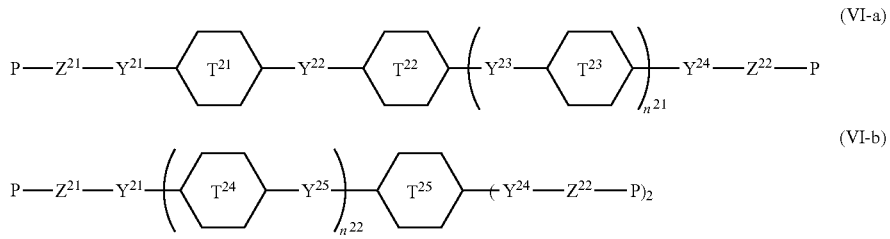

In the general formulae (VI-a) and (VI-b), P denotes a polymerizable group. P preferably denotes a group having a structure represented by one of the formulae (R-1) to (R-16), more preferably a group represented by the formula (R-1), (R-2), or (R-16), still more preferably a group represented by the formula (R-1) or (R-2), still more preferably a group represented by the formula (R-1) due to a high rate of polymerization.

In the general formula (VI-a), $n^{22}$ is an integer of 0 or 1. In the general formula (VI-b), $n^{22}$ is an integer of 0, 1, or 2. When $n^2$ is 2, and one molecule includes a plurality of $T^{24}$s and $Y^{25}$s, they may be the same or different.

In the general formulae (VI-a) and (VI-b), $T^{21}$, $T^{22}$, $T^{23}$, and $T^{24}$ independently denote a divalent group having a 6-membered ring structure (6-membered cyclic divalent group). The 6-membered cyclic divalent groups may be the following twelve 6-membered cyclic divalent groups. In the following general formulae, m is an integer in the range of 1 to 4. In a compound represented by the general formula (VI-a) or (VI-b), $T^{21}$, $T^{22}$, $T^{23}$, and $T^{24}$ independently preferably denote one of the twelve 6-membered cyclic divalent groups, more preferably a 1,4-phenylene group or a trans-1,4-cyclohexylene group.

[Chem. 56]

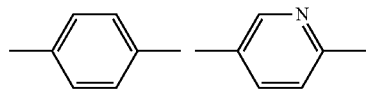

-continued

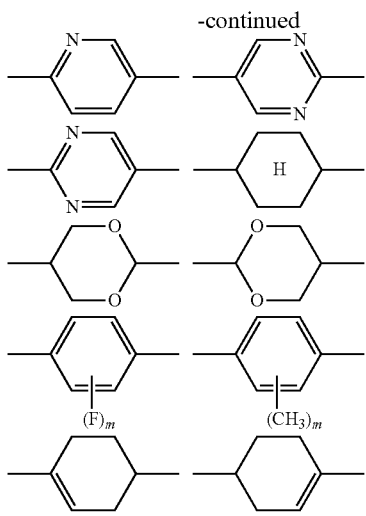

In the general formula (VI-b), $T^{25}$ denotes a trivalent group having a 6-membered ring structure (6-membered cyclic trivalent group). The 6-membered cyclic trivalent group may be a benzene-1,2,4-triyl group, a benzene-1,3,4-triyl group, a benzene-1,3,5-triyl group, a cyclohexane-1,2,4-triyl group, a cyclohexane-1,3,4-triyl group, or a cyclohexane-1,3,5-triyl group.

In the general formulae (VI-a) and (VI-b), $Y^{22}$, $Y^{23}$, and $Y^{25}$ independently denote a single bond or a linear or branched alkylene group having 1 to 10 carbon atoms. One methylene group or two nonadjacent methylene groups in the alkylene group may be independently substituted by —O—, —S—, —CO—O—, or —O—CO—, provided that oxygen atoms and sulfur atoms are not directly bonded to each other. One or two or more hydrogen atoms in the alkylene group may be independently substituted by a fluorine atom or a chlorine atom. The alkylene group may or may not contain an asymmetric carbon atom. For example, the alkylene group is —CH$_2$CH$_2$—, —CH$_2$O—, —OCH$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH=CHCH$_2$CH$_2$—, or —CH$_2$CH$_2$CH=CH—.

In the general formulae (VI-a) and (VI-b), $Y^{21}$ and $Y^{24}$ independently denote a single bond, —O—, —OCO—, or —COO—.

In the general formulae (VI-a) and (VI-b), $Z^{21}$ denotes an alkylene group having 3 to 20 carbon atoms including an asymmetric carbon atom and having a branched-chain structure.

In the general formulae (VI-a) and (VI-b), $Z^2$ denotes an alkylene group having 1 to 20 carbon atoms. The alkylene group may or may not contain an asymmetric carbon atom.

The raw materials of a polymer in a liquid crystal-polymer composite material of the present invention contain at least one polymerizable compound and preferably contain a combination of a plurality of polymerizable compounds so as to achieve the desired physical properties of the resulting polymerized substance (polymer) after a polymerization reaction. The plurality of polymerizable compounds are preferably composed of at least one monofunctional polymerizable compound and at least one polyfunctional polymerizable compound. When the raw materials contain a polyfunctional polymerizable compound, the resulting liquid crystal-polymer composite material contains a polymer having a cross-linked structure after a polymerization reaction.

A polymer in a liquid crystal-polymer composite material of the present invention preferably has a glass transition temperature in the range of −100° C. to 25° C. The type and composition of polymerizable compounds used as raw materials are preferably adjusted such that the resulting polymer after a polymerization reaction has a glass transition temperature in this range.

The raw materials of a polymer in a liquid crystal-polymer composite material of the present invention preferably contain at least one mesogenic polymerizable compound and at least one non-mesogenic polymerizable compound. The use of both a mesogenic polymerizable compound and a non-mesogenic polymerizable compound as raw materials of the polymer can broaden the temperature range in which a liquid crystal-polymer composite material produced by a polymerization reaction can form an optically isotropic phase.

In order to broaden the blue phase III forming temperature range, the raw materials of a polymer in a liquid crystal-polymer composite material of the present invention preferably contain at least one polyfunctional mesogenic polymerizable compound and at least one monofunctional or polyfunctional non-mesogenic polymerizable compound, more preferably at least one compound selected from the group consisting of the compounds represented by the formulae (PC1-3a) to (PC1-3i) and the compounds represented by the general formulae (V-b1) to (V-b20) and at least one compound selected from the group consisting of the compounds represented by the general formulae (PC2-a) to (PC2-h), still more preferably one or more compounds selected from the group consisting of the compounds represented by the formulae (PC1-3a) to (PC1-3i) and the compounds represented by the general formulae (V-b1) to (V-b20) and at least one compound selected from the group consisting of the compounds represented by the general formulae (PC2-a) to (PC2-d).

[Method for Producing Liquid Crystal-Polymer Composite Material]

For example, a liquid crystal-polymer composite material of the present invention can be produced by mixing a nematic liquid crystal composition, all the chiral compounds, and all the polymerizable compounds serving as the raw materials of a polymer to prepare a liquid crystal composition containing the polymerizable compounds and by polymerizing a compound having a polymerizable group in the liquid crystal composition containing the polymerizable compounds.

The nematic liquid crystal composition, the chiral compounds, and the polymerizable compounds may be mixed in any order. All the raw materials may be substantially simultaneously mixed. Alternatively, a liquid crystal composition containing the nematic liquid crystal composition and the chiral compounds may be mixed with all the polymerizable compounds serving as the raw materials of the polymer. The total amount of all the polymerizable compounds in the liquid crystal composition containing the polymerizable compounds can be determined in consideration of the type of polymerizable compounds, the type of nematic liquid crystal composition, and the type of chiral compounds, and preferably ranges from 0.1% to 40% by mass, more preferably 1% to 40% by mass, still more preferably 1% to 25% by mass. The amount of a mixture of the nematic liquid crystal composition and the chiral compounds in the liquid crystal composition containing the polymerizable compounds preferably ranges from 60% to 95% by mass, more preferably 60% to 90% by mass, still more preferably 60% to 80% by mass.

If necessary, the liquid crystal composition containing the polymerizable compounds may contain a polymerization initiator. For example, when the polymerizable compounds in the liquid crystal composition containing the polymerizable compounds are polymerized by radical polymerization, a thermal polymerization initiator or a photopolymerization initiator may be added to the liquid crystal composition as a radical polymerization initiator. More specifically, the following compounds are preferably used:

acetophenones, such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenylketone, 2-methyl-2-morpholino(4-thiomethylphenyl)propan-1-one, and 2-benzyl-2-dimethylamino-1-(4-morpholinophenyl)-butanone;

benzoins, such as benzoin, benzoin isopropyl ether, and benzoin isobutyl ether;

acylphosphine oxides, such as 2,4,6-trimethylbenzoyldiphenylphosphine oxide;

benzyl, methyl phenylglyoxylates;

benzophenones, such as benzophenone, methyl o-benzoylbenzoate, 4-phenylbenzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl)benzophenone, and 3,3'-dimethyl-4-methoxybenzophenone;

thioxanthones, such as 2-isopropylthioxanthone, 2,4-dimethylthioxanthone, 2,4-diethylthioxanthone, and 2,4-dichlorothioxanthone;

aminobenzophenones, such as Michler's ketone and 4,4'-diethylaminobenzophenone; and 10-butyl-2-chloroacridone, 2-ethylanthraquinone, 9,10-phenanthrenequinone, camphorquinone, and the like.

Among these compounds, benzyl dimethyl ketal is preferred as a radical polymerization initiator to be contained in the liquid crystal composition containing the polymerizable compounds.

The liquid crystal composition containing the polymerizable compounds may contain various additive agents generally used in liquid crystal compositions, without losing the advantages of the present invention. For example, a stabilizer, such as an antioxidant or an ultraviolet absorber, may be added to the liquid crystal composition in order to improve the storage stability of the liquid crystal composition. Examples of the stabilizer to be used include hydroquinones, hydroquinone monoalkyl ethers, tert-butylcatechols, pyrogallols, thiophenols, nitro compounds, β-naphthylamines, β-naphthols, and nitroso compounds. The amount of stabilizer to be used preferably ranges from 0.005% to 1% by mass, more preferably 0.02% to 0.5% by mass, particularly preferably 0.03% to 0.1% by mass, of the liquid crystal composition.

The liquid crystal composition containing the polymerizable compounds before a polymerization reaction can preferably form an optically isotropic phase, more preferably a blue phase, still more preferably a blue phase III. A polymer formed by a polymerization reaction stabilizes the optically isotropic phase. More specifically, a liquid crystal-polymer composite material produced by a polymerization reaction can form an optically isotropic phase in a wider temperature range than a liquid crystal composition before the polymerization reaction.

A polymerization reaction of the liquid crystal composition containing the polymerizable compounds is performed by a known method, including a method of irradiation with ultraviolet light or an active energy beam, such as an electron beam, or a thermal polymerization method, depending on the type of polymerizable compounds to be used.

In the present invention, an active energy beam irradiation method is preferred because it can cause a reaction at room temperature without heating, and, among others, a method of irradiation with light, such as ultraviolet light, is preferred in terms of simple operation. When ultraviolet light is used, a polarized or unpolarized light source may be used.

The polymerization reaction is preferably performed while the liquid crystal composition containing the polymerizable compounds retains an optically isotropic phase, particularly a blue phase. For example, when the liquid crystal composition containing the polymerizable compounds forms a blue phase III, a liquid crystal-polymer composite material having a wider blue phase III forming temperature range than the liquid crystal composition containing the polymerizable compounds before a polymerization reaction can be produced by starting the polymerization reaction in a temperature range in which the liquid crystal composition containing the polymerizable compounds forms the blue phase III, continuing the polymerization reaction while the blue phase III is retained, and finishing the polymerization reaction in a temperature range in which a liquid crystal-polymer composite material produced by the polymerization reaction forms the blue phase III.

In order to produce a liquid crystal-polymer composite material having a wider blue phase III forming temperature range, the raw materials preferably contain a nematic liquid crystal composition in which the amount of liquid crystal compounds having benzene skeletons more than cyclohexane skeletons in their molecules is 50% or more by mass of the total amount of liquid crystal compounds in the nematic liquid crystal composition, and a chiral compound having a negative temperature dependence of helical twisting power, more preferably a nematic liquid crystal composition in which the amount of liquid crystal compounds having benzene skeletons more than cyclohexane skeletons in their molecules is 50% or more by mass of the total amount of the nematic liquid crystal composition, and the amount of the liquid crystal compounds in which the number of cyclohexane skeletons is greater than or equal to the number of benzene skeletons in the molecules ranges from 1% to 50% by mass, and a chiral compound having a negative temperature dependence of helical twisting power. In particular, in order to produce a liquid crystal-polymer composite material that can form the blue phase III in a temperature range of −20° C. to 60° C., the raw materials preferably contain a nematic liquid crystal composition containing 10% to 50% by mass of a compound represented by the general formula (II) and 50% to 90% by mass of a compound represented by the general formula (III), the amount of liquid crystal compounds having benzene skeletons more than cyclohexane skeletons in their molecules being 50% or more by mass of the total amount of liquid crystal compounds in the composition, the amount of the liquid crystal compounds in which the number of cyclohexane skeletons is greater than or equal to the number of benzene skeletons in the molecules ranging from 1% to 50% by mass, and a chiral compound having a negative temperature dependence of helical twisting power.

The use of two or more chiral compounds as raw materials can broaden the temperature range in which the blue phase III is formed without another phase, as compared with the use of one chiral compound. In particular, a chiral compound having a negative temperature dependence of helical twisting power and a chiral compound having a positive temperature dependence of helical twisting power can be used in combination to produce a liquid crystal-polymer composite material that can form a blue phase III without a blue phase I, a blue phase II, or a liquid phase in an unprecedentedly very wide temperature range (for example, a temperature range of 2° C. or more)

In a liquid crystal-polymer composite material of the present invention produced by polymerization of a liquid crystal composition containing a polymerizable compound that can form a blue phase, particularly a blue phase III, the blue phase forming temperature range is unprecedentedly broaden without losing the high-speed responsivity of the blue phase. Thus, such a liquid crystal-polymer composite material is suitable as a raw material for liquid crystal optical devices driven by an optically isotropic phase.

(Color Filter)

A color filter in the present invention is composed of a black matrix and at least RGB three-color pixel units. The RGB three-color pixel units contain, as a coloring material, a diketopyrrolopyrrole pigment and/or an anionic red organic dye in the R pixel unit, at least one selected from the group consisting of a halogenated copper phthalocyanine pigment, a phthalocyanine green dye, and a mixture of a phthalocyanine blue dye and an azo yellow organic dye in the G pixel unit, and an s-copper phthalocyanine pigment and/or a cationic blue organic dye in the B pixel unit.

The RGB three-color pixel units preferably contain, as a coloring material, C.I. Solvent Red 124 in the R pixel unit, a mixture of C.I. Solvent Blue 67 and C.I. Solvent Yellow 162 in the G pixel unit, and C.I. Solvent Blue 7 in the B pixel unit.

The RGB three-color pixel units preferably contain, as a coloring material, C.I. Pigment Red 254 in the R pixel unit, C.I. Pigment Green 7 and/or 36 in the G pixel unit, and C.I. Pigment Blue 15:6 in the B pixel unit.

The RGB three-color pixel units preferably further contain, as a coloring material in the R pixel unit, at least one organic dye or pigment selected from the group consisting of C.I. Pigment Red 177, 242, 166, 167, and 179, C.I. Pigment Orange 38 and 71, C.I. Pigment Yellow 150, 215, 185, 138, and 139, C.I. Solvent Red 89, C.I. Solvent Orange 56, and C.I. Solvent Yellow 21, 82, 83:1, 33, and 162.

The RGB three-color pixel units preferably further contain, as a coloring material in the G pixel unit, at least one organic dye or pigment selected from the group consisting of C.I. Pigment Yellow 150, 215, 185, and 138 and C.I. Solvent Yellow 21, 82, 83:1, and 33.

The RGB three-color pixel units preferably further contain, as a coloring material in the B pixel unit, at least one organic dye or pigment selected from the group consisting of C.I. Pigment Blue 1, C.I. Pigment Violet 23, C.I. Basic Blue 7, C.I. Basic Violet 10, C.I. Acid Blue 1, 90, and 83, and C.I. Direct Blue 86.

It is also preferable that the color filter includes a black matrix, RGB three-color pixel units, and a Y pixel unit, and contains, as a coloring material, at least one yellow organic dye or pigment selected from the group consisting of C.I. Pigment Yellow 150, 215, 185, 138, and 139 and C.I. Solvent Yellow 21, 82, 83:1, 33, and 162 in the Y pixel unit.

In color filters, color filter pixel units can be formed by a known method. A typical method for forming pixel units is photolithography. In photolithography, a photocurable composition described below is applied to a surface of a transparent substrate for a color filter on which a black matrix is disposed, is heated and dried (prebaked), and is irradiated with ultraviolet light for pattern exposure through a photomask, thereby curing a photocurable compound in a portion corresponding to each pixel unit. An unexposed portion is then developed with a developer, and a portion other than the pixel units is removed. Thus, the pixel units are fixed on the transparent substrate. The pixel units each formed of a cured color film of the photocurable composition are formed on the transparent substrate by this method.

This operation can be performed multiple times using each photocurable composition described below prepared for the R pixels, G pixels, B pixels, and other optional color pixels, such as Y pixels, thereby producing a color filter having color pixel units of R pixels, G pixels, B pixels, and Y pixels at predetermined positions.

A photocurable composition described below may be applied to a transparent substrate, such as a glass substrate, by a spin coating method, a roll coating method, or an ink jet method.

The drying conditions for a film of a photocurable composition applied to a transparent substrate depend on the type of each component and the formulation and are generally approximately 50° C. to 150° C. for 1 to 15 minutes. Light for use in photo-curing of photocurable compositions is preferably ultraviolet light having a wavelength in the range of 200 to 500 nm or visible light. Various light sources that emit light having a wavelength in this range can be used.

The development method may be a puddle method, a dipping method, or a spray method. After a photocurable composition is exposed to light and developed, a transparent substrate on which necessary color pixel units are formed is washed with water and dried. A color filter thus produced is heat-treated (post-baked) with a heater, such as a hot plate or an oven, at a temperature in the range of 90° C. to 280° C. for a predetermined time to remove volatile components from the color coating films while heat-curing residual unreacted photocurable compounds in the cured color films of the photocurable composition, thereby completing the color filter.

The use of coloring materials for use in a color filter of the present invention in combination with a liquid crystal composition of the present invention can provide a liquid crystal display device that can prevent a decrease in the voltage holding ratio (VHR) of a liquid crystal layer and an increase in ion density (ID) and solve the problem of display defects, such as white spots, variations in alignment, and burn-in.

The photocurable composition is generally produced by mixing and uniformly dispersing essential components including a dye and/or pigment composition for use in a color filter of the present invention, an organic solvent, and a dispersant to prepare a pigment dispersion liquid for forming a pixel unit of the color filter, and by adding a photocurable compound, an optional thermoplastic resin, and an optional photopolymerization initiator to the pigment dispersion liquid.

Examples of the organic solvent include aromatic solvents, such as toluene, xylene, and methoxybenzene, acetate ester solvents, such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate, and diethylene glycol butyl ether acetate, propionate solvents, such as ethoxyethyl propionate, alcohol solvents, such as methanol and ethanol, ether solvents, such as butyl cellosolve, propylene glycol monomethyl ether, diethylene glycol ethyl ether, and diethylene glycol dimethyl ether, ketone solvents, such as methyl ethyl ketone, methyl isobutyl ketone, and cyclohexanone, aliphatic hydrocarbon solvents, such as hexane, nitrogen compound solvents, such as N,N-dimethylformamide, γ-butyrolactam, N-methyl-2-pyrrolidone, aniline, and pyridine, lactone solvents, such as γ-butyrolactone, and carbamates, such as a 48:52 mixture of methyl carbamate and ethyl carbamate.

Examples of the dispersant include dispersants, including Disperbyk 130, Disperbyk 161, Disperbyk 162, Disperbyk 163, Disperbyk 170, Disperbyk 171, Disperbyk 174, Disperbyk 180, Disperbyk 182, Disperbyk 183, Disperbyk 184, Disperbyk 185, Disperbyk 2000, Disperbyk 2001, Disperbyk 2020, Disperbyk 2050, Disperbyk 2070, Disperbyk 2096, Disperbyk 2150, Disperbyk LPN21116, and Disperbyk LPN6919 manufactured by BYK-Chemie, Efka 46, Efka 47, Efka 452, Efka LP4008, Efka 4009, Efka LP4010, Efka LP4050, LP4055, Efka 400, Efka 401, Efka 402, Efka 403, Efka 450, Efka 451, Efka 453, Efka 4540, Efka 4550, Efka LP4560, Efka 120, Efka 150, Efka 1501, Efka 1502, and Efka 1503 manufactured by Efka, Solsperse 3000, Solsperse 9000, Solsperse 13240, Solsperse 13650, Solsperse 13940, Solsperse 17000, 18000, Solsperse 20000, Solsperse 21000, Solsperse 20000, Solsperse 24000, Solsperse 26000, Solsperse 27000, Solsperse 28000, Solsperse 32000, Solsperse 36000, Solsperse 37000, Solsperse 38000, Solsperse 41000, Solsperse 42000, Solsperse 43000, Solsperse 46000, Solsperse 54000, and Solsperse 71000 manufactured by Lubrizol Corporation., and Ajisper PB711, Ajisper PB821, Ajisper PB822, Ajisper PB814, Ajisper PN411, and Ajisper PA111 manufactured by Ajinomoto Co., Inc., and water-insoluble synthetic resins that are liquid at room temperature, including acrylic resins, urethane resins, alkyd resins, natural rosins, such as wood rosin, gum rosin, and tall oil rosin, modified rosins, such as polymerized rosin, disproportionated rosin, hydrogenated rosin, oxidized rosin, and maleated rosin, and rosin derivatives, such as rosin amine, lime rosin, rosin alkylene oxide adducts, rosin alkyd adducts, and rosin modified phenol. The addition of these dispersants and resins can contribute to less flocculation, improved pigment dispersion stability, and improved viscosity characteristics of dispersions.

A phthalimide methyl derivative, a sulfonic acid derivative, an N-(dialkylamino)methyl derivative, or an N-(dialkylaminoalkyl)sulfonic acid amide derivative of an organic pigment derivative may also be contained as a dispersing aid. As a matter of course, two or more different types of these derivatives may also be used.

A thermoplastic resin for use in the preparation of a photocurable composition may be a urethane resin, an acrylic resin, a polyamide resin, a polyimide resin, a styrene maleic acid resin, or a styrene maleic anhydride resin.

Examples of the photocurable compound include bifunctional monomers, such as 1,6-hexanediol diacrylate, ethylene glycol diacrylate, neopentyl glycol diacrylate, triethylene glycol diacrylate, bis(acryloxyethoxy)bisphenol A, and 3-methylpentanediol diacrylate, polyfunctional monomers having relatively low molecular weights, such as trimethylolpropane triacrylate, pentaerythritol triacrylate, tris[2-(meth)acryloyloxyethyl]isocyanurate, dipentaerythritol hexaacrylate, and dipentaerythritol pentaacrylate, and polyfunctional monomers having relatively high molecular weights, such as polyester acrylates, polyurethane acrylates, and polyether acrylates.

Examples of the photopolymerization initiator include acetophenone, benzophenone, benzyl dimethyl ketal, benzoyl peroxide, 2-chlorothioxanthone, 1,3-bis(4'-azidobenzal)-2-propane, 1,3-bis(4'-azidobenzal)-2-propane-2'-sulfonic acid, and 4,4'-diazidostilbene-2,2'-disulfonic acid. Examples of commercially available photopolymerization initiators include "Irgacure (trademark)-184", "Irgacure (trademark)-369", and "Darocur (trademark)-1173" manufactured by BASF SE, "Lucirin-TPO" manufactured by BASF SE, "Kayacure (trademark) DETX" and "Kayacure (trademark) OA" manufactured by Nippon Kayaku Co., Ltd., "Vicure 10", "Vicure 55" manufactured by Stauffer, "Trigonal PI" manufactured by Akzo Nobel N.V., "Sandlay 1000" manufactured by Sandoz, "Dape" manufactured by Upjohn Co., and "Biimidazole" manufactured by Kurogane Kasei Co., Ltd.

The photopolymerization initiator may be used in combination with a traditional photosensitizer. Examples of the photosensitizer include amines, ureas, compounds having a sulfur atom, compounds having a phosphorus atom, compounds having a chlorine atom, and nitriles and other compounds having a nitrogen atom. These may be used alone or in combination.

The blend ratio of the photopolymerization initiator is not particularly limited and preferably ranges from 0.1% to 30% by mass of a compound having a photopolymerizable or photocurable functional group. A blend ratio of less than 0.1% tends to result in low photosensitivity in photo-curing. A blend ratio of more than 30% may result in poor physical properties of a coating film of a pigment dispersion resist due to precipitation of crystals of the photopolymerization initiator when the coating film is dried.

Using the materials as described above, a 300 to 1000 parts by mass of an organic solvent and 1 to 100 parts by mass of a dispersant per 100 parts by mass of a dye and/or pigment composition for use in a color filter of the present invention can be uniformly stirred and dispersed to produce the dye or pigment liquid. Then, 3 to 20 parts in total of a thermoplastic resin and a photocurable compound per 1 part of a pigment composition for a color filter of the present invention, 0.05 to 3 parts of a photopolymerization initiator per 1 part of the photocurable compound, and an optional organic solvent can be added to the pigment dispersion liquid and uniformly stirred and dispersed to produce a photocurable composition for forming a color filter pixel unit.

A traditional organic solvent or alkaline aqueous solution may be used as a developer. In particular, when the photocurable composition contains a thermoplastic resin or a photocurable compound, and at least one of them has an acid value and is soluble in an alkali, washing with an alkaline aqueous solution is effective for the formation of a color filter pixel unit.

Although a method for producing a color filter pixel unit by photolithography is described in detail, a color filter pixel unit produced from a pigment composition for a color filter of the present invention may be formed by an electrodeposition method, a transfer method, a micelle electrolysis method, a photovoltaic electrodeposition (PVED) method, an ink jet method, a reverse printing method, or a heat curing method, thereby producing a color filter.

(Alignment Film)

In a liquid crystal display device according to the present invention, an alignment film for aligning a liquid crystal composition can be disposed on a surface of a first substrate and a second substrate facing the liquid crystal composition. In liquid crystal display devices that require an alignment film, the alignment film is disposed between a color filter and a liquid crystal layer. However, the alignment film has a small thickness of not more than 100 nm and cannot completely block the interaction between coloring matter, such as a pigment, of the color filter and a liquid crystal compound of the liquid crystal layer.

Liquid crystal display devices without an alignment film have a stronger interaction between coloring matter, such as a pigment, of a color filter and a liquid crystal compound of a liquid crystal layer.

The material of the alignment film may be a transparent organic material, such as a polyimide, a polyamide, a benzocyclobutene polymer (BCB), or a poly(vinyl alcohol). Particularly preferred are polyimide alignment films formed by imidization of a polyamic acid synthesized from a diamine, such as an aliphatic or alicyclic diamine, for example, p-phenylenediamine or 4,4'-diaminodiphenylmethane, and an aliphatic or alicyclic tetracarboxylic anhydride, such as butanetetracarboxylic anhydride or 2,3,5-tricarboxycyclopentyl acetic acid anhydride, or an aromatic tetracarboxylic anhydride, such as pyromellitic acid dianhydride. Although the alignment method in this case is generally rubbing, no alignment may be required for use in vertical alignment films.

The alignment film material may be a compound having a chalcone, cinnamate, cinnamoyl, or azo group and may be used in combination with a material such as polyimide or polyamide. In this case, rubbing or a photo-alignment technique may be used for the alignment film.

The alignment film is generally produced by forming a resin film of the alignment film material on a substrate by a spin coating method. A uniaxial stretching method or a Langmuir-Blodgett technique may also be used.

(Transparent Electrode)

In a liquid crystal display device according to the present invention, electrically conductive metal oxides can be used as transparent electrode materials. The metal oxides may be indium oxide ($In_2O_3$), tin oxide ($SnO_2$), zinc oxide (ZnO), indium tin oxide ($In_2O_3$—$SnO_2$), indium zinc oxide ($In_2O_3$—ZnO), indium-gallium-zinc oxide (IGZO), niobium doped titanium dioxide ($Ti_{1-x}Nb_xO_2$), fluorine doped tin oxide, and graphene and metal nanowires. Zinc oxide (ZnO), indium tin oxide ($In_2O_3$—$SnO_2$), indium-gallium-zinc oxide (IGZO), or indium zinc oxide ($In_2O_3$—ZnO) are preferred. These transparent electrically conductive films may be patterned by a photo-etching method or a method using a mask.

The liquid crystal display device may be a flexible display element. In this case, a flexible substrate, such as a plastic substrate or a thin glass substrate, is preferably used as an electrode substrate. A flexible electrode material, such as graphene (a sheet formed of a carbon monoatomic layer) or an organic semiconductor, is preferably used in an electrode.

Organic TFTs preferably have a top-contact or bottom-contact structure, more preferably a bottom-gate and bottom-contact structure. An organic semiconductor as the core of organic TFTs is preferably a polycyclic aromatic compound, such as a metal (Cu, Pb, or Ni) phthalocyanine derivative, a metal porphyrin derivative, a pentacene derivative, an anthracene derivative, a tetracene derivative, an anthradithiophene derivative, a hexabenzocoronene derivative, or a rubrene derivative, a low-molecular-weight compound, such as tetracyanoquinodimethane, a polymer, such as polyacetylene, poly-3-hexylthiophene (P3HT), poly(p-phenylene vinylene) (PPV), polyfluorene, or polypyrrole, a polythiophene derivative, a perylenetetracarboxylic diimide derivative (PTCDI), a perylenetetracarboxylic acid dianhydride derivative (PTCDA), a fluorine-substituted phthalocyanine derivative, carbon nanotube, a polyaniline derivative, graphene, a naphthalenetetracarbonyl compound, a perylenetetracarbonyl compound, a quaterrylenetetracarbonyl compound, a fullerene compound, or a 5-membered heterocyclic compound (oligothiophene or TTF analog), more preferably pentacene. These organic semiconductors may be doped. For example, iodine-doped polypyrrole and iodine-doped polyacetylene are preferred. In order to improve the characteristics of an organic semiconducting compound, it is preferable to improve molecular alignment and to use an organic semiconducting compound produced by imparting liquid crystallinity to the compound. These liquid crystalline organic semiconducting compounds may be of low molecular weight, high molecular weight, or very high molecular weight and preferably have a columnar structure or a layer structure in order to transport electrons and holes.

Graphene materials may be produced by top-down or bottom-up. The top-down may be a Scotch tape method, a modified Hummers method, or a supercritical method. The bottom-up may be a thermal CVD method or a graphene growth on SiC method. The production of transistors utilizing graphene is preferably performed by a peeling-off transfer method, a CVD transfer method, or a SiC surface thermal decomposition method. In low-temperature production, graphene is preferably formed on an insulating substrate at a low temperature of 650° C. by CVD, thereby directly forming a graphene transistor over the entire substrate surface (Fujitsu Laboratories Ltd.). A large-area monolayer graphene sheet having high carrier mobility is preferably formed by forming a graphene film on a thin Cu film by CVD and transferring the graphene film to another substrate. More specifically, a Cu film is affixed to the inside of a cylindrical quartz tube having a diameter of at least 8 inches, is subjected to CVD, is removed from the cylindrical quartz tube, and is brought into close contact with a polymer film, and the graphene film is separated from the Cu film (a roll to roll method) (X. Li et al., Science, 324, 1312-1314 (2010)).

Gold is preferred in a gate electrode. Platinum/gold is preferred in a source and a drain electrode. A polymer material is preferred in a gate-insulating film and a passivation film. More preferably, a pentacene film is formed by vapor deposition after all the layers other than a passivation film are formed. It is important to control the interface between pentacene, an organic gate-insulating film, and an electrode in order to improve the performance of organic TFTs. Thus, it is preferable to add a silane coupling agent to an organic insulating film, thereby imparting water repellency and increasing mobility. A multilayer electrode is also preferred in order to decrease the contact resistance between source-drain electrodes and pentacene. Precise integration of an organic TFT and an organic EL having a top-emission structure is preferred in display elements.

Display elements including an organic semiconductor are preferably produced by a printing method (printable electronics). Graphene transistors produced by a printing method are preferably used. Metal nanoparticle materials, such as silver nanoparticles and copper nanoparticles, are also preferably used for printed wiring for use in flexible display elements. A "double-shot" printing is also preferred as a printing method for producing an organic semiconductor that is superior to amorphous silicon. In the "double-shot" printing, an ink in which an organic semiconductor is dissolved and an ink that can promote crystallization of the organic semiconductor are alternately added dropwise. In this case, dioctylbenzothienobenzothiophene (C8-BTBT) is preferably used as a semiconductor ink (Nature 475, 364-367, 21 July 2011).

Liquid crystal display devices may also be used for 3D displays by space division, such as a polarization method, a parallax barrier method, or an integral imaging method, wavelength division, such as a spectral method or anaglyph, or an FPS mode.

(Display Mode)

The display mode may be a birefringence mode in which an electric field is applied to a substrate in an approximately horizontal direction to form a refractive index ellipsoid. Such a birefringence mode is typically an in-plain switching (IPS) mode or a fringe field switching (FFS) mode. The IPS mode is preferably super IPS (S-IPS), advanced super IPS (AS-IPS), or IPS-Provectus (IPS-Pro), in which the direction of a transverse electric field applied to a substrate in an approximately horizontal direction is controlled by bending an interdigitated electrode structure, in order to decrease driving voltage, improve image quality, increase brightness, and achieve ultra-high brightness. Although interdigitated electrodes may be metal electrodes, transparent electrodes, such as ITO, indium-gallium-zinc oxide (IGZO), or graphene, are preferred in order to increase the light use efficiency of the electrodes. The FFS mode is preferably advanced fringe field switching (AFFS), which removes a black matrix in pixels and thereby increases transmittance, the viewing angle, and the contrast ratio and decreases power consumption. A vertical-field-switching (VFS) mode may also be utilized. In display in the VFS mode, a vertical electric field is applied to a substrate, and the optical path is tilted with a prism.

The electric field strength distribution in display elements is preferably narrowed to decrease driving voltage, improve response speed, increase contrast, and improve image quality. The electric field strength distribution may be narrowed by providing each of a pair of substrates with a pixel electrode and a common electrode. More specifically, the following method is available. Each of a pair of substrate is preferably provided with an IPS, S-IPS, AS-IPS, IPS-Pro, FFS, AFFS, or VFS electrode. Electrodes preferably project toward the inside of cells because such electrodes can suppress a reduction in the electric field strength distribution in the inside of the cells more effectively than flat electrodes. A display mode utilizing a protruded electrode, which is an electrode formed on a resin protrusion surface on a substrate, may also be utilized.

The protruded electrode can strengthen the transverse electric field and thereby lower the driving voltage. The protruded electrode structure may be spherical, hemispherical, cubic, rectangular, triangular, trapezoidal, cylindrical, conical, 3- to 20-gonal cylindrical, 3- to 20-gonal pyramidal, or asymmetrical. The surface of the electrode may be flat or rough. The electrode may have rounded or sharp corners. Rounded corners are preferred in order to avoid concentration of an electric field. The protrusion height is preferably $1/10000$ or more of the cell gap and, more specifically, may be $1/10000$, $1/1000$, $1/100$, $1/10$, $1/9$, $1/8$, $1/7$, $1/6$, $1/5$, $1/4$, $1/2$, or $3/4$ or more. The protrusion may be in contact with a counter substrate. The protruded electrode may be directly disposed on a substrate or may be disposed on a base made of a resin, an insulator, a dielectric material, a semiconductor, or a complex thereof. A pixel electrode may be disposed on an upper portion, a middle portion, or a lower portion.

A more specific protruded electrode structure may include a first substrate, a pair of separated electrodes protruding in the thickness direction of the first substrate and disposed on a surface of the first substrate, and a second substrate a surface of which faces a surface of the first substrate (Japanese Unexamined Patent Application Publication No. 2007-171938), a pixel electrode layer (first electrode layer) between a first substrate and a ferroelectric liquid crystal layer and a common electrode layer (second electrode layer), the pixel electrode layer not overlapping the common electrode layer, the pixel electrode layer covering an upper surface and side surfaces of a ribbed first structure projecting from a surface of the first substrate adjacent to the ferroelectric liquid crystal layer toward the liquid crystal layer, the common electrode layer covering an upper surface and side surfaces of a ribbed second structure projecting from a surface of the first substrate adjacent to the ferroelectric liquid crystal layer toward the ferroelectric liquid crystal layer (Japanese Unexamined Patent Application Publication No. 2011-133876), a ferroelectric liquid crystal layer disposed between opposing first and second common electrode layers each having an opening pattern (slit) and a pixel electrode layer having an opening pattern, the pixel electrode layer being disposed on an upper portion of a structure projecting from a surface of the first substrate adjacent to the ferroelectric liquid crystal layer toward the ferroelectric liquid crystal layer, the pixel electrode layer being disposed between the first common electrode layer and the second common electrode layer in the ferroelectric liquid crystal layer (Japanese Unexamined Patent Application Publication No. 2011-133874), at least a pair of electrodes disposed such that a maximum electric field region is formed away from the substrate interface (Japanese Unexamined Patent Application Publication No. 2005-227760), or a first structure on a first electrode layer (pixel electrode layer) and similarly a second structure on a second electrode layer (common electrode layer). The first structure and the second structure are insulating materials having a higher dielectric constant than a liquid crystal material of a liquid crystal layer and protrude toward the liquid crystal layer (Japanese Unexamined Patent Application Publication No. 2011-8241). A substrate may also have a hollow such that a pixel electrode protrudes from the substrate. For example, a double-penetrating fringe field (Journal of Display Technology, 287-289, Vol. 6, 2010) may be utilized. In addition to the method described above, another method for decreasing the driving voltage may be a method utilizing a confined geometry in which liquid crystals between electrodes are confined in a narrow resin space (Lee, S.-D., 2009, IDW '09-Proceeding of the 16th International Display Workshots 1, pp. 111-112) or may utilize periodic corrugated electrodes (Appl. Phys. Lett. 96, 011102 (2010)).

System on glass (SOG) is preferred in order to decrease the number of components of liquid crystal display devices (cost reduction) or decrease the number of connections with an external circuit and thereby improve vibration resistance and impact resistance. A circuit on a glass substrate is preferably a circuit that includes DAC, a power amplifier, a logic circuit, a microprocessor, and/or a memory, which are supplied as an IC or LSI, on a glass substrate, or a peripheral circuit system that includes a liquid crystal control circuit, a power supply circuit, an input/output interface circuit, a signal-processing circuit, and/or a power amplifier on a glass substrate.

Although light sources for liquid crystal display devices are not particularly limited, LEDs are preferred because of their low power consumption. LEDs are preferably disposed on a short side rather than a long side of liquid crystal display devices. LEDs are preferably disposed on one side rather than two sides. More preferably, LEDs are disposed on only corners of liquid crystal display devices. In order to further reduce power consumption, blinking control (a technique of decreasing light quantity in a dark region or turning off a light in a dark region), a multi-field drive technique (a technique of using different driving frequencies for motion pictures and still pictures), a technique of changing the light quantity mode between indoors and outdoors or between nighttime and daytime, or a technique of temporarily stopping driving by utilizing the memory of a liquid crystal display device is preferably used. Reflective display elements are also preferred because external illumination (such as sunlight or room light) can be utilized without a light source. The use of light guide plates and prism sheets are preferred in order to reduce the loss of light from light sources. Light guide plates and prism sheets are preferably made of transparent resins.

Examples of the transparent resins include methacrylate resins (such as PMMA), polycarbonate resins, acrylonitrile-styrene-butadiene copolymer resins (ABS resins), methyl methacrylate-styrene copolymer resins (MS resins), polystyrene resins, acrylonitrile-styrene copolymer resins (AS resins), polyolefin resins (such as polyethylene and polypropylene), and cyclic polyolefins.

In order to improve contrast, it is preferable to use blinking control (a technique of decreasing light quantity in a dark region or turning off a light in a dark region), an element having an opening ratio of 50% or more, an alignment film having high alignment ability, an anti-glare film, or a field sequential method (a colorization method for successively lighting RGB-color LEDs in a shorter time than the temporal resolution of the human eye and thereby allowing colors to be perceived without using a color filter). The size of an active element is preferably decreased to increase the opening ratio. A semiconductor having a high mobility of 600 $cm^2/Vs$ or more is preferably used to decrease the size of an active element.

For high-speed responsivity, an overdrive function (the voltage for gray-scale display is increased at start-up and is decreased at the falling edge) is preferably used.

A liquid crystal display device according to the present invention can be used in touch panel display elements for use in tablet PCs. In this case, a liquid crystal display device according to the present invention preferably has impact resistance, vibration resistance, water repellency and oil repellency, antifouling properties, and fingerprint resistance. A liquid crystal display device according to the present invention preferably has resistance to viruses, such as influenza virus, norovirus, and RS virus, and resistance to bacteria, such as *Salmonella, Escherichia coli*, and *Staphylococcus aureus*, when used in the applications for general public people, such as automated teller machines (ATMs), vending machines, ticket vending machines, toilet monitors, copying machines, and public telephones, and medical, care, and infant applications. More preferably, a liquid crystal display device according to the present invention has solvent resistance, acid resistance, alkali resistance, and heat resistance for washing for sterilization of display elements. A liquid crystal display device according to the present invention preferably has dustproof properties, waterproofness, salt resistance, explosion protection, and radiation resistance for the applications of warehouses, transportation and distribution, manufacture, maintenance shops, construction sites, marine researches, fire-fighting and the police, life-saving (rescue), and disaster prevention. More preferably, a liquid crystal display device according to the present invention meets European explosion-proof standards (ATEX Zone 2 Category 3), waterproof dustproof standards (IP65), or Military Specifications and Standards (MIL-STD-810F).

With respect to impact resistance, a liquid crystal display device according to the present invention is preferably used in display elements that are resistant to 3-foot drop on concrete. Cases for display elements are preferably made of an impact-resistant magnesium alloy or a multilayer magnesium alloy. SSDs are preferably used as storages in order to ensure impact resistance and vibration resistance. A dual-Mode AllVue™ Xtreme technology is preferably used to improve visibility even for outdoor use in direct sunlight.

In order to suppress deterioration in display quality due to soiling, films having water repellency and oil repellency, antifouling properties, fingerprint resistance, and fingerprint erasing ability are preferably used. The base materials of films are preferably transparent base films. The resin materials of transparent base films specifically include acrylic resins, such as poly(meth)acrylate, cellulose resins, such as cellulose triacetate (TAC), cellulose diacetate, and cellophane, polyester resins, such as poly(ethylene terephthalate) (PET) and poly(ethylene naphthalate), polyamide resins, such as 6-nylon, polyolefin resins, such as polyethylene and polypropylene, organic polymers, such as polystyrene, poly(vinyl chloride), polyimide, poly(vinyl alcohol), polycarbonate, and ethylene vinyl alcohol, epoxy resins, urethane resins, and copolymerization resins, such as acrylonitrile-styrene-butadiene copolymer resins (ABS resins), methyl methacrylate-styrene copolymer resins (MS resins, and acrylonitrile-styrene. Among these, cellulose triacetate (TAC) resin and poly(ethylene terephthalate) (PET) resin are preferred in terms of versatility.

A hard coating or self-healing coating film is preferably applied to films in order to improve scratch resistance. Although resins in hard-coat layer forming compositions may be known resins, ionizing-radiation-curable resins are preferred in order to improve surface hardness.

Examples of the ionizing-radiation-curable resins include polyfunctional acrylates, such as acrylates and methacrylates of polyhydric alcohols, and polyfunctional urethane acrylates, such as those synthesized from diisocyanates and polyhydric alcohols and hydroxy esters of acrylic acid and methacrylic acid. In addition, polyether resins, polyester resins, epoxy resins, alkyd resins, spiroacetal resins, polybutadiene resins, and polythiol-polyene resins each having an acrylate functional group may also be used. Among these, polyfunctional (meth)acrylic monomers are preferably used in order to improve surface hardness. In preferred polyfunctional (meth)acrylic monomers, hydroxy groups of polyhydric alcohols having two or more alcoholic hydroxy groups per molecule are esterified with two or more (meth)acrylic acids. Acrylic resin skeletons to which a reactive acrylic group is bonded, polyester acrylates, urethane acrylates, epoxy acrylates, and polyether acrylates may also be used. Rigid skeletons, such as melamine and isocyanuric acid, to which an acrylic group is bonded may also be used. Polyfunctional (meth)acrylic monomers in the present invention may be oligomers. Commercially available polyfunctional acrylic monomers that can be used include Mitsubishi Rayon Co., Ltd.; (for example, trade name "Diabeam" series), Nagase ChemteX Corporation; (for example, trade name "Denacol" series), Shin Nakamura Chemical Co., Ltd.; (for example, trade name "NK ester" series), DIC Corporation; (for example, trade name "UNIDIC" series), Toagosei Co., Ltd.; (for example, trade name "Aronix" series), NOF Corporation; (for example, trade name "Blemmer" series), Nippon Kayaku Co., Ltd.; (for example, trade name "KAYARAD" series), and Kyoeisha Chemical Co., Ltd.; (for example, trade name "Light Ester" series, "Light Acrylate" series).

Other ionizing-radiation-curable resins may be fluorine-containing compounds having a polymerizable group. When a hard-coat layer forming composition contains a fluorine-containing compound having a polymerizable group, a hard-coat layer surface formed of the hard-coat layer forming composition can have antifouling characteristics. When a fluorinated additive agent having no polymerizable group is used, the additive agent comes to the hard-coat layer surface and will be removed from the hard coat surface when wiped with a cloth. Thus, once the surface is wiped with a cloth, the antifouling properties are lost. When a fluorine compound having antifouling characteristics has a polymerizable group, the fluorinated additive agent is also polymerized while a hard-coat layer is formed. More preferably, a fluorine-containing compound having a polymerizable group that has an advantage that the antifouling characteristics are maintained even after the surface is wiped with a cloth is a compound in which the polymerizable group has a (meth) acrylate group. This is because such a compound can be copolymerized with a polyfunctional (meth)acrylate monomer and achieve high hardness through radical polymerization using ionizing radiation. More preferably, fluorine-containing compounds having a polymerizable group are preferably compounds in which the polymerizable group has a (meth)acrylate group. This is because such a compound can be copolymerized with a polyfunctional (meth)acrylate monomer and achieve high hardness through radical polymerization using ionizing radiation. Examples of the fluorine-containing compounds having a polymerizable group include Optool DAC (manufactured by Daikin Industries, Ltd.), SUA1900L10 and SUA1900L6 (manufactured by Shin Nakamura Chemical Co., Ltd.), UT3971 (Japan synthesis), Defensa TF3001, Defensa TF3000, and Defensa TF3028 (manufactured by DIC Corporation), Light Procoat AFC3000 (manufactured by Kyoeisha Chemical Co., Ltd.), KNS5300 (manufactured by Shin-Etsu silicone), and UVHC1105 and UVHC8550 (manufactured by GE Toshiba Silicones Co., Ltd.). The amount of fluorine-containing compound having a polymerizable group to be used ranges from 0.01% to 10% by weight of a polyfunctional (meth) acrylic monomer in a hard-coat layer forming composition. An amount of less than 0.01% by weight results in insufficient antifouling characteristics and surface energy of more than 20 mN/m. An amount of more than 10% by weight results in poor compatibility with polymerizable monomers and solvents, the formation of a cloudy coating liquid, and precipitation, thus possibly causing troubles, such as defects in the coating liquid and the hard-coat layer.

A hard-coat layer forming composition preferably contains a photo radical polymerization initiator for initiating a polymerization reaction of the ionizing-radiation-curable resin. Upon irradiation with ionizing radiation, a photo radical polymerization initiator generates radicals and initiates a polymerization reaction of the ionizing-radiation-curable resin. Specific examples of the photo radical polymerization initiator include carbonyl compounds, such as acetophenone, 2,2-diethoxyacetophenone, p-dimethylacetophenone, p-dimethylaminopropiophenone, benzophenone, 2-chlorobenzophenone, 4,4'-dichlorobenzophenone, 4,4'-bisdiethylaminobenzophenone, Michler's ketone, benzyl, benzoin, benzoin methyl ether, benzoin ethyl ether, benzoin isopropyl ether, p-isopropyl-α-hydroxyisobutylphenone, α-hydroxyisobutylphenone, 2,2-dimethoxy-2-phenylacetophenone, and 1-hydroxycyclohexyl phenyl ketone, and sulfur compounds, such as tetramethylthiuram monosulfide, tetramethylthiuram disulfide, thioxanthone, 2-chlorothioxanthone, and 2-methylthioxanthone. These photopolymerization initiators may be used alone or in combination. The amount of photo radical polymerization initiator to be used ranges from 0.01% to 10% by weight of the ionizing-radiation-curable resin in a hard-coat layer forming composition. An amount of less than 0.01% by weight results in an insufficient curing reaction upon irradiation with ionizing radiation. An amount of more than 10% by weight results in insufficient ionizing radiation reaching a lower portion of the hard-coat layer.

In addition to the components described above, if necessary, a hard-coat layer forming composition may contain a modifier for modifying the characteristics of a hard-coat layer and/or a thermal polymerization inhibitor for preventing thermal polymerization during the production of a hard coat film or dark reactions during storage of the hard-coat layer forming composition, without affecting reactions caused by ionizing radiation. Examples of the modifier include coating improvers, antifoaming agents, thickeners, antistatic agents, inorganic particles, organic particles, organic lubricants, high-molecular organic compounds, ultraviolet absorbers, light stabilizers, dyes, pigments, and stabilizers. The modifier content preferably ranges from 0.01% to 5% by weight per 100% by weight of the solid components of the hard-coat layer forming composition. Examples of the thermal polymerization inhibitor include hydroquinone, hydroquinone monomethyl ether, and 2,5-t-butylhydroquinone. The thermal polymerization inhibitor content preferably ranges from 0.005% to 0.05% by weight per 100% by weight of the solid components of the hard-coat layer forming composition.

A hard-coat layer forming composition may contain particles in order to impart an antiglare function to a hard-coat layer. The particles may be selected from organic particles, such as acrylic particles, acrylic styrene particles, polystyrene particles, polycarbonate particles, and melamine particles, and inorganic particles, such as silica particles talc, various aluminosilicates, kaolin clay, and MgAl hydrotalcite. The particles preferably have an average particle size in the range of 0.5 to 10 µm. The hard-coat layer preferably has an average thickness in the range of 2 to 20 µm. An average particle size of less than 0.5 µm makes it difficult to form asperities on a surface of a hard-coat layer. An average particle size of more than 10 µm may result in rough texture of a hard coat film and a hard coat film unsuitable for a fine display surface. When a hard-coat layer has an average thickness of less than 2 µm, this may result in insufficient scratch resistance for the display surface. When a hard-coat layer has an average thickness of more than 20 µm, the resulting hard coat film may have curling and may be difficult to handle.

A film having a self-healing function is also preferred in terms of scratch resistance. A scratch is preferably self-healed due to the elasticity of the film. For example, "Magic Film" (Suncrest Co., Ltd.) may be used.

Use of photocatalysts and Ag particles is preferred with respect to antiviral and antimicrobial properties. Photocatalysts are preferably inorganic particles, such as titanium oxide. Ag particles are more preferably nanoparticles. Ceramics composite materials having photolysis ability, such as $e^+$ (Earthplus), are preferred with respect to antiviral properties. When these antiviral and antimicrobial coatings and films are not transparent, these are preferably used in components other than display screens. When these antiviral and antimicrobial coatings and films are transparent, these are preferably used in each entire display element.

For fingerprint resistance, lipid repellant compounds are preferably added to films. Fluorine substituted compounds or compounds having a perfluoro group, such as perfluoropolyether acrylate compounds, are preferably added to films. Functional films, such as "ClearTouch" (NOF Corporation) and Shoshimon (registered trademark) films (Tsujiden Co., Ltd.), may be attached to display elements.

A display element of the present invention preferably has a three-axis gyro, acceleration sensor, ambient light sensor, Wi-Fi, mobile telephony, such as 3G, digital compass, and/or GPS function.

UPUs for use in tablet PCs that include a display element of the present invention are preferably of low power consumption, less heat generation, and an increased number of operations and preferably have a single core, a dual core, more preferably, a quad core, an 8-core, a 16-core, a 32-core, a 64-core, a 128-core, and a 256-core.

A display element of the present invention is preferably used for display in air conditioners, television sets, panels and measuring instruments for household electrical appliances, such as panels and measuring instruments for washing machines, panels and measuring instruments for rice cookers, panels and measuring instruments for component stereo systems, and panels and measuring instruments for portable music players, panels and measuring instruments for solar cells, panels and measuring instruments for fuel cells, panels and measuring instruments for hydroelectric power generation and wind power generation, panels and measuring instruments for reaction apparatuses, agitators, dispersing apparatuses, dryers, heaters, pressure apparatuses, compressors, crushers, centrifugal apparatuses, drawing/stretching machines, film forming apparatuses, display manufacturing apparatuses, vacuum apparatuses, rockets, ships, aircrafts, lathes, UV irradiation apparatuses, laminators, aspirators, injectors, and vibratory apparatuses, panels and measuring instruments for motorcycles, motorized bicycles, automobiles, hybrid vehicles, and electric vehicles, panels and measuring instruments for care robots, panels and measuring instruments for care bodysuits, panels and measuring instruments for robots or machines used in disasters, such as earthquakes, fires, flood damages, landslides, volcanic eruptions, pyroclastic flows, mudflows, torrential rains, nuclear reactor accidents, and nuclear reactor events, and panels and measuring instruments for various analyzers, observational instruments, and measuring instruments in physics, chemistry, astronomy, medicine, pathology, biology, biological chemistry, immunology, and meteorology. These display elements preferably have communication capabilities. The communication is preferably performed by wireless LAN, such as Wi-Fi, 3G, fourth-generation communication, fifth-generation communication, or sixth-generation communication, a high-speed communication network, telephone lines, the Internet, Bluetooth, or infrared light. A display element of the present invention preferably has a function of controlling a next-generation electric power transmission system that efficiently controls "centralized power generation", such as thermal power generation or nuclear power generation, and "distributed power generation", which refers to the generation of electricity distributed around demand areas, using the newest IT technology, as in smart grid, smart city, or smart town. A display element of the present invention is preferably utilized as an information terminal for controlling, anywhere at any time, electricity generated by thermal power generation, hydroelectric power generation, nuclear power generation, wind power generation, geothermal power generation, solar cell the generation of electricity, geothermal power generation, fuel cell power generation, ocean current power generation, wave power generation, piezoelectric power generation, or renewable energy, and automobiles, trains, factories, houses, hospitals, schools, public offices, illumination, air conditioning, machines, apparatuses, and household electrical appliances, which operate using the electricity. A display element of the present invention is also preferably utilized in tablet PCs, electronic books, electron textbooks, electronic medical records, and electronic notes. In these applications, touch panel systems, which utilize pressing force, such as finger or pen input, are most preferred. A display element of the present invention is preferably used in 3D displays.

A display element of the present invention can be used in stationary display elements, such as desktop computers, large, medium, and small controllers, and vending machines, as well as digital signage (electronic signs), point of purchase advertising (POP), electronic timetables, electronic bulletin boards, electronic price tags, electronic blackboards, and measuring instrument displays.

The display surfaces may be on one side or both sides or may be sea-through displays. Touch panel systems, which utilize pressing force, such as finger or pen input, are most preferred. Notebook computers, tablet PCs, and mobile phones are preferred because they can be easily used anywhere at any time. Display elements having a touch panel system, which utilizes pressing force, such as finger or pen input, are most preferred.

EXAMPLES

Although the best mode of the present invention will be partly described in detail in the following examples, the present invention is not limited to these examples. The term "%" with respect to compositions in the following examples and comparative examples refers to "% by mass".

The physical properties of liquid crystal compositions are described as follows:

$d_{gap}$: A gap between a first substrate and a second substrate in a cell (µm)

VHR: Voltage holding ratio (%)

(the ratio (%) of the measured voltage to the initial applied voltage in a liquid crystal composition injected into a cell having a thickness of 5 μm, measured under the conditions of 5 V, a frame time of 200 ms, and a pulse width of 1 ms)

Burn-in in a liquid crystal display device was rated on the following four grades by visually examining an after-image of a predetermined fixed pattern on full-screen uniform display after the fixed pattern was displayed in a display area for 1000 hours.

Double circle: No after-image
Single circle: A slight acceptable after-image
Triangle: An unacceptable after-image
Cross: A very bad after-image

[Preparation of Color Filter]
[Preparation of Color Composition]
[Red Dye Color Composition 1]

A plastic bottle was charged with 10 parts of a red dye 1 (C.I. Solvent Red 124) and then with 55 parts of propylene glycol monomethyl ether acetate and 0.3-0.4 mmϕ Sepr beads. The mixture was dispersed using a paint conditioner (manufactured by Toyo Seiki Seisaku-Sho, Ltd.) for 4 hours and was filtered through a 5-μm filter to produce a dye-colored liquid. Then, 75.00 parts of the dye-colored liquid, 5.50 parts of a polyester acrylate resin (Aronix (trademark) M7100, manufactured by Toagosei Co., Ltd.), 5.00 parts of dipentaerythritol hexaacrylate (Kayarad (trademark) DPHA, manufactured by Nippon Kayaku Co., Ltd.), 1.00 part of benzophenone (Kayacure (trademark) BP-100, manufactured by Nippon Kayaku Co., Ltd.), and 13.5 parts of Ucar ester EEP were stirred using a dispersion agitator and were filtered through a filter having a pore size of 1.0 μm to produce a red dye color composition 1.

[Red Dye Color Composition 2]

A red dye color composition 2 was produced in the same manner from 8 parts of the red dye 1 (C.I. Solvent Red 124) and 2 parts of a yellow dye 2 (C.I. Solvent Yellow 21) instead of 10 parts of the red dye 1 used in the red dye color composition 1.

[Red Dye Color Composition 3]

A red dye color composition 3 was produced in the same manner from 10 parts of a red dye 2 (C.I. Solvent Red 1) instead of 10 parts of the red dye 1 used in the red dye color composition 1.

[Green Dye Color Composition 1]

A green dye color composition 1 was produced in the same manner from 3 parts of a blue dye 1 (C.I. Solvent Blue 67) and 7 parts of a yellow dye 1 (C.I. Solvent Yellow 162) instead of 10 parts of the red dye 1 used in the red dye color composition 1.

[Green Dye Color Composition 2]

A green dye color composition 2 was produced in the same manner from 4 parts of the yellow dye 1 (C.I. Solvent Yellow 162) and 3 parts of a yellow dye 3 (C.I. Solvent Yellow 82) instead of 7 parts of the yellow dye 1 used in the green dye color composition 1.

[Green Dye Color Composition 3]

A green dye color composition 3 was produced in the same manner from 10 parts of a green dye 1 (C.I. Solvent Green 7) instead of 3 parts of the blue dye 1 and 7 parts of the yellow dye 1 used in the green dye color composition 1.

[Blue Dye Color Composition 1]

A blue dye color composition 1 was produced in the same manner from 10 parts of a blue dye 1 (C.I. Solvent Blue 7) instead of 10 parts of the red dye 1 used in the red dye color composition 1.

[Blue Dye Color Composition 2]

A blue dye color composition 2 was produced in the same manner from 7 parts of the blue dye 1 (C.I. Solvent Blue 7) and 3 parts of a violet dye 1 (C.I. Basic Violet 10) instead of 10 parts of the blue dye 1 used in the blue dye color composition 1.

[Blue Dye Color Composition 3]

A blue dye color composition 3 was produced in the same manner from 10 parts of a blue dye 2 (C.I. Solvent Blue 12) instead of 7 parts of the blue dye 1 and 3 parts of the violet dye 1 used in the blue dye color composition 2.

[Yellow Dye Color Composition 1]

A yellow dye color composition 1 was produced in the same manner from 10 parts of the yellow dye 2 (C.I. Solvent Yellow 21) instead of 10 parts of the red dye 1 used in the red dye color composition 1.

[Yellow Dye Color Composition 2]

A yellow dye color composition 2 was produced in the same manner from 10 parts of a yellow dye 4 (C.I. Solvent Yellow 2) instead of 10 parts of the yellow dye 2 used in the yellow dye color composition 1.

[Red Pigment Color Composition 1]

A plastic bottle was charged with 10 parts of a red pigment 1 (C.I. Pigment Red 254, "Irgaphor Red BT-CF" manufactured by BASF SE) and then with 55 parts of propylene glycol monomethyl ether acetate, 7.0 parts of Disperbyk LPN21116 (manufactured by BYK-Chemie), and 0.3-0.4 mmϕ Sepr beads. The mixture was dispersed using a paint conditioner (manufactured by Toyo Seiki Seisaku-Sho, Ltd.) for 4 hours and was filtered through a 5-μm filter to produce a pigment dispersion liquid. Then, 75.00 parts of the pigment dispersion liquid, 5.50 parts of a polyester acrylate resin (Aronix (trademark) M7100, manufactured by Toagosei Co., Ltd.), 5.00 parts of dipentaerythritol hexaacrylate (Kayarad (trademark) DPHA, manufactured by Nippon Kayaku Co., Ltd.), 1.00 part of benzophenone (Kayacure (trademark) BP-100, manufactured by Nippon Kayaku Co., Ltd.), and 13.5 parts of Ucar ester EEP were stirred using a dispersion agitator and were filtered through a filter having a pore size of 1.0 μm to produce a red pigment color composition 1.

[Red Pigment Color Composition 2]

A red pigment color composition 2 was produced in the same manner from 6 parts of the red pigment 1, 2 parts of a red pigment 2 (C.I. Pigment Red 177 Fastogen Super Red ATY-TR manufactured by DIC Corporation), and 2 parts of a yellow pigment 2 (C.I. Pigment Yellow 139) instead of 10 parts of the red pigment 1 used in the red pigment color composition 1.

[Green Pigment Color Composition 1]

A green pigment color composition 1 was produced in the same manner from 6 parts of a green pigment 1 (C.I. Pigment Green 36, "Fastogen Green 2YK-CF" manufactured by DIC Corporation) and 4 parts of a yellow pigment 1 (C.I. Pigment Yellow 150, Fanchon Fast Yellow E4GN manufactured by BAYER AG) instead of 10 parts of the red pigment 1 used in the red pigment color composition 1.

[Green Pigment Color Composition 2]

A green pigment color composition 2 was produced in the same manner from 4 parts of a green pigment 2 (C.I. Pigment Green 7, Fastogen Green S manufactured by DIC Corporation) and 6 parts of a yellow pigment 3 (C.I. Pigment Yellow 138) instead of 6 parts of the green pigment 1 and 4 parts of the yellow pigment 1 used in the green pigment color composition 1.

[Blue Pigment Color Composition 1]

A blue pigment color composition 1 was produced in the same manner from 9 parts of a blue pigment 1 (C.I. Pigment Blue 15:6, "Fastogen Blue EP-210" manufactured by DIC Corporation) and 1 part of a violet pigment 1 (C.I. Pigment Violet 23) instead of 10 parts of the red pigment 1 used in the red pigment color composition 1.

[Blue Pigment Dye Color Composition 2]

A blue pigment dye color composition 2 was produced in the same manner from 1 part of a violet dye 1 (C.I. Basic Violet 10) instead of 1 part of the violet pigment 1 used in the blue pigment color composition 1.

[Yellow Pigment Color Composition 1]

A yellow pigment color composition 1 was produced in the same manner from 10 parts of a yellow pigment 1 (C.I. Pigment Yellow 150, Fanchon Fast Yellow E4GN manufactured by BAYER AG) instead of 10 parts of the red pigment 1 used in the red pigment color composition 1.

[Production of Color Filter]

A red color composition was applied by spin coating to a glass substrate on which a black matrix had been formed. The red color composition layer had a thickness of 2 pun. The red color composition layer was dried at 70° C. for 20 minutes and was exposed in a striped pattern to ultraviolet light through a photomask using an exposure apparatus equipped with an ultra-high-pressure mercury lamp. The red color composition layer was sprayed and developed with an alkaline developer for 90 seconds, was washed with ion-exchanged water, and was air-dried. The red color composition layer was post-baked in a clean oven at 230° C. for 30 minutes to form a red color pixel formed of a striped color layer on the transparent substrate.

In the same manner, a green color composition layer having a thickness of 2 μm was formed by spin coating. The green color composition layer was dried, was then exposed to light in a striped pattern in a different position from the red color pixel using an exposure apparatus, and was developed to form a green color pixel adjacent to the red color pixel.

In the same manner, a blue color composition layer having a thickness of 2 μm was formed by spin coating, and a blue color pixel was formed adjacent to the red color pixel and the green color pixel. A color filter thus produced included the three color striped pixels of red, green, and blue on the transparent substrate.

If necessary, a yellow color composition layer having a thickness of 2 μm was formed by spin coating in the same manner, and a blue color pixel was formed adjacent to the red color pixel and the green color pixel. A color filter thus produced included the four color striped pixels of red, green, blue, and yellow on the transparent substrate.

Dye color compositions and pigment color compositions listed in Table 1 were used to produce color filters 1 to 4 and a comparative color filter 1.

TABLE 1

|  | Color filter 1 | Color filter 2 | Color filter 3 | Color filter 4 | Comparative color filter 1 |
|---|---|---|---|---|---|
| R pixel unit | Red dye color composition 1 | Red dye color composition 2 | Red pigment color composition 1 | Red pigment color composition 2 | Red dye color composition 3 |
| G pixel unit | Green dye color composition 1 | Green dye color composition 2 | Green pigment color composition 1 | Green pigment color composition 2 | Green dye color composition 3 |
| B pixel unit | Blue dye color composition 1 | Blue dye color composition 2 | Blue pigment color composition 1 | Blue pigment dye color composition 2 | Blue dye color composition 3 |
| Y pixel unit | None | Yellow dye color composition 1 | None | Yellow pigment color composition 1 | Yellow dye color composition 2 |

Examples 1 to 4

The color filters 1 to 4 listed in Table 1 were used to produce color filters having striped pixels on a first substrate (without an electrode). An interdigitated electrode structure (interelectrode distance=5 μm) including two alternately arranged electrodes was formed on a second substrate. The first and second substrates not subjected to alignment treatment were used to produce a cell having a $d_{gap}$ of 5 μm. A material 1 containing chiral liquid crystals was injected between the substrates by a vacuum injection method to produce liquid crystal display devices according to Examples 1 to 4.

The material 1 containing chiral liquid crystals was prepared by mixing a nematic liquid crystal composition LC-1 (95.0%) and a chiral compound CH-1 (5.0%). The nematic liquid crystal composition LC-1 underwent a transition from a nematic phase to an isotropic phase at 56.5° C. The birefringence (Δn) was 0.164 (measured at 20° C., 589 nm).

The material 1 containing chiral liquid crystals underwent a transition from a cholesteric phase to a blue phase (cubic) at 36° C. and from the blue phase (cubic) to an isotropic phase at 43° C. during heating.

Observation with a polarizing microscope showed that, even when the cell was rotated at a blue phase (cubic) temperature, the complete dark field was maintained and remained unchanged, thus resulting in the same darkness as the isotropic phase, and light leakage due to alignment defects was not observed.

The VHRs of the liquid crystal display devices were determined at a blue phase (cubic) temperature. The liquid crystal display devices were rated with respect to burn-in. Table 2 shows the results.

[Chem. 57]

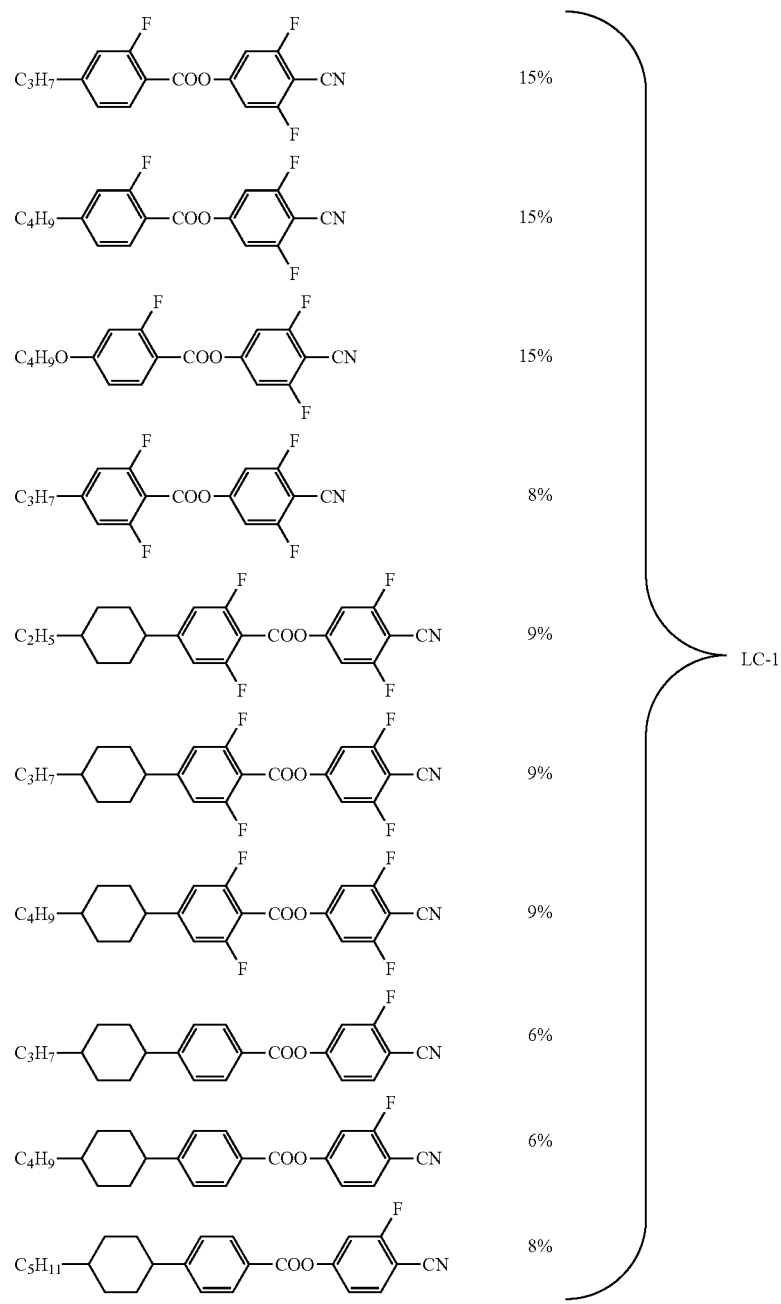

[Chem. 58]

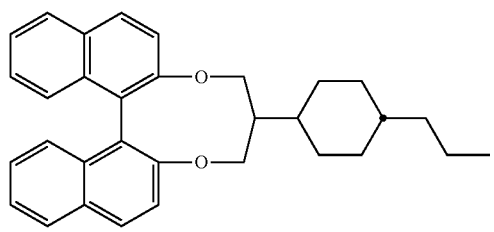

CH-1

TABLE 2

|  | Example 1 | Example 2 | Example 3 | Example 4 |
|---|---|---|---|---|
| Liquid crystal material | Material 1 containing chiral liquid crystals | Material 1 containing chiral liquid crystals | Material 1 containing chiral liquid crystals | Material 1 containing chiral liquid crystals |
| Color filter | Color filter 1 | Color filter 2 | Color filter 3 | Color filter 4 |
| VHR | 98.1% | 98.0% | 98.5% | 98.4% |
| Burn-in | ⊙ | ⊙ | ⊙ | ⊙ |

The liquid crystal display devices according to Examples 1 to 4 had high VHRs. In the evaluation of burn-in, no after-image was observed, and the ratings were excellent.

Examples 5 to 8

The color filters 1 to 4 listed in Table 1 were used to produce color filters having striped pixels on a first substrate (without an electrode). An interdigitated electrode structure (interelectrode distance=5 µm) including two alternately arranged electrodes was formed on a second substrate. The first and second substrates not subjected to alignment treatment were used to produce a cell having a $d_{gap}$ of 5 µm. A material 2 containing chiral liquid crystals was injected between the substrates by a vacuum injection method to produce liquid crystal display devices according to Examples 5 to 8.

The material 2 containing chiral liquid crystals was prepared by mixing a nematic liquid crystal composition LC-2 (95.7%) and the chiral compound CH-1 (4.3%). The nematic liquid crystal composition LC-2 underwent a transition from a nematic phase to an isotropic phase at 66.6° C. The birefringence (Δn) was 0.148 (measured at 20° C., 589 nm). The material 2 containing chiral liquid crystals underwent a transition from a cholesteric phase to a blue phase (cubic) at 50° C. and from the blue phase (cubic) to an isotropic phase at 55° C. during heating.

Observation with a polarizing microscope showed that, even when the cell was rotated at a blue phase (cubic) temperature, the complete dark field was maintained and remained unchanged, thus resulting in the same darkness as the isotropic phase, and light leakage due to alignment defects was not observed.

The VHRs of the liquid crystal display devices were determined at a blue phase (cubic) temperature. The liquid crystal display devices were rated with respect to burn-in.

[Chem. 59]

| Structure | % | |
|---|---|---|
| C₃H₇–⟨phenyl⟩–⟨2,6-F₂-phenyl⟩–CF₂O–⟨3,4,5-F₃-phenyl⟩ | 5% | |
| C₃H₇–⟨tetrahydropyran⟩–⟨2-F-phenyl⟩–⟨3,5-F₂-phenyl⟩–CF₂O–⟨3,5-F₂-phenyl⟩–F | 13% | |
| C₂H₅–⟨tetrahydropyran⟩–⟨2,3-F₂-phenyl⟩–⟨3,5-F₂-phenyl⟩–CF₂O–⟨3,5-F₂-phenyl⟩–F | 6% | |
| C₃H₇–⟨tetrahydropyran⟩–⟨2,3-F₂-phenyl⟩–⟨3,5-F₂-phenyl⟩–CF₂O–⟨3,5-F₂-phenyl⟩–F | 10% | |
| C₄H₉–⟨tetrahydropyran⟩–⟨2,3-F₂-phenyl⟩–⟨3,5-F₂-phenyl⟩–CF₂O–⟨3,5-F₂-phenyl⟩–F | 6% | LC-2 |
| C₅H₁₁–⟨tetrahydropyran⟩–⟨2,3-F₂-phenyl⟩–⟨3,5-F₂-phenyl⟩–CF₂O–⟨3,5-F₂-phenyl⟩–F | 9% | |
| C₇H₁₅–⟨tetrahydropyran⟩–⟨2,3-F₂-phenyl⟩–⟨3,5-F₂-phenyl⟩–CF₂O–⟨3,5-F₂-phenyl⟩–F | 6% | |
| C₃H₇–⟨tetrahydropyran⟩–⟨2,3-F₂-phenyl⟩–⟨3,5-F₂-phenyl⟩–CF₂O–⟨3,5-F₂-phenyl⟩–CF₃ | 8% | |
| C₃H₇–⟨tetrahydropyran⟩–⟨2,3-F₂-phenyl⟩–⟨3,5-F₂-phenyl⟩–CF₂O–⟨3,5-F₂-phenyl⟩–OCF₃ | 12% | |
| C₂H₅–⟨phenyl⟩–⟨2,6-F₂-phenyl⟩–COO–⟨3,5-F₂-phenyl⟩–F | 6% | |
| C₃H₇–⟨cyclohexyl⟩–⟨2,6-F₂-phenyl⟩–COO–⟨3,5-F₂-phenyl⟩–F | 10% | |
| C₅H₁₁–⟨cyclohexyl⟩–⟨2,6-F₂-phenyl⟩–COO–⟨3,5-F₂-phenyl⟩–F | 9% | |

TABLE 3

|  | Example 5 | Example 6 | Example 7 | Example 8 |
|---|---|---|---|---|
| Liquid crystal material | Material 2 containing chiral liquid crystals | Material 2 containing chiral liquid crystals | Material 2 containing chiral liquid crystals | Material 2 containing chiral liquid crystals |

TABLE 3-continued

|  | Example 5 | Example 6 | Example 7 | Example 8 |
|---|---|---|---|---|
| Color filter | Color filter 1 | Color filter 2 | Color filter 3 | Color filter 4 |
| VHR | 99.1% | 99.0% | 99.6% | 99.5% |
| Burn-in | ○ | ○ | ⊙ | ⊙ |

The liquid crystal display devices according to Examples 5 to 8 had high VHRs. In the evaluation of burn-in, no or very slight after-image was observed. Thus, burn-in was on an acceptable level.

Examples 9 to 12

The color filters 1 to 4 listed in Table 1 were used to produce color filters having striped pixels on a first substrate (without an electrode). An interdigitated electrode structure (interelectrode distance=5 μm) including two alternately arranged electrodes was formed on a second substrate. The first and second substrates not subjected to alignment treatment were used to produce a cell having a $d_{gap}$ of 5 μm. A material 3 containing chiral liquid crystals was injected between the substrates by a vacuum injection method to produce liquid crystal display devices according to Examples 9 to 12.

The material 3 containing chiral liquid crystals was prepared by mixing a nematic liquid crystal composition LC-3 (88.0%) and a chiral compound CH-2 (12.0%). The nematic liquid crystal composition LC-3 underwent a transition from a nematic phase to an isotropic phase at 78.7° C. The birefringence (Δn) was 0.139 (measured at 25° C., 589 nm), and the dielectric constant anisotropy (Δε) was 16.4 (measured at 25° C.). The liquid crystal composition 3 underwent a transition from a cholesteric phase to a blue phase (cubic) at 59° C. and from the blue phase (cubic) to an isotropic phase at 64.3° C. during heating.

Observation with a polarizing microscope showed that, even when the cell was rotated at a blue phase (cubic) temperature, the complete dark field was maintained and remained unchanged, thus resulting in the same darkness as the isotropic phase, and light leakage due to alignment defects was not observed.

The VHRs of the liquid crystal display devices were determined at a blue phase (cubic) temperature. The liquid crystal display devices were rated with respect to burn-in.

[Chem. 60]

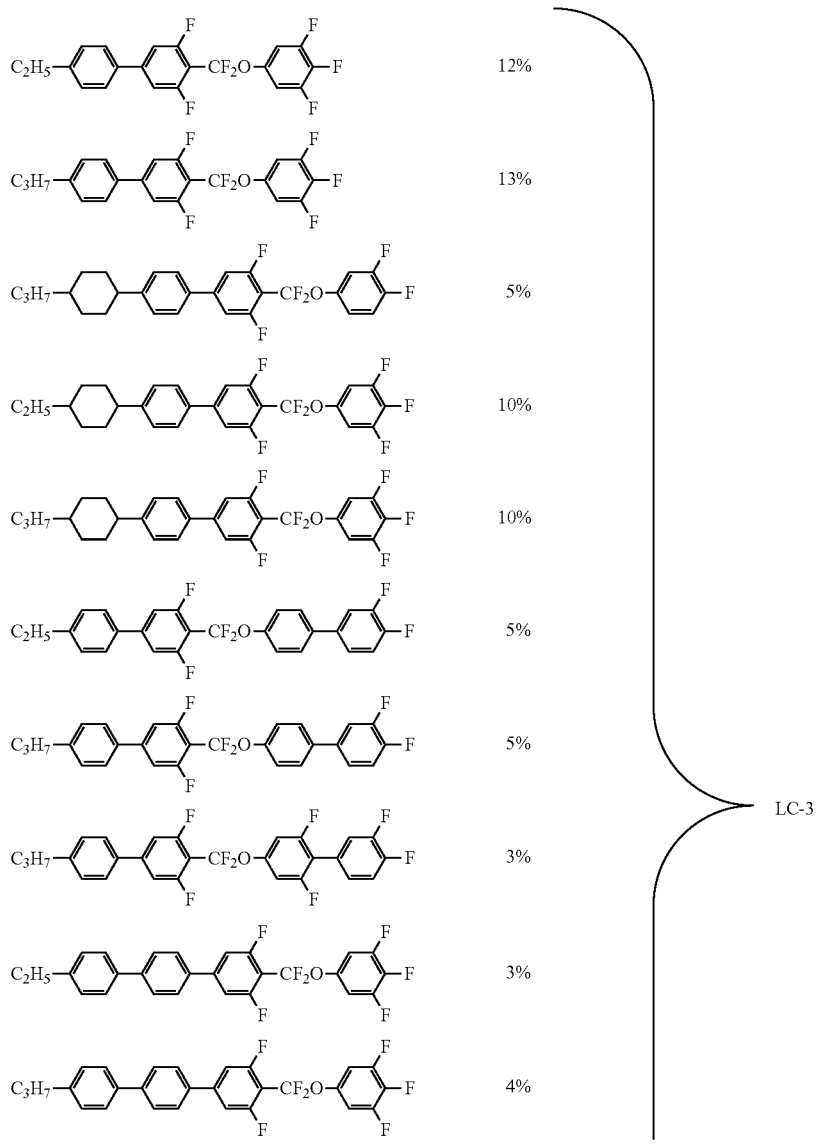

-continued

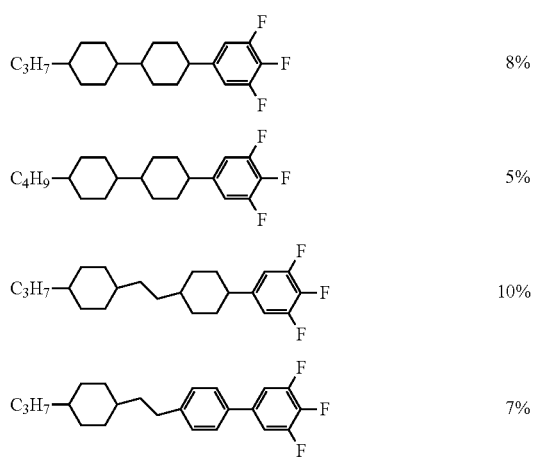

[Chem. 61]

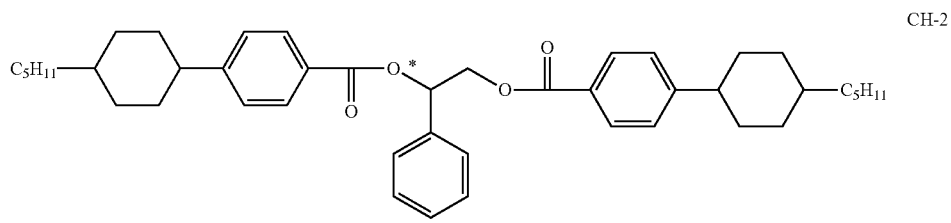

CH-2

TABLE 4

| | Example 9 | Example 10 | Example 11 | Example 12 |
|---|---|---|---|---|
| Liquid crystal material | Material 3 containing chiral liquid crystals | Material 3 containing chiral liquid crystals | Material 3 containing chiral liquid crystals | Material 3 containing chiral liquid crystals |
| Color filter | Color filter 1 | Color filter 2 | Color filter 3 | Color filter 4 |
| VHR | 99.2% | 99.0% | 99.5% | 99.4% |
| Burn-in | ⊙ | ⊙ | ⊙ | ⊙ |

The liquid crystal display devices according to Examples 9 to 12 had high VHRs. In the evaluation of burn-in, no after-image was observed, and the ratings were excellent.

Examples 13 to 16

The color filters 1 to 4 listed in Table 1 were used to produce color filters having striped pixels on a first substrate (without an electrode). An interdigitated electrode structure (interelectrode distance=5 μm) including two alternately arranged electrodes was formed on a second substrate. The first and second substrates not subjected to alignment treatment were used to produce a cell having a $d_{gap}$ of 5 μm. A material 4 containing chiral liquid crystals was injected between the substrates by a vacuum injection method to produce liquid crystal display devices according to Examples 13 to 16.

The material 4 containing chiral liquid crystals was prepared by mixing a nematic liquid crystal composition LC-4 (95.5%) and a chiral compound CH-3 (4.5%). The nematic liquid crystal composition LC-4 underwent a transition from a nematic phase to an isotropic phase at 83.1° C. The material 4 containing chiral liquid crystals underwent a transition from a blue phase (cubic) to an isotropic phase at 75.1° C. during heating.

Observation with a polarizing microscope showed that, even when the cell was rotated at a blue phase (cubic) temperature, the complete dark field was maintained and remained unchanged, thus resulting in the same darkness as the isotropic phase, and light leakage due to alignment defects was not observed.

The VHRs of the liquid crystal display devices were determined at a blue phase (cubic) temperature. The liquid crystal display devices were rated with respect to burn-in.

[Chem. 62]
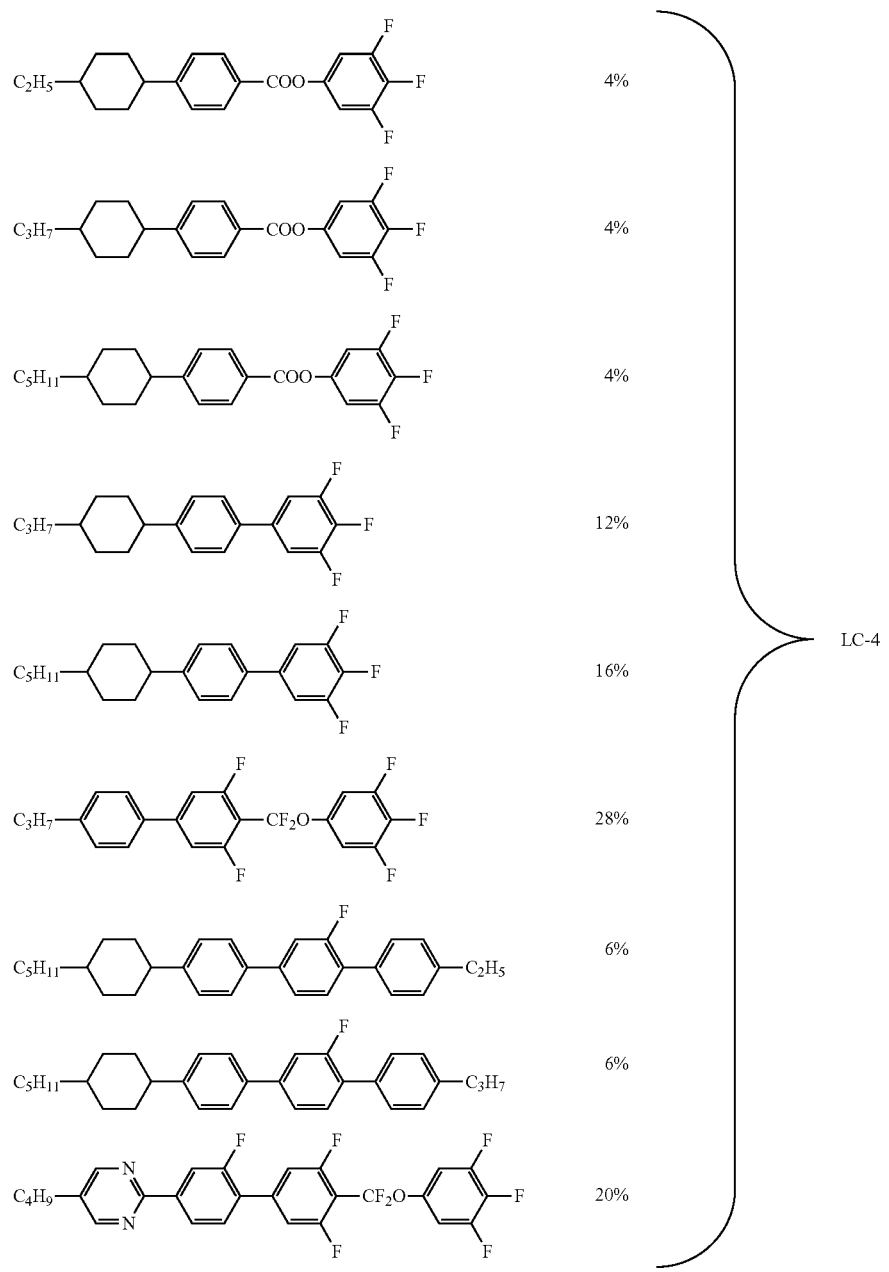
[Chem. 63]
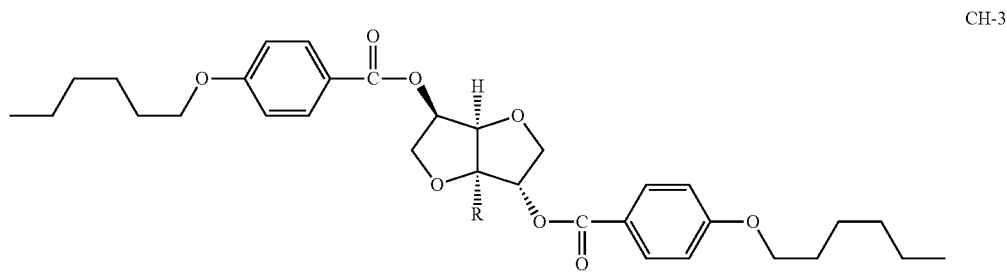
CH-3

TABLE 5

|  | Example 13 | Example 14 | Example 15 | Example 16 |
| --- | --- | --- | --- | --- |
| Liquid crystal material | Material 4 containing chiral liquid crystals | Material 4 containing chiral liquid crystals | Material 4 containing chiral liquid crystals | Material 4 containing chiral liquid crystals |
| Color filter | Color filter 1 | Color filter 2 | Color filter 3 | Color filter 4 |
| VHR | 98.1% | 98.0% | 98.7% | 98.5% |
| Burn-in | ◎ | ○ | ◎ | ◎ |

The liquid crystal display devices according to Examples 13 to 16 had high VHRs. In the evaluation of burn-in, no or very slight after-image was observed. Thus, burn-in was on an acceptable level.

Examples 17 to 20

The color filters 1 to 4 listed in Table 1 were used to produce color filters having striped pixels on a first substrate (without an electrode). An interdigitated electrode structure (interelectrode distance=5 pin) including two alternately arranged electrodes was formed on a second substrate. The first and second substrates not subjected to alignment treatment were used to produce a cell having a $d_{gap}$ of 5 µm. A material 5 containing chiral liquid crystals was injected between the substrates by a vacuum injection method to produce liquid crystal display devices according to Examples 17 to 20.

The material 5 containing chiral liquid crystals was prepared by mixing a nematic liquid crystal composition LC-5 (94.0%) and the chiral compound CH-3 (6.0%). The nematic liquid crystal composition LC-5 underwent a transition from a nematic phase to an isotropic phase at 82.8° C. The birefringence (Δn) was 0.180 (measured at 25° C., 589 nm). The material 5 containing chiral liquid crystals underwent a transition from a blue phase (cubic) to an isotropic phase at 72.2° C. during heating.

Observation with a polarizing microscope showed that, even when the cell was rotated at a blue phase (cubic) temperature, the complete dark field was maintained and remained unchanged, thus resulting in the same darkness as the isotropic phase, and light leakage due to alignment defects was not observed.

The VHRs of the liquid crystal display devices were determined at a blue phase (cubic) temperature. The liquid crystal display devices were rated with respect to burn-in. Table 6 shows the results.

[Chem. 64]

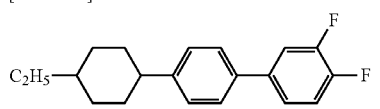 10%

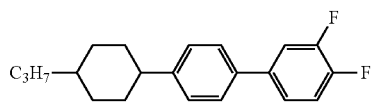 10%

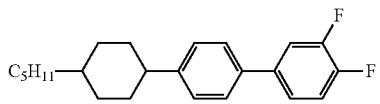 20%

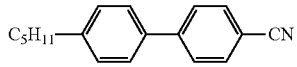 40%

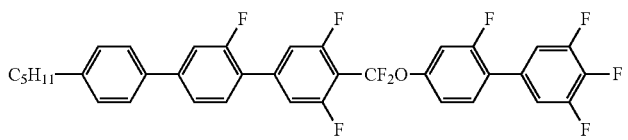 4%

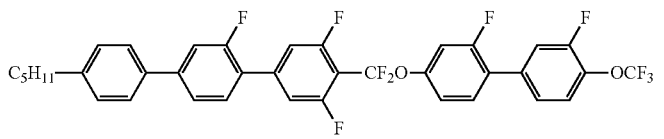 4%

LC-5

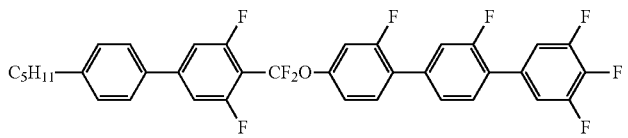 4%

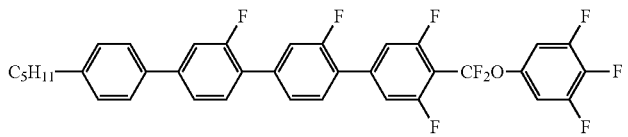 4%

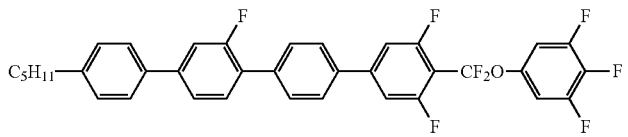 4%

TABLE 6

| | Example 17 | Example 18 | Example 19 | Example 20 |
|---|---|---|---|---|
| Liquid crystal material | Material 5 containing chiral liquid crystals | Material 5 containing chiral liquid crystals | Material 5 containing chiral liquid crystals | Material 5 containing chiral liquid crystals |
| Color filter | Color filter 1 | Color filter 2 | Color filter 3 | Color filter 4 |
| VHR | 99.2% | 99.1% | 99.6% | 99.5% |
| Burn-in | ⊚ | ⊚ | ⊚ | ⊚ |

The liquid crystal display devices according to Examples 17 to 20 had high VHRs. In the evaluation of burn-in, no after-image was observed, and the ratings were excellent.

Examples 21 to 24

The color filters 1 to 4 listed in Table 1 were used to produce color filters having striped pixels on a first substrate (without an electrode). An interdigitated electrode structure (interelectrode distance=5 μm) including two alternately arranged electrodes was formed on a second substrate. The first and second substrates not subjected to alignment treatment were used to produce a cell having a $d_{gap}$ of 5 μm. A material 6 containing chiral liquid crystals was injected between the substrates by a vacuum injection method to produce liquid crystal display devices according to Examples 21 to 24.

The material 6 containing chiral liquid crystals was prepared by mixing a nematic liquid crystal composition LC-6 (88.0%) and the chiral compound CH-2 (12.0%). The nematic liquid crystal composition LC-6 underwent a transition from a nematic phase to an isotropic phase at 73.0° C. The birefringence (Δn) was 0.128 (measured at 25° C., 589 nm), and the dielectric constant anisotropy (Δε) was −4.0 (measured at 25° C.). The material 6 containing chiral liquid crystals underwent a transition from a cholesteric phase to a blue phase (cubic) at 54° C. and from the blue phase (cubic) to an isotropic phase at 58.6° C. during heating.

Observation with a polarizing microscope showed that, even when the cell was rotated at a blue phase (cubic) temperature, the complete dark field was maintained and remained unchanged, thus resulting in the same darkness as the isotropic phase, and light leakage due to alignment defects was not observed.

The VHRs of the liquid crystal display devices were determined at a blue phase (cubic) temperature. The liquid crystal display devices were rated with respect to burn-in. Table 7 shows the results.

[Chem. 65]

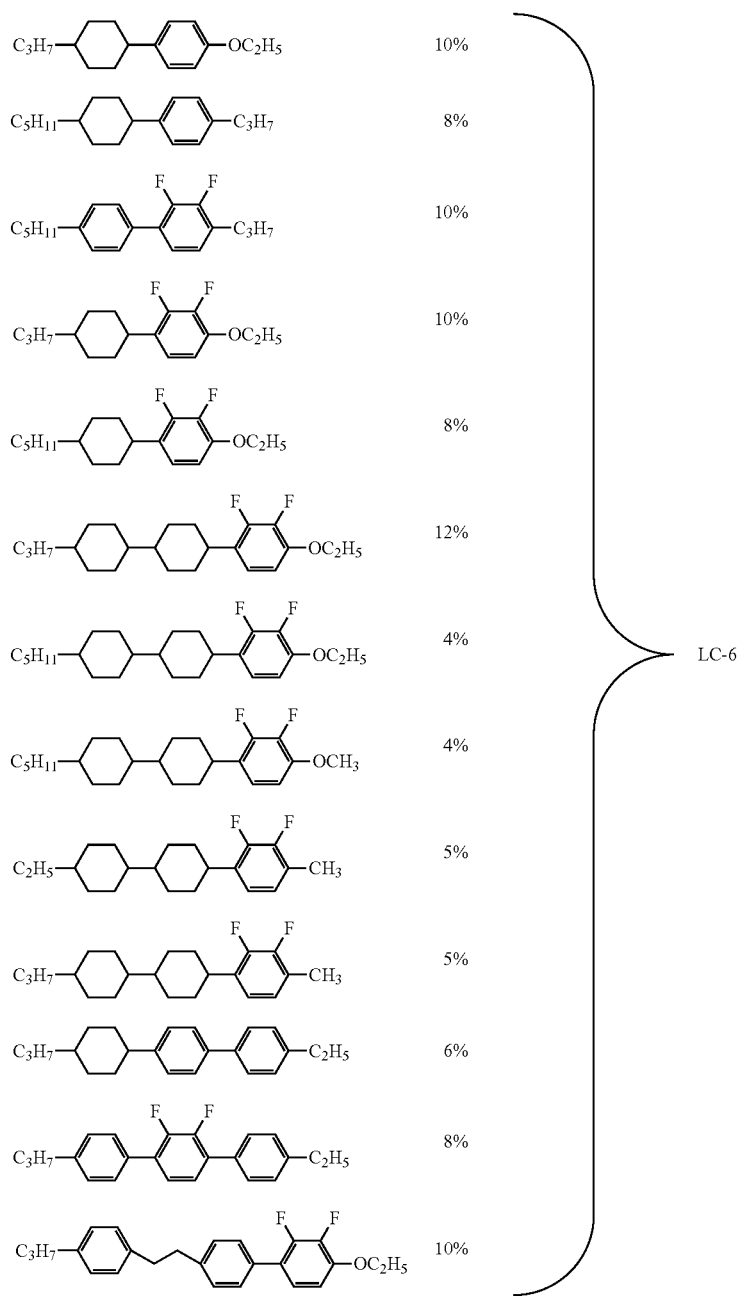

TABLE 7

|  | Example 21 | Example 22 | Example 23 | Example 24 |
|---|---|---|---|---|
| Liquid crystal material | Material 6 containing chiral liquid crystals | Material 6 containing chiral liquid crystals | Material 6 containing chiral liquid crystals | Material 6 containing chiral liquid crystals |
| Color filter | Color filter 1 | Color filter 2 | Color filter 3 | Color filter 4 |
| VHR | 98.1% | 98.0% | 98.6% | 98.4% |
| Burn-in | ◎ | ○ | ◎ | ◎ |

The liquid crystal display devices according to Examples 21 to 24 had high VHRs. In the evaluation of burn-in, no after-image was observed, and the ratings were excellent.

Examples 25 to 28

The color filters 1 to 4 listed in Table 1 were used to produce color filters having striped pixels on a first substrate (without an electrode). An interdigitated electrode structure (interelectrode distance=5 μm) including two alternately arranged electrodes was formed on a second substrate. The first and second substrates not subjected to alignment treatment were used to produce a cell having a $d_{gap}$ of 5 μm. A material 7 containing chiral liquid crystals was injected between the substrates by a vacuum injection method to produce liquid crystal display devices according to Examples 25 to 28.

The material 7 containing chiral liquid crystals was prepared by mixing a nematic liquid crystal composition LC-7 (80.0%) and a chiral compound CH-4 (20.0%). The nematic liquid crystal composition LC-7 formed a nematic phase from −29° C. and underwent a transition from the nematic phase to an isotropic phase at 101.3° C. The birefringence (Δn) was 0.239 (measured at 25° C., 589 nm), and the dielectric constant anisotropy (Δε) was 27.75 (measured at 25° C.). The material 7 containing chiral liquid crystals underwent a transition from a cholesteric phase to a blue phase (cubic) at 61.3° C., from the blue phase (cubic) to a blue phase (amorphous) at 64.9° C., and from the blue phase (amorphous) to an isotropic phase at 69.6° C., during heating.

Observation with a polarizing microscope showed that, even when the cell was rotated at a blue phase (amorphous) temperature, the complete dark field was maintained and remained unchanged, thus resulting in the same darkness as the isotropic phase, and light leakage due to alignment defects was not observed.

The VHRs of the liquid crystal display devices were determined at a blue phase (amorphous) temperature. The liquid crystal display devices were rated with respect to burn-in. Table 8 shows the results.

[Chem. 66]

| Structure | % | |
|---|---|---|
| CH₂=CH–(Cy)–(Cy)–C₃H₇ | 9.4% | |
| C₂H₅–(Ph)–C≡C–(Ph)–CH₃ | 6.5% | |
| C₃H₇–(Ph)–C≡C–(Ph)–OC₂H₅ | 0.7% | |
| C₄H₉–(Ph)–C≡C–(Ph)–OC₂H₅ | 1.1% | |
| C₅H₁₁–(Ph)–C≡C–(Ph)–OCH₃ | 1.1% | |
| C₃H₇–(Cy)–(Ph)–C≡C–(Ph)–C₂H₅ | 5.9% | |
| C₄H₉–(Cy)–(Ph)–C≡C–(Ph)–CH₃ | 5.9% | |
| C₂H₅–(Ph)–COO–(Ph,F)–CN | 7.6% | LC-7 |
| C₃H₇–(Ph)–COO–(Ph,F)–CN | 5.8% | |
| C₄H₉–(Ph)–COO–(Ph,F)–CN | 1.6% | |
| C₄H₉–(Pyrimidine)–(Ph)–CN | 5.8% | |
| C₅H₁₁–(Pyrimidine)–(Ph)–CN | 5.8% | |
| C₃H₇–(Pyrimidine)–(Ph,2F)–CN | 10.0% | |
| C₂H₅–(Cy)–(Ph)–COO–(Ph,F)–CN | 3.0% | |
| C₃H₇–(Cy)–(Ph)–COO–(Ph,F)–CN | 3.0% | |
| C₂H₅–(Ph)–(Ph,F)–(Ph)–CN | 12.5% | |
| C₃H₇–(Ph)–(Pyrimidine)–(Ph)–CN | 14.2% | |
| HO–(Ph, di-tBu)–CH₂CH₂–COO·C₁₈H₃₇ | 0.1% | |
| benzotriazole-(Ph,CH₃,OH) | 0.3% | |

-continued

[Chem. 67]

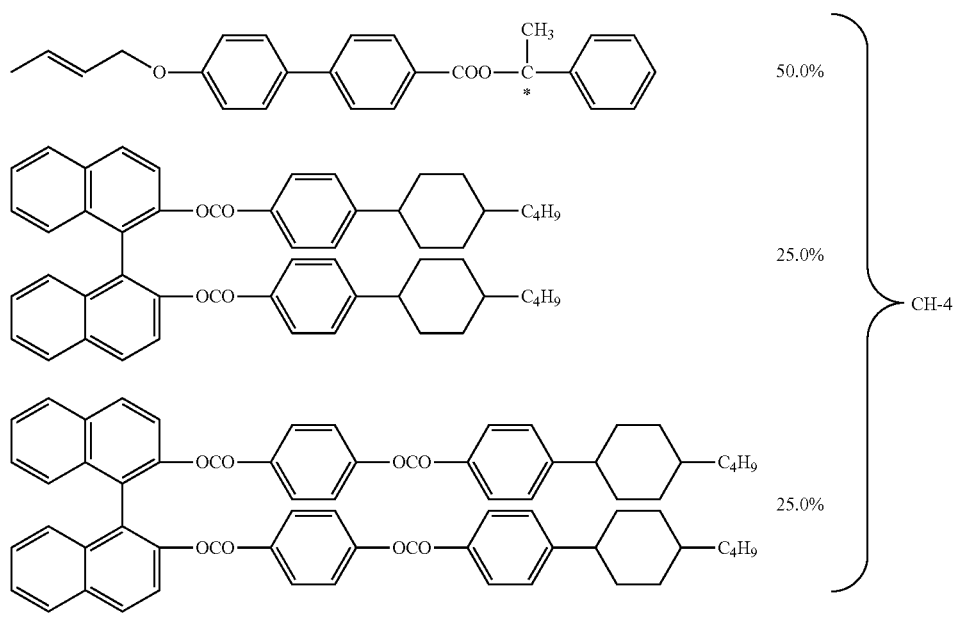

CH-4

TABLE 8

|  | Example 25 | Example 26 | Example 27 | Example 28 |
| --- | --- | --- | --- | --- |
| Liquid crystal material | Material 7 containing chiral liquid crystals | Material 7 containing chiral liquid crystals | Material 7 containing chiral liquid crystals | Material 7 containing chiral liquid crystals |
| Color filter | Color filter 1 | Color filter 2 | Color filter 3 | Color filter 4 |
| VHR | 97.2% | 97.1% | 97.6% | 97.4% |
| Burn-in | ◎ | ◎ | ◎ | ◎ |

The liquid crystal display devices according to Examples 25 to 28 had high VHRs. In the evaluation of burn-in, no after-image was observed, and the ratings were excellent.

Comparative Examples 1 to 7

A liquid crystal display device according to Comparative Example 1 was produced in the same manner as in Examples 1 to 4 except that the comparative color filter 1 listed in Table 1 was used. A liquid crystal display device according to Comparative Example 2 was produced in the same manner as in Examples 5 to 8 except that the comparative color filter 1 listed in Table 1 was used. A liquid crystal display device according to Comparative Example 3 was produced in the same manner as in Examples 9 to 12 except that the comparative color filter 1 listed in Table 1 was used. A liquid crystal display device according to Comparative Example 4 was produced in the same manner as in Examples 13 to 16 except that the comparative color filter 1 listed in Table 1 was used. A liquid crystal display device according to Comparative Example 5 was produced in the same manner as in Examples 17 to 20 except that the comparative color filter 1 listed in Table 1 was used. A liquid crystal display device according to Comparative Example 6 was produced in the same manner as in Examples 21 to 24 except that the comparative color filter 1 listed in Table 1 was used. A liquid crystal display device according to Comparative Example 7 was produced in the same manner as in Examples 25 to 28 except that the comparative color filter 1 listed in Table 1 was used.

Observation with a polarizing microscope showed that, even when the cell was rotated, the complete dark field was maintained and remained unchanged, thus resulting in the same darkness as the isotropic phase, and light leakage due to alignment defects was not observed.

The VHRs of the liquid crystal display devices were determined. The liquid crystal display devices were rated with respect to burn-in. Tables 9 and 10 show the results.

TABLE 9

|  | Comparative example 1 | Comparative example 2 | Comparative example 3 | Comparative example 4 |
| --- | --- | --- | --- | --- |
| Liquid crystal material | Material 1 containing chiral liquid crystals | Material 2 containing chiral liquid crystals | Material 3 containing chiral liquid crystals | Material 4 containing chiral liquid crystals |

TABLE 9-continued

|  | Comparative example 1 | Comparative example 2 | Comparative example 3 | Comparative example 4 |
|---|---|---|---|---|
| Color filter | Comparative Color filter 1 | Comparative Color filter 1 | Comparative Color filter 1 | Comparative Color filter 1 |
| VHR | 89.7% | 89.8% | 89.8% | 89.7% |
| Burn-in | x | x | x | x |

TABLE 10

|  | Comparative example 5 | Comparative example 6 | Comparative example 7 |
|---|---|---|---|
| Liquid crystal material | Material 5 containing chiral liquid crystals | Material 6 containing chiral liquid crystals | Material 7 containing chiral liquid crystals |
| Color filter | Comparative Color filter 1 | Comparative Color filter 1 | Comparative Color filter 1 |
| VHR | 89.8% | 89.7% | 89.6% |
| Burn-in | x | x | x |

The liquid crystal display devices according to Comparative Examples 1 to 7 had lower VHRs than the liquid crystal display devices according to the present invention. In the evaluation of burn-in in the liquid crystal display devices according to Comparative Examples 1 to 7, after-images were observed, and burn-in was unacceptable.

Comparative Examples 8 to 11

Liquid crystal display devices according to Comparative Examples 8 to 11 were produced in the same manner as in Examples 1 to 4 except that a comparative material 1 containing chiral liquid crystals was used.

The comparative material 1 containing chiral liquid crystals was prepared by mixing a nematic liquid crystal composition LC-8 (95.0%) and a chiral compound CH-5 (5.0%). The nematic liquid crystal composition LC-8 underwent a transition from a nematic phase to an isotropic phase at 35° C. The birefringence (Δn) was 0.184 (measured at 20° C., 589 nm), and the dielectric constant anisotropy (Δε) was 11.0 (measured at 26° C.). The comparative material 1 containing chiral liquid crystals underwent a transition from a cholesteric phase to an isotropic phase at 30° C. during heating without a transition to a blue phase.

The VHRs of the liquid crystal display devices were determined at a cholesteric phase temperature of 25° C. The liquid crystal display devices were rated with respect to burn-in. Table 11 shows the results.

[Chem. 68]

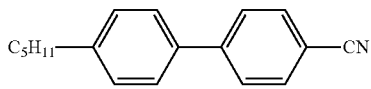

LC-9

[Chem. 69]

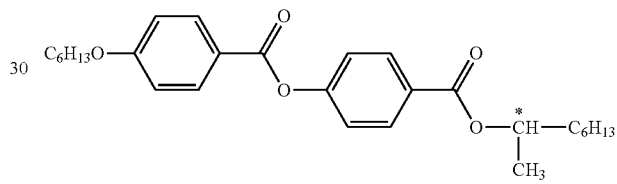

CH-5

TABLE 11

|  | Comparative example 8 | Comparative example 9 | Comparative example 10 | Comparative example 11 |
|---|---|---|---|---|
| Liquid crystal material | Comparative Material 1 containing chiral liquid crystals | Comparative Material 1 containing chiral liquid crystals | Comparative Material 1 containing chiral liquid crystals | Comparative Material 1 containing chiral liquid crystals |
| Color filter | Color filter 1 | Color filter 2 | Color filter 3 | Color filter 4 |
| VHR | 89.1% | 89.0% | 89.3% | 89.2% |
| Burn-in | x | x | x | x |

The liquid crystal display devices according to Comparative Examples 8 to 11 had lower VHRs than the liquid crystal display devices according to the present invention. In the evaluation of burn-in in the liquid crystal display devices according to Comparative Examples 8 to 11, after-images were observed, and burn-in was unacceptable.

Examples 29 to 32

The color filters 1 to 4 listed in Table 1 were used to produce color filters having striped pixels on a first substrate (without an electrode). An interdigitated electrode structure (interelectrode distance=5 μm) including two alternately arranged electrodes was formed on a second substrate. The first and second substrates not subjected to alignment treatment were used to produce a cell having a $d_{gap}$ of 5 μm. A material 8 containing chiral liquid crystals was injected between the substrates by a vacuum injection method.

The composition 8 containing chiral liquid crystals was prepared by mixing 88.8% of the material 1 containing chiral liquid crystals and 11.2% of the following monomer mixture 1. The material 8 containing chiral liquid crystals underwent a transition from a cholesteric phase to a blue phase (cubic) at 14° C. and from the blue phase (cubic) to an isotropic phase at 20.6° C. during heating. A metal halide lamp was used as a light source. A surface of the second substrate, on which no color filter was formed, of a liquid crystal display device containing the material 8 containing chiral liquid crystals was irradiated with ultraviolet light (illuminance of 5 mW/cm$^2$ at a center wavelength of 365 nm) through a UV cut filter L-37 (manufactured by Hoya Candeo Optronics Corporation) at a blue phase (cubic) temperature for 300 seconds. A polymerizable compound was polymerized to produce liquid crystal display devices containing a liquid crystal-polymer composite material 1 according to Examples 29 to 32.

Observation with a polarizing microscope at room temperature showed that, even when the cell was rotated, the complete dark field was maintained and remained unchanged, thus resulting in the same darkness as the isotropic phase, and light leakage due to alignment defects was not observed. Thus, the blue phase (cubic) was confirmed.

The VHRs of the liquid crystal display devices were determined at a blue phase (cubic) temperature. The liquid crystal display devices were rated with respect to burn-in. Table 12 shows the results.

The liquid crystal display devices according to Examples 29 to 32 had high VHRs. In the evaluation of burn-in, no after-image was observed, and the ratings were excellent.

Examples 33 to 36

The color filters 1 to 4 listed in Table 1 were used to produce color filters having striped pixels on a first substrate (without an electrode). An interdigitated electrode structure (interelectrode distance=5 μm) including two alternately arranged electrodes was formed on a second substrate. The first and second substrates not subjected to alignment treatment were used to produce a cell having a $d_{gap}$ of 5 μm. A material 9 containing chiral liquid crystals was injected between the substrates by a vacuum injection method.

The material 9 containing chiral liquid crystals was prepared by mixing 88.8% of the material 2 containing chiral liquid crystals and 11.2% of the monomer mixture 1. The material 9 containing chiral liquid crystals underwent a transition from a cholesteric phase to a blue phase (cubic) at 28° C. and from the blue phase (cubic) to an isotropic phase at 32.6° C. during heating. A metal halide lamp was used as a light source. A surface of the second substrate, on which no color filter was formed, of a liquid crystal display device containing the material 9 containing chiral liquid crystals was irradiated with ultraviolet light (illuminance of 5 mW/cm$^2$ at a center wavelength of 365 nm) through a UV cut filter L-37 (manufactured by Hoya Candeo Optronics Corporation) at a blue phase (cubic) temperature for 300 seconds. A polymerizable compound was polymerized to produce liquid crystal display devices containing a liquid crystal-polymer composite material 2 according to Examples 33 to 36.

Observation with a polarizing microscope at room temperature showed that, even when the cell was rotated, the complete dark field was maintained and remained unchanged, thus resulting in the same darkness as the isotropic phase, and light leakage due to alignment defects was not observed. Thus, the blue phase (cubic) was confirmed.

[Chem. 70]

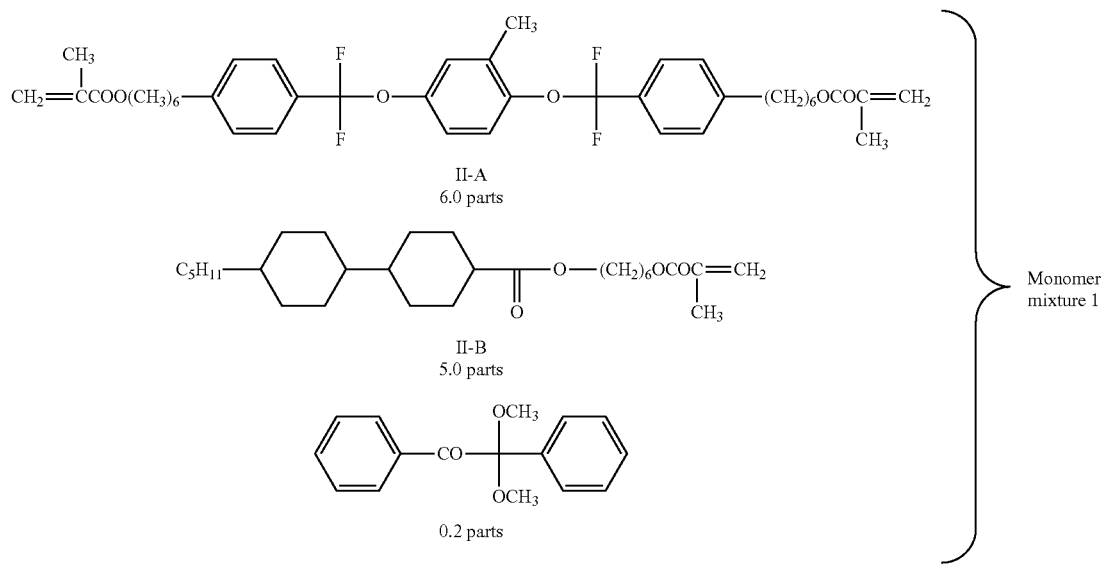

TABLE 12

|  | Example 29 | Example 30 | Example 31 | Example 32 |
|---|---|---|---|---|
| Liquid crystal material | Liquid crystal-polymer composite material 1 | Liquid crystal-polymer composite material 1 | Liquid crystal-polymer composite material 1 | Liquid crystal-polymer composite material 1 |
| Color filter | Color filter 1 | Color filter 2 | Color filter 3 | Color filter 4 |
| VHR | 98.3% | 98.1% | 98.7% | 98.5% |
| Burn-in | ◉ | ○ | ◉ | ◉ |

The VHRs of the liquid crystal display devices were determined at a blue phase (cubic) temperature. The liquid crystal display devices were rated with respect to burn-in. Table 13 shows the results.

TABLE 13

|  | Example 33 | Example 34 | Example 35 | Example 36 |
|---|---|---|---|---|
| Liquid crystal material | Liquid crystal-polymer composite material 2 | Liquid crystal-polymer composite material 2 | Liquid crystal-polymer composite material 2 | Liquid crystal-polymer composite material 2 |
| Color filter | Color filter 1 | Color filter 2 | Color filter 3 | Color filter 4 |
| VHR | 97.1% | 97.0% | 97.6% | 97.4% |
| Burn-in | ◉ | ○ | ◉ | ◉ |

The liquid crystal display devices according to Examples 33 to 36 had high VHRs. In the evaluation of burn-in, no after-image was observed, and the ratings were excellent.

Examples 37 to 40

The color filters 1 to 4 listed in Table 1 were used to produce color filters having striped pixels on a first substrate (without an electrode). An interdigitated electrode structure (interelectrode distance=5 μm) including two alternately arranged electrodes was formed on a second substrate. The first and second substrates not subjected to alignment treatment were used to produce a cell having a $d_{gap}$ of 5 μm. A material 10 containing chiral liquid crystals was injected between the substrates by a vacuum injection method.

The material 10 containing chiral liquid crystals was prepared by mixing 87.1% of the material 3 containing chiral liquid crystals and 12.9% of the following monomer mixture 2. The material 10 containing chiral liquid crystals underwent a transition from a cholesteric phase to a blue phase (cubic) at 44° C. and from the blue phase (cubic) to an isotropic phase at 49.6° C. during heating.

A metal halide lamp was used as a light source. A surface of the second substrate, on which no color filter was formed, of a liquid crystal display device containing the material 10 containing chiral liquid crystals was irradiated with ultraviolet light (illuminance of 5 mW/cm² at a center wavelength of 365 nm) through a UV cut filter L-37 (manufactured by Hoya Candeo Optronics Corporation) at 49.7° C., which was directly above the clearing point, for 300 seconds. A polymerizable compound was polymerized to produce liquid crystal display devices containing a liquid crystal-polymer composite material 3 according to Examples 37 to 40.

Observation with a polarizing microscope at room temperature showed that, even when the cell was rotated, the complete dark field was maintained and remained unchanged, thus resulting in the same darkness as the isotropic phase, and light leakage due to alignment defects was not observed. Thus, the blue phase (cubic) was confirmed.

The VHRs of the liquid crystal display devices were determined at a blue phase (cubic) temperature. The liquid crystal display devices were rated with respect to burn-in. Table 14 shows the results.

[Chem. 71]

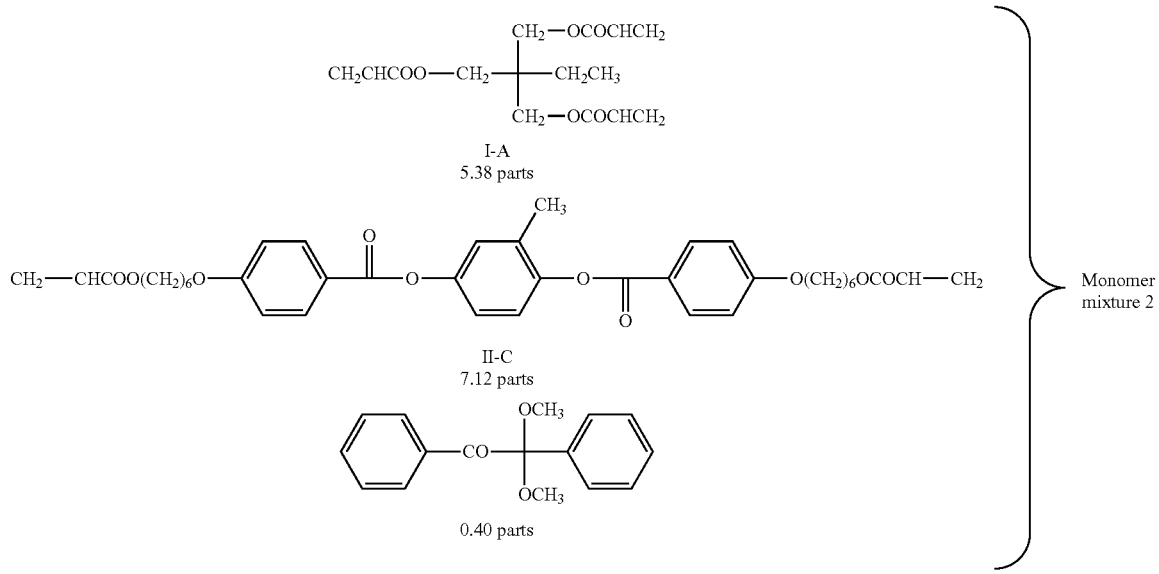

TABLE 14

|  | Example 37 | Example 38 | Example 39 | Example 40 |
|---|---|---|---|---|
| Liquid crystal material | Liquid crystal-polymer composite material 3 | Liquid crystal-polymer composite material 3 | Liquid crystal-polymer composite material 3 | Liquid crystal-polymer composite material 3 |

TABLE 14-continued

| | Example 37 | Example 38 | Example 39 | Example 40 |
|---|---|---|---|---|
| Color filter | Color filter 1 | Color filter 2 | Color filter 3 | Color filter 4 |
| VHR | 98.2% | 98.0% | 98.8% | 98.7% |
| Burn-in | ⊚ | ○ | ⊚ | ⊚ |

[Chem. 72]

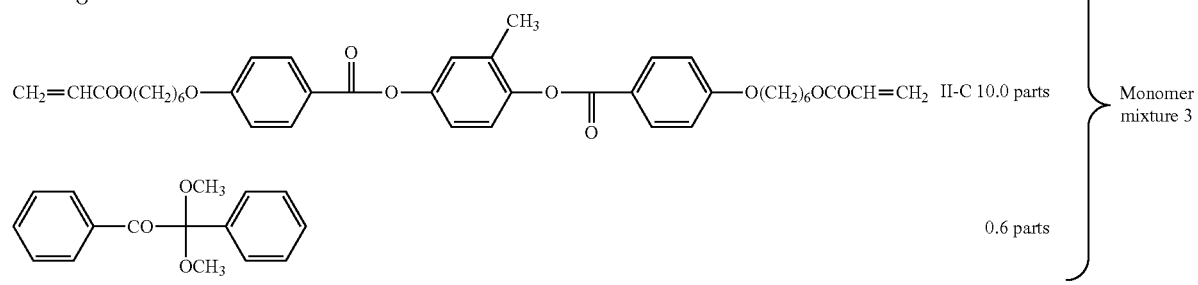

The liquid crystal display devices according to Examples 37 to 40 had high VHRs. In the evaluation of burn-in, no after-image was observed, and the ratings were excellent.

Examples 41 to 44

The color filters 1 to 4 listed in Table 1 were used to produce color filters having striped pixels on a first substrate (without an electrode). An interdigitated electrode structure (interelectrode distance=5 μm) including two alternately arranged electrodes was formed on a second substrate. The first and second substrates not subjected to alignment treatment were used to produce a cell having a $d_{gap}$ of 5 μm. A material 11 containing chiral liquid crystals was injected between the substrates by a vacuum injection method.

The material 11 containing chiral liquid crystals was prepared by mixing 79.4% of the material 4 containing chiral liquid crystals and 20.6% of the following monomer mixture 3. The material 11 containing chiral liquid crystals underwent a transition from a blue phase (cubic) to an isotropic phase at 62.9° C. during heating.

A metal halide lamp was used as a light source. A surface of the second substrate, on which no color filter was formed, of a liquid crystal display device containing the material 11 containing chiral liquid crystals was irradiated with ultraviolet light (illuminance of 5 mW/cm² at a center wavelength of 365 nm) through a UV cut filter L-37 (manufactured by Hoya Candeo Optronics Corporation) at 63.0° C., which was directly above the clearing point, for 300 seconds. A polymerizable compound was polymerized to produce liquid crystal display devices containing a liquid crystal-polymer composite material 4 according to Examples 41 to 44.

Observation with a polarizing microscope at room temperature showed that, even when the cell was rotated, the complete dark field was maintained and remained unchanged, thus resulting in the same darkness as the isotropic phase, and light leakage due to alignment defects was not observed. Thus, the blue phase (cubic) was confirmed.

The VHRs of the liquid crystal display devices were determined at a blue phase (cubic) temperature. The liquid crystal display devices were rated with respect to burn-in. Table 15 shows the results.

TABLE 15

| | Example 41 | Example 42 | Example 43 | Example 44 |
|---|---|---|---|---|
| Liquid crystal material | Liquid crystal-polymer composite material 4 | Liquid crystal-polymer composite material 4 | Liquid crystal-polymer composite material 4 | Liquid crystal-polymer composite material 4 |
| Color filter | Color filter 1 | Color filter 2 | Color filter 3 | Color filter 4 |
| VHR | 97.2% | 97.0% | 97.5% | 97.4% |
| Burn-in | ⊚ | ○ | ⊚ | ⊚ |

The liquid crystal display devices according to Examples 41 to 44 had high VHRs. In the evaluation of burn-in, no after-image was observed, and the ratings were excellent.

Examples 45 to 48

The color filters 1 to 4 listed in Table 1 were used to produce color filters having striped pixels on a first substrate (without an electrode). An interdigitated electrode structure (interelectrode distance=5 μm) including two alternately arranged electrodes was formed on a second substrate. The first and second substrates not subjected to alignment treatment were used to produce a cell having a $d_{gap}$ of 5 μm. A material 12 containing chiral liquid crystals was injected between the substrates by a vacuum injection method.

The material 12 containing chiral liquid crystals was prepared by mixing 79.4% of the material 5 containing chiral liquid crystals and 20.6% of the monomer mixture 3. The material 12 containing chiral liquid crystals underwent a transition from a blue phase (cubic) to an isotropic phase at 67.9° C. during heating.

A metal halide lamp was used as a light source. A surface of the second substrate, on which no color filter was formed, of a liquid crystal display device containing the material 12 containing chiral liquid crystals was irradiated with ultraviolet light (illuminance of 5 mW/cm² at a center wavelength of 365 nm) through a UV cut filter L-37 (manufactured by Hoya Candeo Optronics Corporation) at 68.0° C., which was directly above the clearing point, for 300 seconds. A polymerizable compound was polymerized to produce liquid crystal display devices containing a liquid crystal-polymer composite material 5 according to Examples 45 to 48.

Observation with a polarizing microscope at room temperature showed that, even when the cell was rotated, the complete dark field was maintained and remained unchanged, thus resulting in the same darkness as the isotropic phase, and light leakage due to alignment defects was not observed. Thus, the blue phase (cubic) was confirmed.

The VHRs of the liquid crystal display devices were determined at a blue phase (cubic) temperature. The liquid crystal display devices were rated with respect to burn-in. Table 16 shows the results.

TABLE 16

|  | Example 45 | Example 46 | Example 47 | Example 48 |
|---|---|---|---|---|
| Liquid crystal material | Liquid crystal-polymer composite material 5 | Liquid crystal-polymer composite material 5 | Liquid crystal-polymer composite material 5 | Liquid crystal-polymer composite material 5 |
| Color filter | Color filter 1 | Color filter 2 | Color filter 3 | Color filter 4 |
| VHR | 98.1% | 98.0% | 98.5% | 98.4% |
| Burn-in | ⊚ | ◯ | ⊚ | ⊚ |

The liquid crystal display devices according to Examples 45 to 48 had high VHRs. In the evaluation of burn-in, no after-image was observed, and the ratings were excellent.

Examples 49 to 52

The color filters 1 to 4 listed in Table 1 were used to produce color filters having striped pixels on a first substrate (without an electrode). An interdigitated electrode structure (interelectrode distance=5 μm) including two alternately arranged electrodes was formed on a second substrate. The first and second substrates not subjected to alignment treatment were used to produce a cell having a $d_{gap}$ of 5 μm. A material 13 containing chiral liquid crystals was injected between the substrates by a vacuum injection method.

The material 13 containing chiral liquid crystals was prepared by mixing 87.1% of the material 6 containing chiral liquid crystals and 12.9% of the monomer mixture 2. The material 13 containing chiral liquid crystals underwent a transition from a cholesteric phase to a blue phase (cubic) at 38° C. and from the blue phase (cubic) to an isotropic phase at 43.9° C. during heating.

A metal halide lamp was used as a light source. A surface of the second substrate, on which no color filter was formed, of a liquid crystal display device containing the material 13 containing chiral liquid crystals was irradiated with ultraviolet light (illuminance of 5 mW/cm² at a center wavelength of 365 nm) through a UV cut filter L-37 (manufactured by Hoya Candeo Optronics Corporation) at 44.0° C., which was directly above the clearing point, for 300 seconds. A polymerizable compound was polymerized to produce liquid crystal display devices containing a liquid crystal-polymer composite material 6 according to Examples 49 to 52.

Observation with a polarizing microscope at room temperature showed that, even when the cell was rotated, the complete dark field was maintained and remained unchanged, thus resulting in the same darkness as the isotropic phase, and light leakage due to alignment defects was not observed. Thus, the blue phase (cubic) was confirmed.

The VHRs of the liquid crystal display devices were determined at a blue phase (cubic) temperature. The liquid crystal display devices were rated with respect to burn-in.

TABLE 17

|  | Example 49 | Example 50 | Example 51 | Example 52 |
|---|---|---|---|---|
| Liquid crystal material | Liquid crystal-polymer composite material 6 | Liquid crystal-polymer composite material 6 | Liquid crystal-polymer composite material 6 | Liquid crystal-polymer composite material 6 |
| Color filter | Color filter 1 | Color filter 2 | Color filter 3 | Color filter 4 |
| VHR | 97.1% | 96.9% | 97.5% | 97.3% |
| Burn-in | ⊚ | ◯ | ⊚ | ⊚ |

The liquid crystal display devices according to Examples 49 to 52 had high VHRs. In the evaluation of burn-in, no after-image was observed, and the ratings were excellent.

Examples 53 to 56

The color filters 1 to 4 listed in Table 1 were used to produce color filters having striped pixels on a first substrate (without an electrode). An interdigitated electrode structure (interelectrode distance=5 μm) including two alternately arranged electrodes was formed on a second substrate. The first and second substrates not subjected to alignment treatment were used to produce a cell having a $d_{gap}$ of 5 μm. A material 14 containing chiral liquid crystals was injected between the substrates by a vacuum injection method.

The material 14 containing chiral liquid crystals was prepared by mixing 89.1% of the material 7 containing chiral liquid crystals and 10.9% of the following monomer mixture 4.

The material 14 containing chiral liquid crystals underwent a transition from a cholesteric phase to a blue phase (amorphous) at 42.7° C. and from the blue phase (amorphous) to an isotropic phase at 51.8° C. during heating.

A metal halide lamp was used as a light source. A surface of the second substrate, on which no color filter was formed, of a liquid crystal display device containing the chiral liquid crystal composition 14 was irradiated with ultraviolet light (illuminance of 5 mW/cm² at a center wavelength of 365 nm) through a UV cut filter L-37 (manufactured by Hoya Candeo Optronics Corporation) at a blue phase (amorphous) temperature of 44° C. for 300 seconds. A polymerizable compound was polymerized to produce liquid crystal display devices containing a liquid crystal-polymer composite material 7 according to Examples 49 to 52.

Observation with a polarizing microscope at room temperature showed that, even when the cell was rotated, the complete dark field was maintained and remained unchanged, thus resulting in the same darkness as the isotropic phase, and light leakage due to alignment defects was not observed. Thus, the blue phase (amorphous) was confirmed.

The VHRs of the liquid crystal display devices were determined at a blue phase (amorphous) temperature. The liquid crystal display devices were rated with respect to burn-in. Table 18 shows the results.

[Chem. 73]

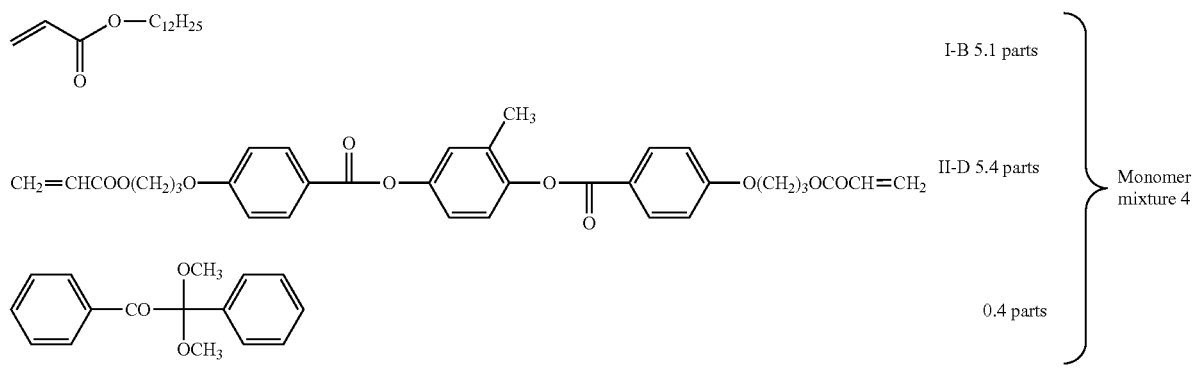

TABLE 18

|  | Example 53 | Example 54 | Example 55 | Example 56 |
|---|---|---|---|---|
| Liquid crystal material | Liquid crystal-polymer composite material 7 | Liquid crystal-polymer composite material 7 | Liquid crystal-polymer composite material 7 | Liquid crystal-polymer composite material 7 |
| Color filter | Color filter 1 | Color filter 2 | Color filter 3 | Color filter 4 |
| VHR | 96.8% | 96.7% | 97.1% | 97.0% |
| Burn-in | ◎ | ○ | ◎ | ◎ |

The liquid crystal display devices according to Examples 53 to 56 had high VHRs. In the evaluation of burn-in, no after-image was observed, and the ratings were excellent.

Comparative Examples 12 to 18

A liquid crystal display device according to Comparative Example 12 was produced in the same manner as in Examples 29 to 32 except that the comparative color filter 1 listed in Table 1 was used. A liquid crystal display device according to Comparative Example 13 was produced in the same manner as in Examples 33 to 36 except that the comparative color filter 1 listed in Table 1 was used. A liquid crystal display device according to Comparative Example 14 was produced in the same manner as in Examples 36 to 40 except that the comparative color filter 1 listed in Table 1 was used. A liquid crystal display device according to Comparative Example 15 was produced in the same manner as in Examples 41 to 44 except that the comparative color filter 1 listed in Table 1 was used. A liquid crystal display device according to Comparative Example 16 was produced in the same manner as in Examples 45 to 48 except that the comparative color filter 1 listed in Table 1 was used. A liquid crystal display device according to Comparative Example 17 was produced in the same manner as in Examples 49 to 52 except that the comparative color filter 1 listed in Table 1 was used. A liquid crystal display device according to Comparative Example 18 was produced in the same manner as in Examples 53 to 56 except that the comparative color filter 1 listed in Table 1 was used.

Observation with a polarizing microscope at room temperature showed that, even when the cell was rotated, the complete dark field was maintained and remained unchanged, thus resulting in the same darkness as the isotropic phase, and light leakage due to alignment defects was not observed. Thus, the blue phase (cubic) or blue phase (amorphous) was confirmed.

The VHRs of the liquid crystal display devices were determined at a blue phase (cubic) or blue phase (amorphous) temperature. The liquid crystal display devices were rated with respect to burn-in. Table 19 shows the results.

TABLE 19

|  | Comparative example 12 | Comparative example 13 | Comparative example 14 | Comparative example 15 |
|---|---|---|---|---|
| Liquid crystal material | Liquid crystal-polymer composite material 1 | Liquid crystal-polymer composite material 2 | Liquid crystal-polymer composite material 3 | Liquid crystal-polymer composite material 4 |
| Color filter | Comparative Color filter 1 | Comparative Color filter 1 | Comparative Color filter 1 | Comparative Color filter 1 |
| VHR | 89.7% | 88.9% | 89.5% | 88.6% |
| Burn-in | x | x | x | x |

|  | Comparative example 16 | Comparative example 17 | Comparative example 18 |
|---|---|---|---|
| Liquid crystal composition | Liquid crystal-polymer composite material 5 | Liquid crystal-polymer composite material 6 | Liquid crystal-polymer composite material 7 |
| Color filter | Comparative Color filter 1 | Comparative Color filter 1 | Comparative Color filter 1 |
| VHR | 89.6% | 88.8% | 87.7% |
| Burn-in | x | x | x |

The liquid crystal display devices according to Comparative Examples 12 to 18 had lower VHRs than the liquid crystal display devices according to the present invention. In the evaluation of burn-in in the liquid crystal display devices according to Comparative Examples 12 to 18, after-images were observed, and burn-in was unacceptable.

In the formulae LC-1 to LC-8, CH-1 to CH-5, and the monomer mixtures 1 to 4, $CH_3$, $C_2H_5$, $C_3H_7$, $C_4H_9$, $C_5H_{11}$, and $C_6H_{13}$ are linear alkyl groups.

The invention claimed is:

1. A liquid crystal display device comprising:
a first substrate; a second substrate; a liquid crystal layer between the first substrate and the second substrate; a color filter; a pixel electrode; and a common electrode; the color filter including a black matrix and at least RGB three-color pixel units,
wherein the liquid crystal layer is formed of a material containing chiral liquid crystals, the material containing chiral liquid crystals containing a nematic liquid crystal composition and at least one chiral compound, the nematic liquid crystal composition containing at least two achiral liquid crystal compounds, and the RGB three-color pixel units contain, as a coloring material, a diketopyrrolopyrrole pigment and/or an anionic red organic dye in the R pixel unit, at least one selected from the group consisting of a halogenated copper phthalocyanine pigment, a phthalocyanine green dye, and a mixture of a phthalocyanine blue dye and an azo yellow organic dye in the G pixel unit, and an ε-copper phthalocyanine pigment and/or a cationic blue organic dye in the B pixel unit, wherein the material containing chiral liquid crystals has a blue phase.

2. The liquid crystal display device according to claim 1, wherein the RGB three-color pixel units contain, as a coloring material, C.I. Solvent Red 124 in the R pixel unit, a mixture of C.I. Solvent Blue 67 and C.I. Solvent Yellow 162 in the G pixel unit, and C.I. Solvent Blue 7 in the B pixel unit.

3. The liquid crystal display device according to claim 1, wherein the RGB three-color pixel units contain, as a coloring material, C.I. Pigment Red 254 in the R pixel unit, C.I. Pigment Green 7 and/or 36 in the G pixel unit, and C.I. Pigment Blue 15:6 in the B pixel unit.

4. The liquid crystal display device according to claim 1, wherein the R pixel unit further contains at least one organic dye or pigment selected from the group consisting of C.I. Pigment Red 177, 242, 166, 167, and 179, C.I. Pigment Orange 38 and 71, C.I. Pigment Yellow 150, 215, 185, 138, and 139, C.I. Solvent Red 89, C.I. Solvent Orange 56, and C.I. Solvent Yellow 21, 82, 83:1, 33, and 162.

5. The liquid crystal display device according to claim 1, wherein the G pixel unit further contains at least one organic dye or pigment selected from the group consisting of C.I. Pigment Yellow 150, 215, 185, and 138 and C.I. Solvent Yellow 21, 82, 83:1, and 33.

6. The liquid crystal display device according to claim 1, wherein the B pixel unit further contains at least one organic dye or pigment selected from the group consisting of C.I. Pigment Blue 1, C.I. Pigment Violet 23, C.I. Basic Blue 7, C.I. Basic Violet 10, C.I. Acid Blue 1, 90, and 83, and C.I. Direct Blue 86.

7. The liquid crystal display device according to claim 1, wherein the color filter includes a black matrix, RGB three-color pixel units, and a Y pixel unit, and contains, as a coloring material, at least one yellow organic dye or pigment selected from the group consisting of C.I. Pigment Yellow 150, 215, 185, 138, and 139 and C.I. Solvent Yellow 21, 82, 83:1, 33, and 162 in the Y pixel unit.

8. The liquid crystal display device according to claim 1, wherein the nematic liquid crystal composition has a nematic liquid crystal phase at least in a temperature range of −10° C. to 50° C.

9. The liquid crystal display device according to claim 1, wherein the nematic liquid crystal composition has positive dielectric constant anisotropy (Δε).

10. The liquid crystal display device according to claim 1, wherein the material containing chiral liquid crystals contains at least two chiral compounds.

11. The liquid crystal display device according to claim 1, wherein the material containing chiral liquid crystals has a cholesteric phase.

12. The liquid crystal display device according to claim 1, wherein the nematic liquid crystal composition contains a compound represented by a general formula (I):

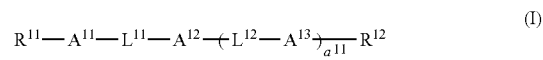

wherein $R^{11}$ and $R^{12}$ independently denote an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, one methylene group or two or more nonadjacent methylene groups in $R^{11}$ and $R^{12}$ may be independently substituted by —O—, —S—, —CO—, —COO—, or —OCO—, provided that oxygen atoms or sulfur atoms are not directly bonded to each other, and one or two or more hydrogen atoms in $R^{11}$ or $R^{12}$ may be substituted by a fluorine atom, $A^{11}$, $A^{12}$, and $A^{13}$ independently denote (a) a trans-1,4-cyclohexylene group (in which one methylene group or two or more nonadjacent methylene groups may be independently substituted by an oxygen atom or a sulfur atom, and one or two or more hydrogen atoms may be independently substituted by a cyano group, a fluorine atom, or a chlorine atom), (b) a 1,4-phenylene group (in which one —CH= or two or more nonadjacent —CH= may be substituted by a nitrogen atom, and one or two or more hydrogen atoms may be independently substituted by a cyano group, a fluorine atom, or a chlorine atom), or (c) a group selected from the group consisting of a 1,4-cyclohexenylene group, a 1,4-bicyclo(2.2.2)octylene group, a naphthalene-2,6-diyl group, a decahydronaphthalene-2,6-diyl group, and a 1,2,3,4-tetrahydronaphthalene-2,6-diyl group (in which one —CH= or two or more nonadjacent —CH= may be substituted by a nitrogen atom, and one or two or more hydrogen atoms may be independently substituted by a cyano group, a fluorine atom, or a chlorine atom), $a^{11}$ is 0, 1, 2, or 3, and $L^{11}$ and L12 independently denote a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CF$_2$O—, —CH=N—N=CH—, —CH=CH—, —CF=CF—, —C≡C—, —N=N—, —CH=N—, —SCH$_2$—, —CH$_2$S—, —CSO—, —OCS—, —CF$_2$S—, or —SCF$_2$—.

13. The liquid crystal display device according to claim 1, wherein the nematic liquid crystal composition contains a compound represented by a general formula (II):

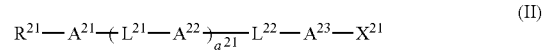

wherein $A^{21}$, $A^{22}$, $A^{23}$, independently denote (a) a trans-1,4-cyclohexylene group (in which one methylene group or two or more nonadjacent methylene groups may be independently substituted by an oxygen atom or a sulfur atom, and one or two or more hydrogen atoms may be independently substituted by a cyano group, a fluorine atom, or a chlorine atom), (b) a 1,4-phenylene group (in which one —CH= or two or more nonadjacent —CH= may be substituted by a nitrogen atom, and one or two or more hydrogen atoms may be independently substituted by a cyano group, a fluorine atom, or a chlorine atom), or (c) a group selected from the group consisting of a 1,4-cyclohexenylene group, a 1,4-bicyclo(2.2.2)octylene group, a naphthalene-2,6-diyl group, a decahydronaphthalene-2,6-diyl group, and a 1,2,3,4-tetrahydronaphthalene-2,6-diyl group (in which one —CH= or two or more nonadjacent —CH= may be substituted by a nitrogen atom, and one or two or more hydrogen atoms may be independently substituted by a cyano group, a fluorine atom, or a chlorine atom), and $a^{21}$ is 0, 1, 2, or 3, $R^{21}$ denotes an alkyl group having 1 to 16 carbon atoms, an alkoxy group having 1 to 16 carbon atoms, an alkenyl group having 2 to 16 carbon atoms, or an alkenyloxy group having 2 to 16 carbon atoms, one methylene group or two or more nonadjacent methylene groups in $R^{21}$ may be independently substituted by —O—, —S—, —CO—, —COO—, or —OCO—, and one or two or more hydrogen atoms in $R^{21}$ may be independently substituted by a fluorine atom or a chlorine atom, $L^{21}$ and $L^{22}$ independently denote a single bond, —CH$_2$CH$_2$—, —(CH$_2$)$_4$—, —OCH$_2$—, —CH$_2$O—, —COO—, —OCO—, —CF$_2$CF$_2$—, —OCF$_2$—, —CF$_2$O—, —CH=N—N=CH—, —CH=CH—, —CF=CF—, —C≡C—, —N=N—, —CH=N—, —SCH$_2$—, —CH$_2$S—, —CSO—, —OCS—, —CF$_2$S—, or —SCF$_2$— (in the case where there are two $L^{21}$s, they may be the same or different), and $X^{21}$ denotes a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group.

14. The liquid crystal display device according to claim 1, wherein the material containing chiral liquid crystals is a liquid crystal-polymer composite material containing a polymer formed by polymerization of at least one polymerizable compound.

15. The liquid crystal display device according to claim 14, wherein at least one non-liquid-crystalline polymerizable compound is contained as the polymerizable compound.

16. The liquid crystal display device according to claim 14, wherein at least one monofunctional polymerizable compound and at least one polyfunctional polymerizable compound are contained as the polymerizable compounds.

* * * * *